US012266313B2

(12) United States Patent
Jang et al.

(10) Patent No.: US 12,266,313 B2
(45) Date of Patent: Apr. 1, 2025

(54) GATE DRIVING PANEL CIRCUIT AND DISPLAY DEVICE

(71) Applicant: LG Display Co., Ltd., Seoul (KR)

(72) Inventors: Min-June Jang, Paju-si (KR); MiYoung Son, Paju-si (KR); HongJae Shin, Paju-si (KW)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/589,247

(22) Filed: Feb. 27, 2024

(65) Prior Publication Data

US 2024/0290284 A1 Aug. 29, 2024

(30) Foreign Application Priority Data

Feb. 28, 2023 (KR) ........................ 10-2023-0027311

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0819* (2013.01); *G09G 2300/0861* (2013.01); *G09G 2310/0267* (2013.01); *G09G 2310/0291* (2013.01)

(58) Field of Classification Search
CPC ...... G09G 3/20; G09G 3/3688; G09G 3/3677; G09G 3/36; G09G 3/3648; G09G 3/3233; G09G 3/3266; G09G 3/3614; G09G 3/3674; G09G 3/3291; G09G 3/3696; G09G 2310/0286; G09G 2310/027; G09G 2310/08; G09G 2310/0289; G09G 2310/0251; G09G 2330/021; G09G 2300/0842; G09G 2300/0808; G09G 2300/0861; G09G 2300/0426; G09G 2320/043; G09G 2320/0233
See application file for complete search history.

(56) References Cited

U.S. PATENT DOCUMENTS

| | | | | |
|---|---|---|---|---|
| 2017/0186378 A1* | 6/2017 | Na | ........................ | G09G 3/3233 |
| 2017/0309238 A1* | 10/2017 | Sung | ........................ | G09G 3/20 |
| 2022/0208058 A1* | 6/2022 | Hwang | ................ | G09G 3/3266 |
| 2022/0208105 A1* | 6/2022 | Lee | ...................... | G09G 3/3266 |

* cited by examiner

*Primary Examiner* — Dong Hui Liang
(74) *Attorney, Agent, or Firm* — Birch, Stewart, Kolasch & Birch, LLP

(57) ABSTRACT

Discussed are a display device and a gate driving panel circuit, and characteristic differences between scan signals can be reduced through differential design between scan bootstrapping capacitors included in scan output buffers for outputting scan signals. The gate driving panel circuit includes an output buffer block including two or more scan output buffers and a logic block. The corresponding scan bootstrapping capacitor included in a specific scan output buffer among the two or more scan output buffers has a different capacitance from the one or more corresponding scan bootstrapping capacitors included in one or more remaining scan output buffers, except for the specific scan output buffer among the two or more scan output buffers.

29 Claims, 43 Drawing Sheets

GATE DRIVING PANEL CIRCUIT AND DISPLAY DEVICE

CROSS-REFERENCE TO RELATED APPLICATION

This application claims priority to Korean Patent Application No. 10-2023-0027311, filed on Feb. 28, 2023 in the Korean Intellectual Property Office, the entire contents of which is hereby expressly incorporated by reference into the present application.

BACKGROUND

Technical Field

The present disclosure relates to electronic devices with a display, and more specifically, to a gate driving panel circuit and a display device including the same.

Discussion of the Related Art

A display device can include a display panel in which a plurality of data lines and a plurality of gate lines are disposed, a data driving circuit for outputting data signals to the plurality of data lines, a gate driving circuit for outputting gate signals to the plurality of gate lines, and the like.

In order for images to be displayed properly on the display device, gate signals need to be supplied properly through the plurality of gate lines. For example, in order to present images properly, it is necessary for gate driving to be performed properly. However, in a situation where gate driving is not performed properly, image quality can be degraded.

SUMMARY OF THE DISCLOSURE

One or more embodiments of the present disclosure can provide a gate driving panel circuit having a structure suitable for a gate-in-panel (GIP) type, and a display device including the gate driving panel circuit.

One or more embodiments of the present disclosure provides a gate driving panel circuit and a display device including the same, which address the limitations and disadvantages associated with the related art.

One or more embodiments of the present disclosure can provide a gate driving panel circuit configured to supply normal gate signals to gate lines so that gate driving can be normally performed, and a display device including the gate driving panel circuit.

One or more embodiments of the present disclosure can provide a gate driving panel circuit configured to have a reduced difference in scan output characteristics, and a display device including the gate driving panel circuit.

One or more embodiments of the present disclosure can provide a gate driving panel circuit capable of reducing a difference in scan output characteristics without modifying a scan clock signal, and a display device including the gate driving panel circuit.

One or more embodiments of the present disclosure can provide a gate driving panel circuit capable of reducing a difference in scan output characteristics using a scan clock signal, and a display device including the gate driving panel circuit.

One or more embodiments of the present disclosure can provide a display device have a wiring structure for stably supplying various types of signals or power to a gate driving panel circuit disposed in a display panel.

According to aspects of the present disclosure, a display device can include a substrate including a display area in which images can be displayed and a non-display area different from the display area, and a gate driving panel circuit configured to output a plurality of scan signals to a plurality of scan signal lines disposed in the display area.

According to an aspect of the present disclosure, the gate driving panel circuit can include an output buffer block including two or more scan output buffers configured to receive two or more scan clock signals and output two or more scan signals, and a logic block configured to control respective voltages of a Q node and a QB node electrically connected to the output buffer block.

According to an aspect of the present disclosure, each of the two or more scan output buffers can include a scan pull-up transistor between a scan clock node to which a corresponding scan clock signal among the two or more scan clock signals is input and a scan output node from which a corresponding scan signal among the two or more scan signals is output, and a scan pull-down transistor between a gate low voltage node to which a gate low voltage is applied and the scan output node.

According to an aspect of the present disclosure, the gate nodes of the respective scan pull-up transistors of the two or more scan output buffers can be electrically connected together to the Q node.

According to an aspect of the present disclosure, each of the two or more scan output buffers can further include a scan bootstrapping capacitor between the gate node and the source node of the scan pull-up transistor.

According to an aspect of the present disclosure, the scan bootstrapping capacitor of a specific scan output buffer among the two or more scan output buffers can have a different capacitance from the one or more scan bootstrapping capacitors of one or more remaining scan output buffers, except for the specific scan output buffer among the two or more scan output buffers.

According to an aspect of the present disclosure, the specific scan output buffer can be the last scan output buffer that lastly outputs a scan signal having a turn-on level voltage among the two or more scan output buffers sharing the Q node.

According to an aspect of the present disclosure, the scan bootstrapping capacitor of the specific scan output buffer can have a greater capacitance than the one or more scan bootstrapping capacitors of the one or more remaining scan output buffers.

According to an aspect of the present disclosure, an area in which a first capacitor electrode and a second capacitor electrode of the scan bootstrapping capacitor of the specific scan output buffer (i.e., the last scan output buffer) among the two or more scan output buffers sharing the Q node overlap each other can be greater than an area in which a first capacitor electrode and a second capacitor electrode of each of the one or more scan bootstrapping capacitors of the one or more remaining scan output buffers overlap each other.

According to an aspect of the present disclosure, the scan bootstrapping capacitor of the specific scan output buffer (i.e., the last scan output buffer) among the two or more scan output buffers sharing the Q node can further include a third capacitor electrode disposed on the second capacitor electrode in addition to the first capacitor electrode and the second capacitor electrode. The third capacitor electrode can be electrically connected to the first capacitor electrode.

According to an aspect of the present disclosure, a falling duration of a scan signal output from the specific scan output buffer can be the same as, or be different in a certain range from, a falling duration of a scan signal output from each of the one or more remaining scan output buffers.

According to an aspect of the present disclosure, a falling duration of a scan clock signal input to the specific scan output buffer can be the same as, or be different in a certain range from, a falling duration of a scan clock signal input to each of the one or more remaining scan output buffers.

According to aspects of the present disclosure, a gate driving panel circuit can be provided that includes an output buffer block including two or more scan output buffers configured to receive two or more scan clock signals and output two or more scan signals, and a logic block configured to control respective voltages of a Q node and a QB node electrically connected to the output buffer block.

According to an aspect of the present disclosure, each of the two or more scan output buffers can include a scan pull-up transistor between a scan clock node to which a corresponding scan clock signal among the two or more scan clock signals is input and a scan output node from which a corresponding scan signal among the two or more scan signals is output, and a scan pull-down transistor between a gate low voltage node to which a gate low voltage is applied and the scan output node.

According to an aspect of the present disclosure, the gate nodes of the respective scan pull-up transistors of the two or more scan output buffers can be electrically connected together to the Q node.

According to an aspect of the present disclosure, each of the two or more scan output buffers can include a scan bootstrapping capacitor between the gate node and the source node of the scan pull-up transistor.

According to an aspect of the present disclosure, the scan bootstrapping capacitor of a specific scan output buffer among the two or more scan output buffers can have a different capacitance from the one or more scan bootstrapping capacitors of one or more remaining scan output buffers, except for the specific scan output buffer among the two or more scan output buffers.

According to an aspect of the present disclosure, the scan bootstrapping capacitor of the specific scan output buffer can have a greater capacitance than the one or more scan bootstrapping capacitors of the one or more remaining scan output buffers.

According to aspects of the present disclosure, a display device can be provided that includes a substrate including a display area and a non-display area, and a gate driving panel circuit configured to output a plurality of scan signals to a plurality of scan signal lines disposed in the display area.

According to an aspect of the present disclosure, the gate driving panel circuit can include an output buffer block including two or more scan output buffers configured to receive two or more scan clock signals and output two or more scan signals, and a logic block configured to control respective voltages of a Q node and a QB node electrically connected to the output buffer block.

According to an aspect of the present disclosure, among the two or more scan clock signals, a falling duration of the last scan clock signal can be smaller than a falling duration of each of one or more remaining scan clock signals.

According to an aspect of the present disclosure, respective falling durations of the two or more scan signals can be the same as each other, or a difference in the falling durations of the two or more scan signals can be less than a difference between the falling duration of the last scan clock signal and the falling duration of each of one or more remaining scan clock signals.

According to aspects of the present disclosure, a gate driving panel circuit can include an output buffer block comprising two or more scan output buffers configured to receive two or more scan clock signals and output two or more scan signals; and a logic block configured to control respective voltages of a Q node and a QB node electrically connected to the output buffer block, wherein gate nodes of scan pull-up transistors of the two or more scan output buffers are electrically connected together to the Q node, wherein among the two or more scan signals, respective high level voltage periods of two scan signals, which are output immediately adjacent to each other in time, overlap each other in time, and wherein among the two or more scan clock signals, a falling duration of a last scan clock signal is smaller than that of each of the remaining one or more scan clock signals.

According to aspects of the present disclosure, a display device can include a substrate including a display area and a non-display area; and a gate driving panel circuit configured to output a plurality of scan signals to a plurality of scan signal lines disposed in the display area, wherein the gate driving panel circuit comprises: an output buffer block comprising two or more scan output buffers configured to receive two or more scan clock signals and output two or more scan signals; and a logic block configured to control respective voltages of a Q node and a QB node electrically connected to the output buffer block, wherein gate nodes of scan pull-up transistors of the two or more scan output buffers are electrically connected together to the Q node, wherein among the two or more scan signals, respective high level voltage periods of two scan signals, which are output immediately adjacent to each other in time, overlap each other in time, and wherein among the two or more scan clock signals, a falling duration of a last scan clock signal is smaller than that of each of the remaining one or more scan clock signals.

According to one or more embodiments of the present disclosure, a gate driving panel circuit can include a structure suitable for a gate in panel (GIP) type, and a display device including the same can be provided.

According to one or more embodiments of the present disclosure, a gate driving panel circuit can be configured to supply normal gate signals to gate lines so that gate driving can be normally performed, and a display device including the gate driving panel circuit can be provided.

According to one or more embodiments of the present disclosure, a gate driving panel circuit can be configured to have a reduced difference in scan output characteristics, and a display device including the gate driving panel circuit can be provided.

According to one or more embodiments of the present disclosure, a gate driving panel circuit can be capable of reducing a difference in scan output characteristics without modifying a scan clock signal, and a display device including the gate driving panel circuit can be provided.

According to one or more embodiments of the present disclosure, a gate driving panel circuit can be capable of reducing a difference in scan output characteristics using a scan clock signal, and a display device including the gate driving panel circuit can be provided.

According to one or more embodiments of the present disclosure, a display device can include a wiring structure for stably supplying various types of signals or power to a gate driving panel circuit disposed in a display panel.

According to the embodiments described herein, since a display panel (e.g., a display panel 110) and a display device (e.g., a display device 100) are designed to include a gate driving panel circuit (e.g., a gate driving panel circuit GPC) disposed on a substrate of the display panel and formed during the manufacturing process of the display panel or the display device, advantage of enabling process optimization of the display panel and the display device can be provided.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION OF THE EMBODIMENTS

Figure 1:
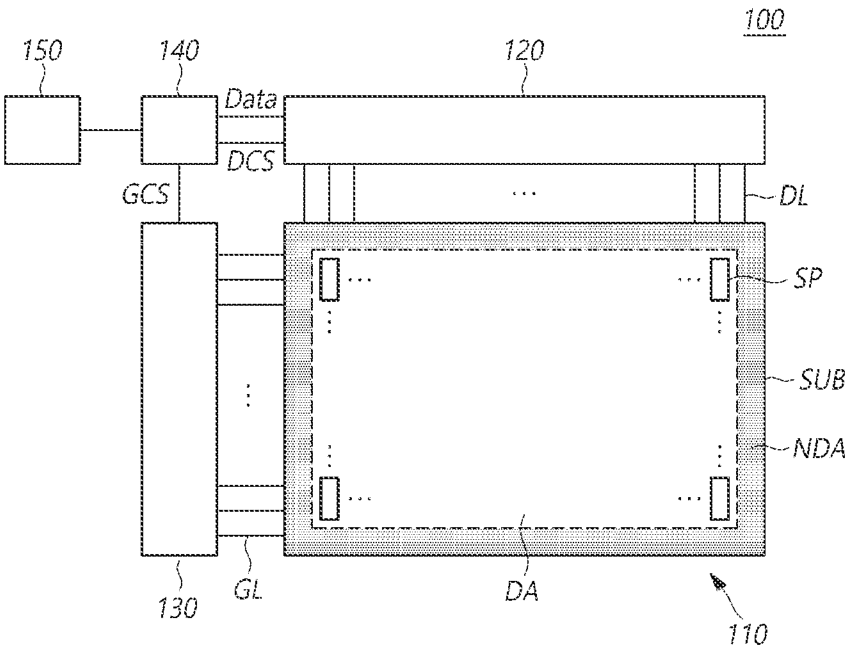
FIG. 1 illustrates an example system configuration of a display device according to aspects of the present disclosure.

Reference will now be made in detail to embodiments of the present disclosure, examples of which can be illustrated in the accompanying drawings. In the following description, the structures, embodiments, implementations, methods and operations described herein are not limited to the specific example or examples set forth herein and can be changed as is known in the art, unless otherwise specified. Like reference numerals designate like elements throughout, unless otherwise specified.

Names of the respective elements used in the following explanations are selected only for convenience of writing the specification and can thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the protected scope of the present disclosure is defined by claims and their equivalents.

In the following description, where the detailed description of the relevant known function or configuration can unnecessarily obscure aspects of the present disclosure, a detailed description of such known function or configuration can be omitted. The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements can be added unless the term, such as "only," is used. An element described in the singular form is intended to include a plurality of elements, and vice versa, unless the context clearly indicates otherwise.

Although the terms "first," "second," "A", "B", "(a)", or "(b)", and the like can be used herein to describe various elements, these elements should not be interpreted to be limited by these terms as they are not used to define a particular order or precedence. These terms are used only to distinguish one element from another; thus, related elements should not be interpreted to be limited by these terms as they are not used to define a particular order or precedence. Further, the expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers "disposed" or "interposed" between the elements or layers, unless otherwise specified. Further, the another element can be included in one or more of the two or more elements connected, combined, coupled, or contacted (to) one another.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers "disposed" or "interposed" between the elements or layers, unless otherwise specified.

Where positional relationships are described, for example, where the positional relationship between two parts is described using "on," "over," "under," "above," "below," "beside," "next," or the like, one or more other parts can be located between the two parts unless a more limiting term, such as "immediate(ly)," "direct(ly)," or "close(ly)" is used. For example, where an element or layer is disposed "on" another element or layer, a third element or layer can be interposed therebetween. Furthermore, the terms "left," "right," "top," "bottom, "downward," "upward," "upper," "lower," and the like refer to an arbitrary frame of reference. In describing a temporal relationship, when the temporal order is described as, for example, "after," "subsequent," "next," or "before," a case which is not continuous can be included unless a more limiting term, such as "just," "immediate(ly)," or "direct(ly)," is used. In construing an element, the element is to be construed as including an error or tolerance range even where no explicit description of such an error or tolerance range is provided. Further, the term "may" fully encompasses all the meanings of the term "can." The term "at least one" should be understood as including any or all combinations of one or more of the associated listed items. For example, the meaning of "at least one of a first element, a second element, and a third element" encompasses the combination of all three listed elements, combinations of any two of the three elements, as well as each individual element, i.e., the first element, the second element, or the third element.

Hereinafter, various embodiments of the present disclosure will be described in detail with reference to the accompanying drawings. All the components of each display device and each circuit according to all embodiments of the present disclosure are operatively coupled and configured. In addition, for convenience of description, a scale in which each of elements is illustrated in the accompanying drawings can differ from an actual scale. Thus, the illustrated elements are not limited to the specific scale in which they are illustrated in the drawings.

FIG. 1 illustrates an example system configuration of a display device 100 according to aspects of the present disclosure.

Referring to FIG. 1, in one or more embodiments, the display device 100 according to aspects of the present disclosure can include a display panel 110 including a plurality of subpixels SP and at least one driving circuit for driving the plurality of subpixels SP included in the display panel 110.

The at least one driving circuit can include a data driving circuit 120, a gate driving circuit 130, and the like, and further include a controller 140 for controlling the data driving circuit 120 and the gate driving circuit 130.

The display panel 110 can include a substrate SUB, and signal lines such as a plurality of data lines DL, a plurality of gate lines GL, and the like disposed over the substrate SUB. The plurality of data lines DL and the plurality of gate lines GL can be connected to the plurality of subpixels SP.

The display panel 110 can include a display area DA in which one or more images can be displayed and a non-display area NDA in which an image is not displayed. A plurality of subpixels SP for displaying images can be disposed in the display area DA of the display panel 110. Driving circuits (e.g., 120, 130, and 140) can be electrically connected to, or be mounted in, the non-display area NDA of the display panel 110. Further, a pad portion including one or more pads to which one or more integrated circuits or one or more printed circuits are connected can be disposed in the non-display area NDA.

The data driving circuit 120 can be a circuit for driving the plurality of data lines DL, and can supply data signals to the plurality of data lines DL.

The gate driving circuit 130 can be a circuit for driving the plurality of gate lines GL, and can supply gate signals to the plurality of gate lines GL.

The controller 140 can supply a data control signal DCS to the data driving circuit 120 in order to control operation timing of the data driving circuit 120. The controller 140 can supply a gate control signal GCS to the gate driving circuit 130 in order to control operation timing of the gate driving circuit 130.

The controller 140 can start to scan pixels according to respective timings set in each frame, convert image data inputted from external devices or external image providing sources (e.g. host systems) in a data signal form readable by the data driving circuit 120 and then supply image data Data resulting from the converting to the data driving circuit 120, and in line with the scan of at least one pixel (or at least one pixel array) among the pixels, control the loading of the image data to the at least one pixel at a time at which the illumination of at least one corresponding light emitting element of the at least one pixel is intended.

The controller 140 can receive, in addition to input image data, several types of timing signals including a vertical synchronous signal VSYNC, a horizontal synchronous signal HSYNC, an input data enable signal DE, a clock signal CLK, and the like from external devices, networks, or systems (e.g., a host system 150).

In order to control the data driving circuit 120 and the gate driving circuit 130, the controller 140 can receive one or more of the timing signals such as the vertical synchronization signal VSYNC, the horizontal synchronization signal HSYNC, the input data enable signal DE, the clock signal CLK, and the like, generate several types of control signals DCS and GCS, and output the generated signals to the data driving circuit 120 and the gate driving circuit 130.

For example, in order to control the gate driving circuit 130, the controller 140 can output several types of gate control signals GCS including a gate start pulse GSP, a gate shift clock GSC, a gate output enable signal GOE, and the like.

Further, to control the data driving circuit 120, the controller 140 can output several types of data control signals DCS including a source start pulse SSP, a source sampling clock SSC, a source output enable SOE signal, and the like.

The controller 140 can be implemented in a separate component from the data driving circuit 120, or integrated with the data driving circuit 120, so that the controller 140 and the data driving circuit 120 can be implemented in a single integrated circuit.

The data driving circuit 120 can drive a plurality of data lines DL by supplying data voltages corresponding to image data Data received from the controller 140 to the plurality of data lines DL. The data driving circuit 120 can also be referred to as a source driving circuit.

The data driving circuit 120 can include, for example, one or more source driver integrated circuits SDIC.

Each source driver integrated circuit SDIC can include a shift register, a latch circuit, a digital-to-analog converter DAC, an output buffer, and the like. In one or more embodiments, each source driver integrated circuit SDIC can further include an analog-to-digital converter ADC.

In one or more embodiments, each source driver integrated circuit SDIC can be connected to the display panel 110 using a tape-automated-bonding (TAB) technique, or connected to a conductive pad such as a bonding pad of the display panel 110 using a chip-on-glass (COG) technique or a chip-on-panel (COP) technique, or connected to the display panel 110 using a chip-on-film (COF) technique.

The gate driving circuit 130 can supply a gate signal of a turn-on level voltage or a gate signal of a turn-off level voltage according to the control of the controller 140. The gate driving circuit 130 can sequentially drive a plurality of gate lines GL by sequentially supplying gate signals of the turn-on level voltage to the plurality of gate lines GL.

In one or more embodiments, the gate driving circuit 130 can be connected to the display panel 110 using the tape-automated-bonding (TAB) technique, or connected to a conductive pad such as a bonding pad of the display panel 110 using the chip-on-glass (COG) technique or the chip-on-panel (COP) technique, or connected to the display panel 110 using the chip-on-film (COF) technique. In one or more embodiments, the gate driving circuit 130 can be disposed in the non-display area NDA of the display panel 110 using the gate-in-panel (GIP) technique. The gate driving circuit 130 can be disposed on a substrate SUB, or connected to the substrate SUB. In an example where the gate driving circuit 130 is implemented with the GIP technique, the gate driving circuit 130 can be disposed in the non-display area NDA of the substrate SUB. The gate driving circuit 130 can be connected to the substrate SUB in examples where the gate driving circuit 130 is implemented with the chip-on-glass (COG) technique, the chip-on-film (COF) technique, or the like.

In an embodiment, at least one of the data driving circuit 120 and the gate driving circuit 130 can be disposed in the display area DA. For example, at least one of the data driving circuit 120 and the gate driving circuit 130 can be disposed not to overlap with subpixels SP, or disposed to overlap with one or more, or all, of the subpixels SP.

When a specific gate line is selected and driven by the gate driving circuit 130, the data driving circuit 120 can convert image data Data received from the controller 140 into data voltages in an analog form and supply the data voltages resulting from the converting to a plurality of data lines DL.

The data driving circuit 120 can be located in, and/or electrically connected to, but not limited to, only one side or portion (e.g., an upper edge or a lower edge) of the display panel 110. In one or more embodiments, the data driving circuit 120 can be located in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 130 can be located in, and/or electrically connected to, but not limited to, only one side or portion (e.g., a left edge or a right edge) of the display panel 110. In one or more embodiments, the gate driving circuit 130 can be located in, and/or electrically connected to, but not limited to, two sides or portions (e.g., a left edge and a right edge) of the display panel 110 or at least two of four sides or portions (e.g., an upper edge, a lower edge, the left edge, and the right edge) of the display panel 110 according to driving schemes, panel design schemes, or the like.

The controller 140 can be a timing controller used in the typical display technology or a control apparatus/device capable of additionally performing other control functionalities in addition to the typical function of the timing controller. In one or more embodiments, the controller 140 can be one or more other control circuits different from the timing controller, or a circuit or component in the control apparatus/device. The controller 140 can be implemented using various circuits or electronic components such as an integrated circuit (IC), a field programmable gate array (FPGA), an application specific integrated circuit (ASIC), a processor, and/or the like.

The controller 140 can be mounted on a printed circuit board, a flexible printed circuit, or the like, and can be electrically connected to the data driving circuit 120 and the gate driving circuit 130 through the printed circuit board, the flexible printed circuit, or the like.

The controller 140 can transmit signals to, and receive signals from, the data driving circuit 120 via one or more predetermined interfaces. For example, such interfaces can include a low voltage differential signaling (LVDS) interface, an embedded clock point-point interface (EPI), a serial peripheral interface (SPI), and the like.

The controller 140 can include a storage medium such as one or more registers.

In one or more aspects, the display device 100 can be a display including a backlight unit such as a liquid crystal display device, or can be a self-emissive display such as an organic light emitting diode (OLED) display device, a quantum dot (QD) display device, a micro light emitting diode (M-LED) display device, a light emitting diode (LED) display device based on an inorganic material, or the like.

In an embodiment where the display device 100 is an organic light emitting display device, each subpixel SP can include, as a light emitting element, an organic light emitting diode (OLED), which is a self-emissive element.

In an embodiment where the display device 100 is a quantum dot display device, each subpixel SP can include a light emitting element configured with quantum dots, which are self-emissive semiconductor crystals.

In an embodiment where the display device 100 is an inorganic light emitting display device, each subpixel SP can include, as a light emitting element, an inorganic light emitting diode, which is a self-emissive element and includes an inorganic material. In this embodiment, the inorganic light emitting diode can be referred to as a micro light emitting diode (LED), and the inorganic light emitting display device can be referred to as a micro light emitting diode (LED) display device.

Figure 2:
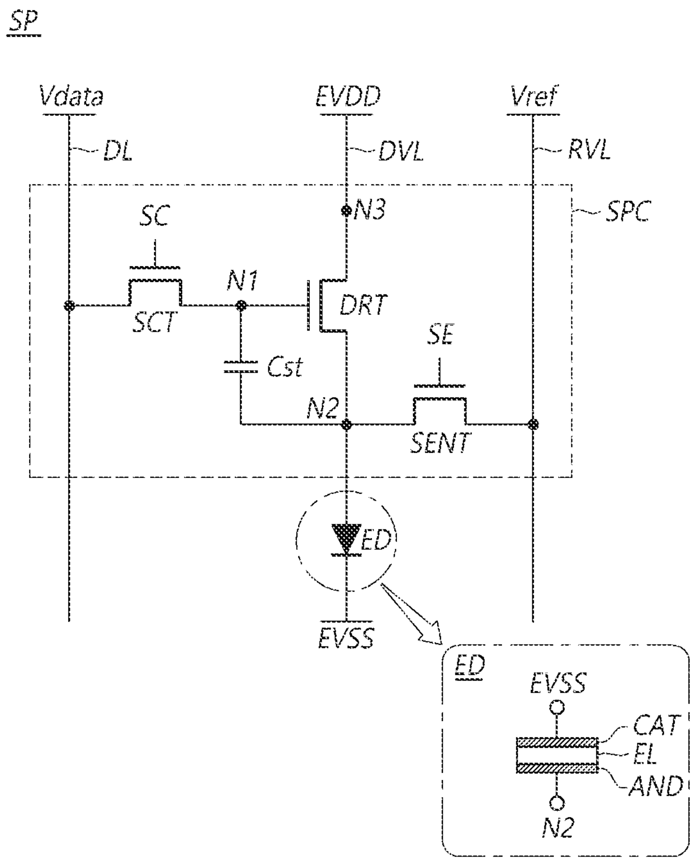
FIG. 2 illustrates an example equivalent circuit of a subpixel in a display panel according to aspects of the present disclosure.

FIG. 2 illustrates an example equivalent circuit of a subpixel in the display panel 110 according to aspects of the present disclosure.

Referring to FIG. 2, in one or more embodiments, each of a plurality of subpixels SP disposed in the display panel 110 of the display device 100 according to aspects of the present disclosure can include a light emitting element ED and a subpixel circuit SPC for driving the light emitting element ED.

For example, the corresponding subpixel circuit SPC of each subpixel SP can include a driving transistor DRT, a scan transistor SCT, a sensing transistor SENT, and a storage capacitor Cst. In this example, as the corresponding subpixel circuit SPC of each subpixel SP is configured with three transistors (3T: DRT, SCT and SENT) and one capacitor (1C: Cst), this structure of subpixel circuit SPC can be referred to as a "3T1C structure".

Referring to FIG. 2, the light emitting element ED can include an anode electrode AND and a cathode electrode CAT, and include an emission layer EL located between the anode electrode AND and the cathode electrode CAT.

One of the anode electrode AND and the cathode electrode CAT can be a pixel electrode connected to a transistor such as the driving transistor DRT, and the other can be a common electrode to which a common voltage is applied. The pixel electrode can be an electrode disposed in each subpixel SP, and the common electrode can be an electrode commonly disposed in all or two or more of subpixels SP. For example, the common voltage can be a high voltage EVDD, which is a high level common voltage, or be a low voltage EVSS, which is a low level common voltage. In this example, the high voltage EVDD can be sometimes referred to as a driving voltage, and the low voltage EVSS can be sometimes referred to as a base voltage.

According to the example of FIG. 2, the anode electrode AND can be a pixel electrode connected to a transistor such as the driving transistor DRT, and the cathode electrode CAT can be a common electrode to which the low potential voltage EVSS is applied.

For example, the light emitting element ED can be an organic light emitting diode (OLED), a light emitting diode (LED) based on an inorganic material, a quantum dot light emitting element, or the like.

The driving transistor DRT can be a transistor for driving the light emitting element ED, and can include a first node N1, a second node N2, and a third node N3.

The first node N1 of the driving transistor DRT can be the gate node of the driving transistor DRT, and can be electrically connected to the source node or drain node of the scan transistor SCT. The second node N2 of the driving transistor DRT can be the source node or drain node of the driving transistor DRT, be electrically connected to the source node or drain node of the sensing transistor SENT, and be electrically connected to the anode electrode AND of the light emitting element ED. The third node N3 of the driving transistor DRT can be electrically connected to a high voltage line DVL for supplying the high voltage EVDD.

Referring to FIG. 2, the scan transistor SCT can be controlled by a scan signal SC, which is a type of gate signal, and can be connected between the first node N1 of the driving transistor DRT and a data line DL. In other words, the scan transistor SCT can be turned on or turned off depending on a scan signal SC supplied through a scan signal line SCL, which is a type of the gate line GL, and control an electrical connection between the data line DL and the first node N1 of the driving transistor DRT.

The scan transistor SCT can be turned on by a scan signal SC having a turn-on level voltage, and thereby, pass a data voltage Vdata supplied through the data line DL to the first node N1 of the driving transistor DRT.

In an example where the scan transistor SCT is an n-type transistor, the turn-on level voltage of the scan signal SC can be a high level voltage. In another example where the scan transistor SCT is an p-type transistor, the turn-on level voltage of the scan signal SC can be a low level voltage. Hereinafter, for simplicity, discussions are provided based on the example where the scan transistor SCT is an n-type transistor. Accordingly, in discussions that follow, the turn-on level voltage of a sensing signal SE can be a high level voltage.

The sensing transistor SENT can be controlled by a sensing signal SE, which is a type of gate signal, and can be connected between the second node N2 of the driving transistor DRT and a reference voltage line RVL. In other words, the sensing transistor SENT can be turned on or turned off depending on a sensing signal SE supplied through a sensing signal line SENL, which is another type of the gate line GL, and control an electrical connection between the second node N2 of the driving transistor DRT and the reference voltage line RVL.

The sensing transistor SENT can be turned on by a sensing signal SE having a turn-on level voltage, and thereby, pass a reference voltage Vref supplied through the reference voltage line RVL to the second node N2 of the driving transistor DRT. The sensing signal SE can be referred to as a second scan signal that is different from the scan signal SC.

Further, the sensing transistor SENT can be turned on by a sensing signal SE having the turn-on level voltage, and thereby, pass a voltage at the second node N2 of the driving transistor DRT to the reference voltage line RVL.

In an embodiment where the sensing transistor SENT is an n-type transistor, the turn-on level voltage of the sensing signal SE can be a high level voltage. In another example where the sensing transistor SENT is an p-type transistor, the turn-on level voltage of the sensing signal SE can be a low level voltage. Hereinafter, for simplicity, discussions are provided based on the example where the sensing transistor SENT is an n-type transistor. Accordingly, in discussions that follow, the turn-on level voltage of a sensing signal SE can be a high level voltage.

For example, the function of the sensing transistor SENT configured to pass the voltage of the second node N2 of the driving transistor DRT to the reference voltage line RVL can be used when the corresponding subpixel SP is driven to sense one or more characteristic values of the subpixel SP. In this example, the voltage passed to the reference voltage line RVL can be a voltage to determine a characteristic value of the subpixel SP or a voltage where the characteristic value of the subpixel SP is contained.

Herein, the characteristic value of the subpixel SP can be a characteristic value of the driving transistor DRT or the light emitting element ED. For example, the characteristic value of the driving transistor DRT can include a threshold voltage and/or mobility of the driving transistor DRT. The characteristic value of the light emitting element ED can include a threshold voltage of the light emitting element ED.

The storage capacitor Cst can be connected between the first node N1 and the second node N2 of the driving transistor DRT. The storage capacitor Cst can store an amount of electric charge corresponding to a voltage difference between both terminals and maintain the voltage difference between both terminals for a predetermined frame time. As a result, the corresponding subpixel SP can emit light for the predetermined frame time.

Each of the driving transistor DRT, the scan transistor SCT, and the sensing transistor SENT can be an n-type transistor, or a p-type transistor. Herein, for convenience of description, discussions are provided based on an example where each of the driving transistor DRT, the scan transistor SCT, and the sensing transistor SENT is an n-type transistor.

The storage capacitor Cst can be an external capacitor intentionally designed to be located outside of the driving transistor DRT, other than an internal capacitor, such as a parasitic capacitor (e.g., a Cgs or a Cgd), that can be formed between the gate node and the source node (or the drain node) of the driving transistor DRT.

It should be noted that FIG. 2 illustrates just one example subpixel SP. For example, the subpixel SP can be modified in various ways by further including one or more transistors or one or more capacitors according to design requirements.

Figure 3A:
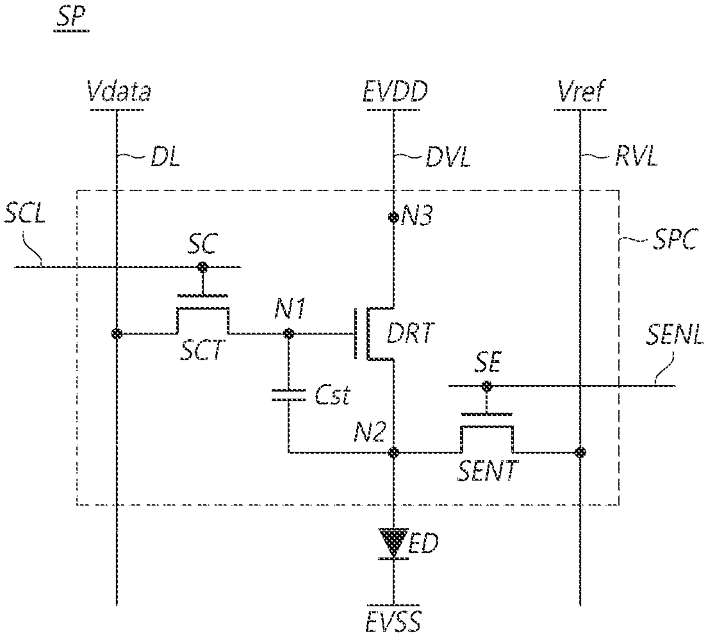
FIGS. 3A and 3B illustrate respective example equivalent circuits of a subpixel having a two-gate driven structure and another subpixel having a one-gate driven structure in the display panel according to aspects of the present disclosure.
Figure 3B:
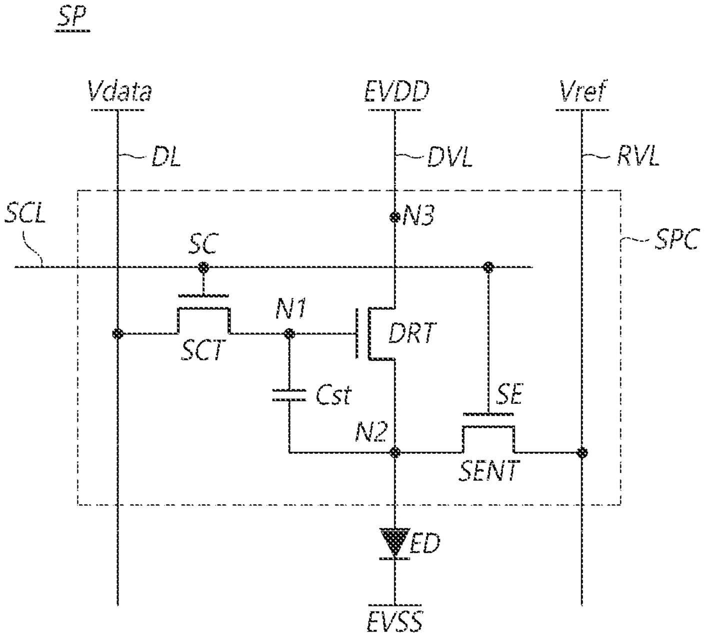

FIGS. 3A and 3B illustrate respective example equivalent circuits of a subpixel SP having a two-gate driven structure and another subpixel SP having a one-gate driven structure in the display panel 110 according to aspects of the present disclosure.

The subpixel circuit SPC of the subpixel SP of FIG. 3A and the subpixel circuit SPC of the subpixel SP of FIG. 3B have the same 3T1C structure as that of FIG. 2.

The subpixel SP of FIG. 3A and the subpixel SP of FIG. 3B can have different gate driving structures. The subpixel SP of FIG. 3A can have a two-gate driven structure. The subpixel SP of FIG. 3B can have a one-gate driven structure.

Referring to FIG. 3A, in examples where a subpixel SP has the two-gate driven structure, the subpixel SP can be connected to two gate lines GL serving as a scan signal line SCL and a sensing signal line SENL, respectively.

In the subpixel circuit SPC of the two-gate driven structure-based subpixel SP, the gate node of a scan transistor SCT can be connected to the scan signal line SCL, and the gate node of a sensing transistor SEN can be connected to the sensing signal line SENL. As a result, the scan transistor SCT and the sensing transistor SENT can operate independently of each other.

The subpixel circuit SPC of the two-gate driven structure-based subpixel SP can receive a scan signal SC through the scan signal line SCL, and receive a sensing signal SE through the sensing signal line SENL. In this manner, in the subpixel circuit SPC of the two-gate driven structure-based subpixel SP, the gate node of the scan transistor SCT can receive a scan signal SC through the scan signal line SCL, and the gate node of the sensing transistor SENT can receive a sensing signal SE through the sensing signal line SENL.

In examples where a subpixel SP has the two-gate driven structure, on and/or off timings of a scan transistor SCT and on and/or off timings of a sensing transistor SENT in one subpixel SP can be independent of each other. For example, when a subpixel SP has the two-gate driven structure, on and/or off timings of a scan transistor SCT and on and/or off timings of a sensing transistor SENT in one subpixel SP can be different from, or be the same as, each other according to design requirements.

Referring to FIG. 3B, in examples where a subpixel SP has the one-gate driven structure, the subpixel SP can be connected to a scan signal line SCL corresponding to one gate line GL.

In the subpixel circuit SPC of the one-gate driven structure-based subpixel SP, the gate node of a scan transistor SCT and the gate node of a sensing transistor SEN can be connected together to one scan signal line SCL. As a result, the scan transistor SCT and the sensing transistor SENT can operate together.

In the subpixel circuit SPC of the one-gate driven structure-based subpixel SP, both the gate node of the scan transistor SCT and the gate node of the sensing transistor SEN can receive a scan signal SC together through the one scan signal line SCL.

In subpixel circuit SPC of the one-gate driven structure-based subpixel SP, the scan signal SC supplied to the gate node of the sensing transistor SENT can serve as a sensing signal SE.

In examples where a subpixel SP has the one-gate driven structure, on and/or off timings of a scan transistor SCT and on and/or off timings of a sensing transistor SENT in one subpixel SP can be the same.

Figure 4:
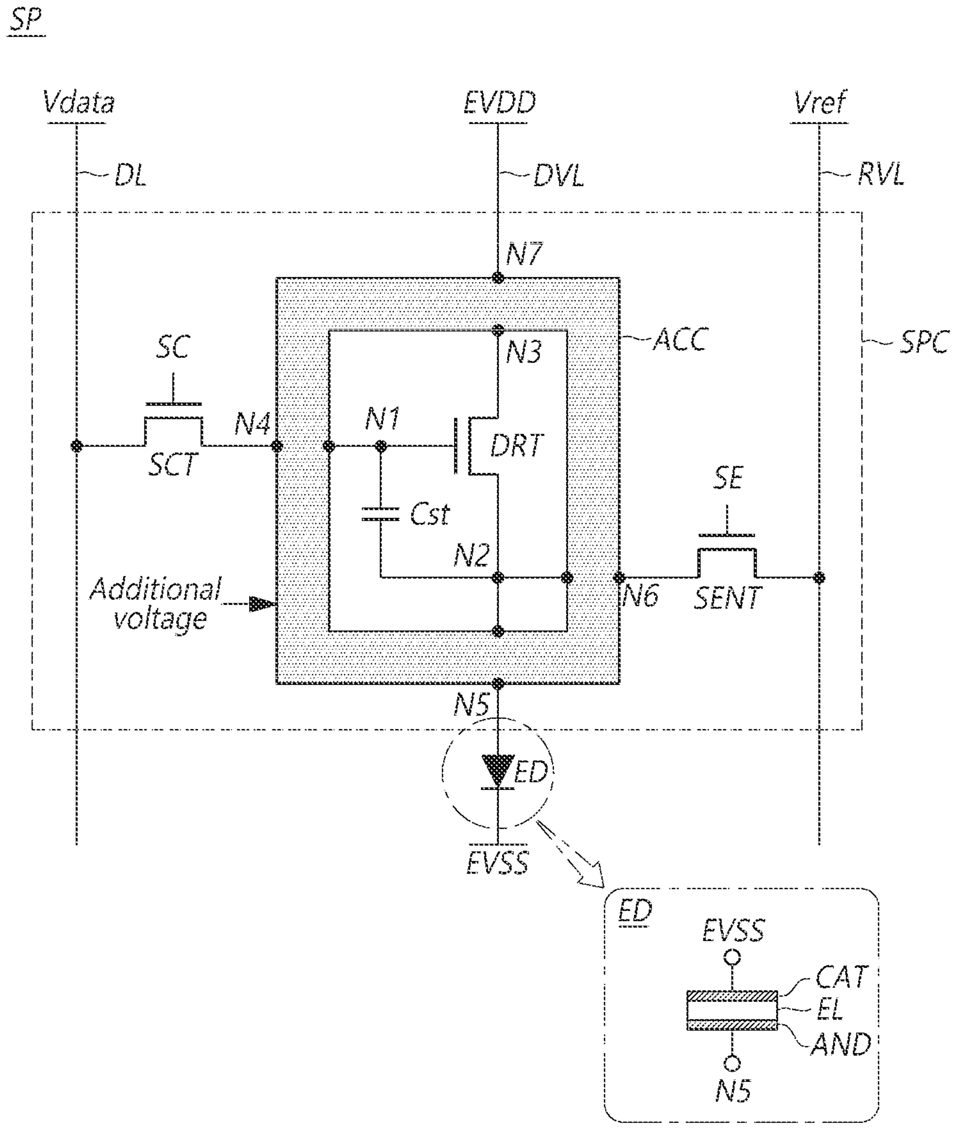
FIG. 4 illustrates another example equivalent circuit of a subpixel in the display panel according to aspects of the present disclosure.

FIG. 4 illustrates another example equivalent circuit of a subpixel in the display panel 110 according to aspects of the present disclosure.

Referring to FIG. 4, a subpixel SP can include a light emitting element ED and a subpixel circuit SPC for driving the light emitting element ED. The subpixel circuit SPC can include a driving transistor DRT, a scan transistor SCT, a sensing transistor SENT, and a storage capacitor Cst, and in addition, include an additional control circuit ACC.

The additional control circuit ACC can include one or more transistors and/or one or more capacitors.

The additional control circuit ACC can include a fourth node N4 electrically connected to the source node or drain node of the scan transistor SCT, a fifth node N5 electrically connected to the anode electrode AND of the light emitting element ED, a sixth node N6 electrically connected to the source node or drain node of the sensing transistor SENT, and a seventh node N7 electrically connected to a high voltage line DVL.

The additional control circuit ACC can be supplied with an additional voltage, when needed or desired.

When the fourth node N4 and the first node N1 are electrically connected to each other, the fifth node N5, the sixth node N6, and the second node N2 are electrically connected to each other, and the seventh node N7 and the third node N3 are electrically connected to each other, by the additional control circuit ACC, the subpixel SP of FIG. 4 can be the same as the subpixel SP of FIG. 2.

For example, the additional control circuit ACC can include a light emitting control transistor configured to control a connection between the second node N2 and the fifth node N5. In another example, the additional control circuit ACC can include a light emitting control transistor configured to control a connection between the seventh node N7 and the third node N3.

Figure 5:
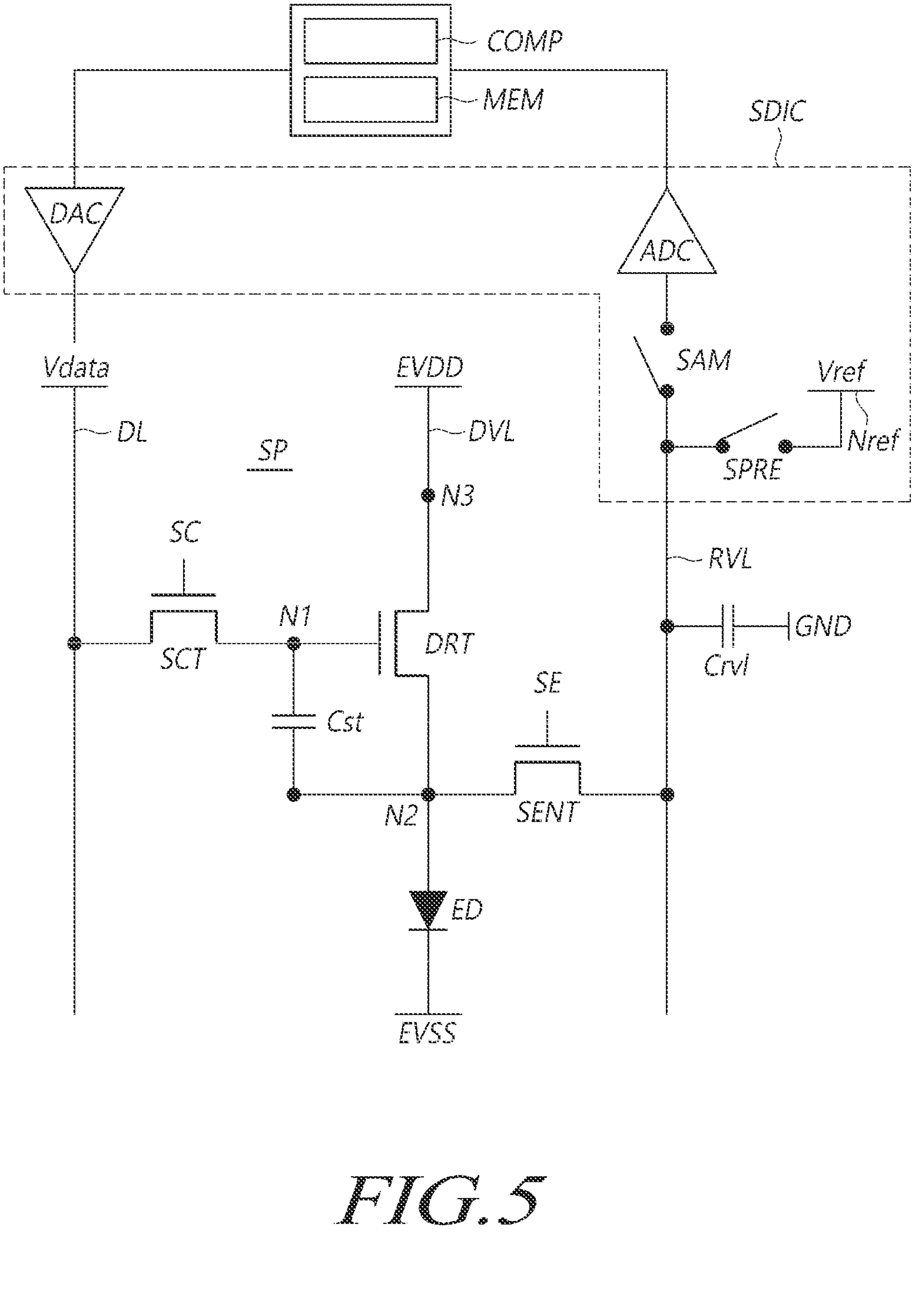
FIG. 5 illustrates an example compensation circuit of the display device according to aspects of the present disclosure.

FIG. 5 illustrates an example compensation circuit of the display device 100 according to aspects of the present disclosure. It should be noted here that the subpixel SP of FIG. 5 represents the subpixel SP of FIG. 2 as an example.

Referring to FIG. 5, the compensation circuit can be configured to perform sensing operation for characteristic values of circuit elements in the subpixel SP and an associated compensation process. In an embodiment, the circuit elements can include light emitting elements ED, driving transistors DRT, and the like.

The compensation circuit can include a power switch SPRE, a sampling switch SAM, an analog-to-digital converter ADC, a compensator COMP, a memory MEM, and the like. In an embodiment, the compensation circuit can further include a subpixel SP (e.g., the subpixel SP of FIG. 2 or FIG. 5).

The power switch SPRE can control a connection between the reference voltage line RVL and a reference voltage supply node Nref A reference voltage Vref supplied by a power supply can be applied to the reference voltage supply node Nref, and the reference voltage Vref applied to the reference voltage supply node Nref can be passed to the reference voltage line RVL via the power switch SPRE.

The sampling switch SAM can control a connection between the analog-to-digital converter ADC and the reference voltage line RVL. When the analog-to-digital converter ADC is connected to the reference voltage line RVL by a sampling switch SAM, the analog-to-digital converter ADC can convert a voltage (analog voltage) of the connected reference voltage line RVL into a sensing value in the form of digital value.

As the subpixel SP is driven, a line capacitor Crvl can be formed between the reference voltage line RLV and the ground GND. The voltage of the reference voltage line RVL can correspond to an amount of electric charges stored across the line capacitor Crvl.

The analog-to-digital converter ADC can provide sensing data containing the sensing value to the compensator COMP.

The compensator COMP can determine at least one corresponding characteristic value of at least one circuit element (e.g., the light emitting element ED, the driving transistor DRT, and/or the like) included in the subpixel SP based on the sensing data from the analog-to-digital converter ADC. Thereafter, the compensator COMP can determine a compensation value to reduce or eliminate a difference in characteristic values between circuit elements based on the at least one characteristic value, and store the compensation value in the memory MEM.

For example, the compensation value can be information determined to reduce or eliminate a difference in characteristic values between light emitting elements ED or a difference in characteristic values between driving transistors DRT, and include an offset and/or a gain for modifying data.

The controller 140 can modify image data using the compensation value stored in the memory MEM, and supply the modified image data to the data driving circuit 120.

The data driving circuit 120 can convert the changed image data into a data voltage Vdata in the form of analog voltage by using a digital-to-analog converter DAC, and output the data voltage Vdata. In this manner, the compensation process can be executed.

In an embodiment, the analog-to-digital converter ADC, the power switch SPRE, and the sampling switch SAM can be included in a source driver integrated circuit SDIC. In this embodiment, the source driver integrated circuit SDIC can be an integrated circuit serving as the data driving circuit 120 or a part of the data driving circuit 120, and include the digital-to-analog converter DAC.

In an embodiment, the compensator COMP can be included in the controller 140.

As described above, the display device 100 can perform the compensation process to reduce a difference in characteristic values between the driving transistors DRT. Further, in order to perform the compensation process, the display device 100 can perform sensing driving to acquire information on a difference in characteristic values between the driving transistors DRT.

In an embodiment, the display device 100 according to aspects of the present disclosure can perform sensing driving in two sensing modes (a first sensing mode and a second sensing mode). Hereinafter, sensing driving in two sensing modes (the first sensing mode and the second sensing mode) will be described with reference to FIGS. 6A and 6B.

Figure 6A:
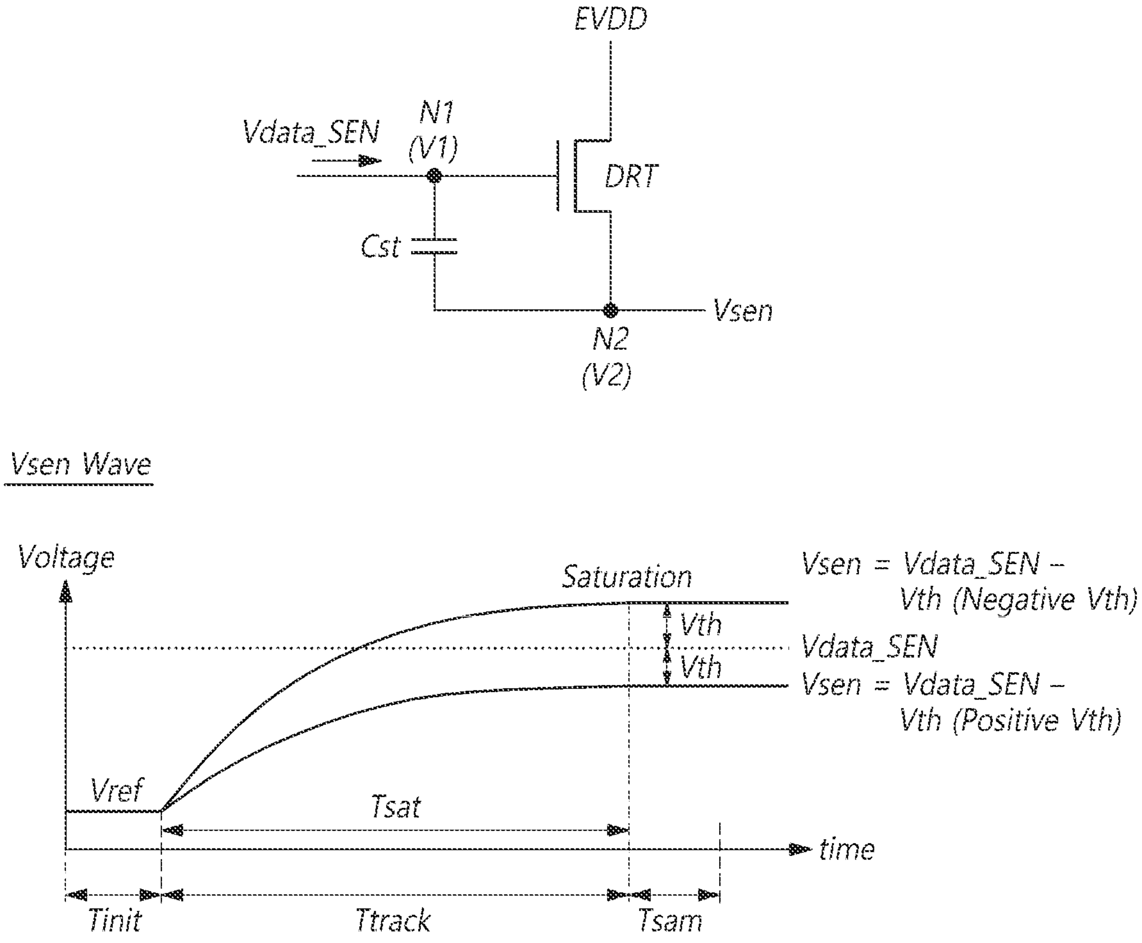
FIGS. 6A and 6B illustrate an example first sensing mode and an example second sensing mode used in the display device according to aspects of the present disclosure.
Figure 6B:
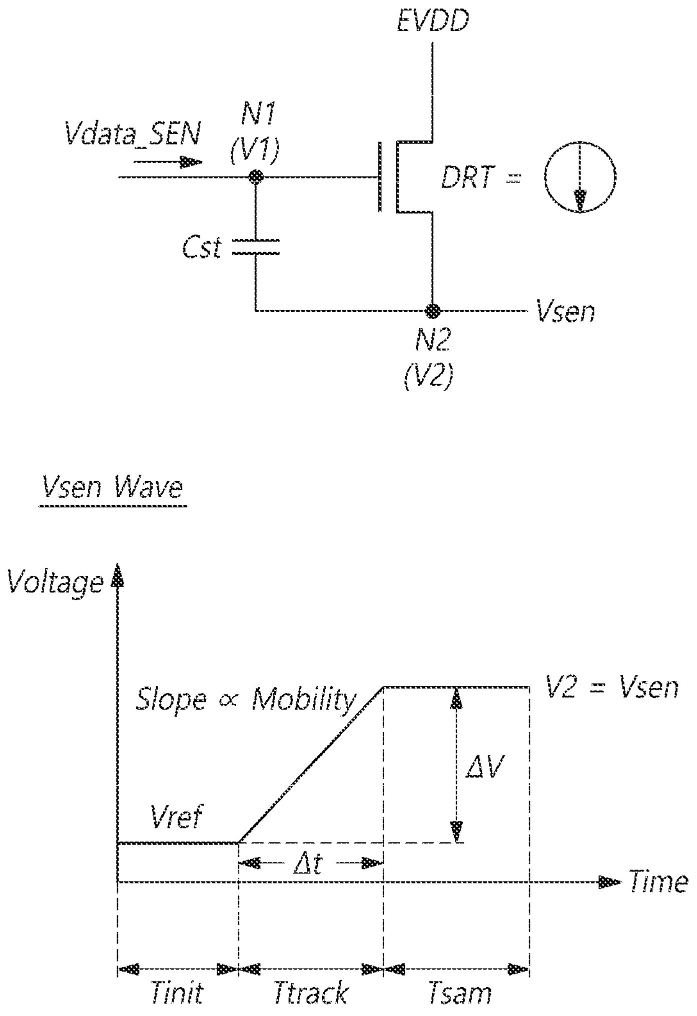

FIGS. 6A and 6B illustrate an example first sensing mode and an example second sensing mode used in the display device 100 according to aspects of the present disclosure.

Referring to FIG. 6A, the "first sensing mode" can be a sensing mode for sensing a threshold voltage, which requires a relatively long sensing time, among the characteristic values (e.g., the threshold voltage and the mobility) of the driving transistor DRT. The first sensing mode can also be referred to as a "slow sensing mode" or a "threshold voltage sensing mode."

Referring to FIG. 6B, the "second sensing mode" can be a sensing mode for sensing mobility, which requires a relatively short sensing time, among the characteristic values (e.g., the threshold voltage and the mobility) of the driving transistor DRT. The second sensing mode can also be referred to as a "fast sensing mode" or a "mobility sensing mode."

Hereinafter, sensing driving in the first sensing mode and sensing driving in the second sensing mode will be described with reference to the compensation circuit of FIG. 5, as well as FIGS. 6A and 6B.

First, sensing driving in the first sensing mode will be described with reference to FIG. 6A.

Referring to FIG. 6A, a sensing driving period of the first sensing mode can include an initialization sub-period Tinit, a tracking sub-period Ttrack, and a sampling sub-period Tsam.

The initialization sub-period Tinit of the sensing driving period in the first sensing mode can be a period for initializing the first node N1 and the second node N2 of the driving transistor DRT.

During the initialization sub-period Tinit, a voltage V1 of the first node N1 of the driving transistor DRT can be initialized to a sensing driving data voltage Vdata_SEN, and a voltage V2 of the second node N2 of the driving transistor DRT can be initialized to a sensing driving reference voltage Vref.

During the initialization sub-period Tinit, the scan transistor SCT and the sensing transistor SENT can be turned on, and the power switch SPRE can be turned on.

The tracking sub-period Ttrack of the sensing driving period in the first sensing mode can be a period for tracking a voltage V2 of the second node N2 of the driving transistor DRT containing a threshold voltage Vth of the driving transistor DRT or a shift ΔVth in the threshold voltage Vth.

During the tracking sub-period Track, the power switch SPIRE can be turned off or the sensing transistor SENT can be turned off.

Accordingly, during the tracking sub-period Ttrack, while the first node N1 of the driving transistor DRT is in a constant voltage state with the sensing driving data voltage Vdata_SEN, the second node N2 of the driving transistor DRT can be electrically floating. Accordingly, during the tracking sub-period Ttrack, the voltage V2 of the second node N2 of the driving transistor DRT can vary.

During the tracking sub-period Ttrack, the voltage V2 of the second node N2 of the driving transistor DRT can increase until the voltage V2 of the second node N2 of the driving transistor DRT contains a threshold voltage Vth of the driving transistor DRT (i.e., until the voltage V2 of the second node N2 of the driving transistor DRT reaches a saturation point at which the threshold voltage Vth of the driving transistor DRT (or a shift ΔVth in the threshold voltage Vth) is contained in the voltage V2 of the second node N2 of the driving transistor DRT).

During the initialization sub-period Tinit, a voltage difference between the first node N1 and the second node N2 of the driving transistor DRT, which has been initialized, can be greater than or equal to the threshold voltage Vth of the driving transistor DRT. Accordingly, when the tracking sub-period Ttrack is initiated, the driving transistor DRT can be turned on and allow current to flow. Thereby, when the tracking sub-period Ttrack is initiated, the voltage V2 of the second node N2 of the driving transistor DRT can increase.

During the tracking sub-period Ttrack, the voltage V2 of the second node N2 of the driving transistor DRT cannot continuously increase.

As the latter part of the tracking sub-period Ttrack progresses, an increasing width of the voltage V2 of the second node N2 of the driving transistor DRT can be reduced, and the voltage V2 of the second node N2 of the driving transistor DRT can be eventually saturated.

A saturated voltage V2 of the second node N2 of the driving transistor DRT can correspond to a difference (Vdata_SEN-Vth) between the sensing driving data voltage Vdata_SEN and the threshold voltage Vth or a difference (Vdata_SEN-ΔVth) between the sensing driving data voltage Vdata_SEN and a shift in the threshold voltage ΔVth. The threshold voltage Vth can be a negative threshold voltage (−Vth) or a positive threshold voltage (+Vth).

When the voltage V2 of the second node N2 of the driving transistor DRT is saturated, the sampling sub-period Tsam can be initiated.

The sampling sub-period Tsam of the sensing driving period in the first sensing mode can be a period for measuring a voltage (i.e., Vdata_SEN-Vth, Vdata_SEN-ΔVth) containing the threshold voltage Vth of the driving transistor DRT or a shift in the threshold voltage Vth.

During the sampling sub-period Tsam of the sensing driving period in the first sensing mode, a voltage of the reference voltage line RVL can be sensed by the analog-to-digital converter ADC. The voltage of the reference voltage line RVL can correspond to the voltage of the second node N2 of the driving transistor DRT, and correspond to a charging voltage of a line capacitor Crvl formed on the reference voltage line RVL.

During the sampling sub-period Tsam, a voltage Vsen sensed by the analog-to-digital converter ADC can be the voltage (Vdata_SEN-Vth) resulting from subtracting the threshold voltage Vth from the sensing driving data voltage Vdata_SEN or the voltage (Vdata_SEN-ΔVth) resulting from subtracting the shift ΔVth in threshold voltage from the sensing driving data voltage Vdata_SEN. The Vth can be a positive threshold voltage or a negative threshold voltage.

During the tracking sub-period Ttrack of the sensing driving period in the first sensing mode, a saturation time Tsat taken until the voltage V2 of the second node N2 of the driving transistor DRT increases and then reaches saturation can be a time period of the tracking sub-period Ttrack of the sensing driving period in the first sensing mode, and be a time taken until the threshold voltage Vth or threshold voltage shift ΔVth of the driving transistor DRT is contained in the voltage (V2=Vdata_SEN-Vth, or V2=Vdata_SEN-ΔVth) of the second node N2 of the driving transistor DRT.

This saturation time Tsat can occupy most of the entire time period of the sensing driving period in the first sensing mode. Thus, in the case of the first sensing mode, it can take quite a long time (saturation time Tsat) for the voltage V2 of the second node N2 of a driving transistor DRT to reach saturation after increasing.

As described above, the sensing driving method for sensing the threshold voltage of a driving transistor DRT (i.e., the first sensing mode) is sometimes referred to as a slow mode since a long saturation time Tsat is required until the voltage of the second node N2 of the driving transistor DRT contains the threshold voltage of the driving transistor DRT.

Next, sensing driving in the second sensing mode will be described with reference to FIG. 6B.

Referring to FIG. 6B, a sensing driving period of the second sensing mode can include an initialization sub-period Tinit, a tracking sub-period Ttrack, and a sampling sub-period Tsam.

The initialization sub-period Tinit of the sensing driving period in the second sensing mode can be a period for initializing the first node N1 and the second node N2 of the driving transistor DRT.

During the initialization sub-period Tinit, the scan transistor SCT and the sensing transistor SENT can be turned on, and the power switch SPRE can be turned on.

During the initialization sub-period Tinit, a voltage V1 of the first node N1 of the driving transistor DRT can be initialized to a sensing driving data voltage Vdata_SEN, and a voltage V2 of the second node N2 of the driving transistor DRT can be initialized to a sensing driving reference voltage Vref.

The tracking sub-period Ttrack of the sensing driving period in the second sensing mode can be a period for changing the voltage V2 of the second node N2 of the driving transistor DRT for a preset tracking time Δt until the voltage V2 of the second node N2 of the driving transistor DRT reaches a voltage containing mobility of the driving transistor DRT or a shift in the mobility.

During the tracking sub-period Ttrack, the preset tracking time Δt can be set to a relatively short time. Therefore, it can be difficult for the voltage V2 of the second node N2 of the driving transistor DRT to contain the threshold voltage Vth of the driving transistor DRT for a short tracking time Δt. To address this issue, the voltage V2 of the second node N2 of the driving transistor DRT can be changed enough to determine the mobility of the driving transistor DRT for such a short tracking time Δt.

Accordingly, the second sensing mode can be a sensing driving method for sensing the mobility of a driving transistor DRT.

During the tracking sub-period Ttrack, as the power switch SPRE is turned off or the sensing transistor SENT is turned off, the second node N2 of the driving transistor DRT can be electrically floating.

During the tracking sub-period Ttrack, the scan transistor SCT can be turned off by a scan signal SC of a turn-on level voltage, and the first node N1 of the driving transistor DRT can be also electrically floating.

During the initialization sub-period Tinit, a voltage difference between the first node N1 and the second node N2 of the driving transistor DRT, which has been initialized, can be greater than or equal to the threshold voltage Vth of the driving transistor DRT. Accordingly, when the tracking sub-period Ttrack is initiated, the driving transistor DRT can be turned on and allow current to flow.

The voltage difference between the first node N1 and the second node N2 of the driving transistor DRT can be denoted by Vgs when the first node N1 and the second node N2 of the driving transistor DRT are the gate node and the source node, respectively.

Accordingly, during the tracking sub-period Ttrack, the voltage V2 of the second node N2 of the driving transistor DRT can increase. In this situation, the voltage V1 of the first node N1 of the driving transistor DRT can also increase.

During the tracking sub-period Ttrack, an increasing rate of the voltage V2 of the second node N2 of the driving transistor DRT can vary depending on the current capability (i.e., mobility) of the driving transistor DRT. As the driving transistor DRT has greater current capability (mobility), the voltage V2 of the second node N2 of the driving transistor DRT can increase more steeply.

After the tracking sub-period Ttrack progresses for the preset tracking time Δt, for example, after the voltage V2 of the second node N2 of the driving transistor DRT increases for the preset tracking time Δt, the sampling sub-period Tsam can proceed.

During the tracking sub-period Ttrack, an increasing rate of the voltage V2 of the second node N2 of the driving transistor DRT can corresponds to an amount of voltage variance ΔV in the second node N2 of the driving transistor DRT during the preset tracking time Δt. The amount of voltage variance ΔV in the second node N2 of the driving transistor DRT can correspond to an amount of voltage variance in the reference voltage line RVL.

After the tracking sub-period Ttrack progresses for the preset tracking time Δt, the sampling sub-period Tsam can be initiated. During the sampling sub-period Tsam, the sampling switch SAM can be turned on, and the reference voltage line RVL and the analog-to-digital converter ADC can be electrically connected.

The analog-to-digital converter ADC can sense a voltage of the reference voltage line RVL. The voltage Vsen sensed by the analog-to-digital converter ADC can be a voltage (Vref+ΔV) increased from the reference voltage Vref by the amount of voltage variance ΔV for the preset tracking time Δt.

The voltage Vsen sensed by the analog-to-digital converter ADC can be the voltage of the reference voltage line RVL, and be the voltage of the second node N2 electrically connected to the reference voltage line RVL through the sensing transistor SENT.

In the sampling sub-period Tsam of the sensing driving period in the second sensing mode, the voltage Vsen sensed by the analog-to-digital converter ADC can vary depending on the mobility of the driving transistor DRT. As the driving transistor DRT has higher mobility, the sensing voltage Vsen can increase. As the driving transistor DRT has lower mobility, the sensing voltage Vsen can decrease.

As described above, the sensing driving method for sensing the mobility of a driving transistor DRT (i.e., the second sensing mode) is sometimes referred to as a fast mode since this method can be executed by changing the voltage of the second node N2 of the driving transistor DRT for such a short period of time Δt.

Referring to FIG. 6A, the compensator COMP can detect a threshold voltage Vth or a shift in the threshold voltage Vth of a driving transistor DRT of a corresponding subpixel SP based on sensing data corresponding to a voltage Vsen sensed through the first sensing mode, determine a threshold voltage compensation value for reducing or eliminating a difference in threshold voltages between driving transistors DRT, and store the acquired threshold voltage compensation value in the memory MEM.

Referring to FIG. 6B, the compensator COMP can detect mobility or a shift in the mobility of a driving transistor DRT of a corresponding subpixel SP based on sensing data corresponding to a voltage Vsen sensed through the second sensing mode, determine a mobility compensation value for reducing or eliminating a difference in mobilities between driving transistors DRT, and store the acquired mobility compensation value in the memory MEM.

The controller 140 can modify data Data based on the threshold voltage compensation value Φ and mobility compensation value a stored in the memory MEM, and supply the modified data (Data'=α×Data+Φ) to the data driving circuit 120.

The data driving circuit 120 can convert the data (Data'=α×Data+Φ) supplied by the controller 140 into a data voltage Vdata, and supply the converted data voltage Vdata to the corresponding subpixel SP. The data voltage Vdata supplied to the corresponding subpixel SP can be a data voltage Vdata capable of reducing a difference in threshold voltages and a difference in mobilities.

As described above, since a long sensing time is required for threshold voltage sensing, and a short sensing time is sufficient for mobility sensing, therefore, the threshold voltage sensing can be performed in the first sensing mode corresponding to the slow sensing mode, and the mobility sensing can be performed in the second sensing mode corresponding to the fast sensing mode.

Figure 7:
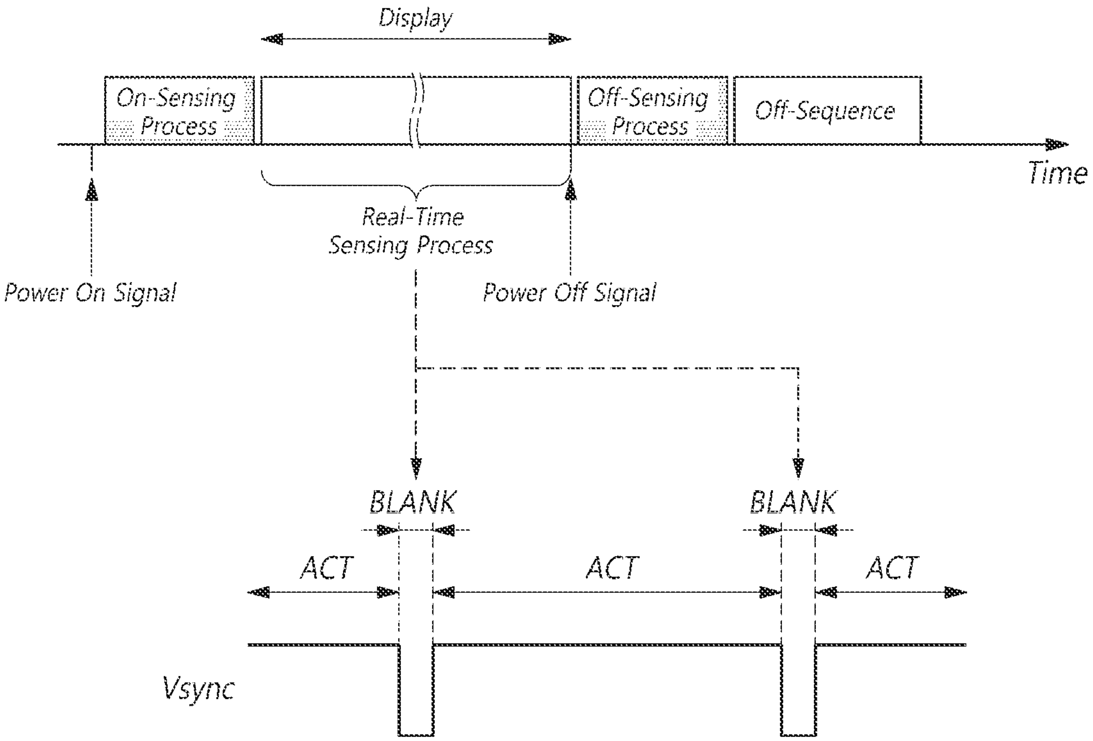
FIG. 7 illustrates various example sensing driving timings of the display device according to aspects of the present disclosure.

FIG. 7 illustrates various sensing driving timings (various sensing periods) of the display device 100 according to aspects of the present disclosure.

Referring to FIG. 7, in an embodiment, when a power-on signal is generated, the display device 100 according to aspects of the present disclosure can sense respective characteristic values of corresponding driving transistors of all or one or more of a plurality subpixel SP disposed in the display panel 110. This sensing process can be referred to as an "on-sensing process".

In another embodiment, when a power-off signal is generated, before an off-sequence such as switch-off of power proceeds, the display device 100 can also sense respective characteristic values of corresponding driving transistors of all or one or more of the plurality subpixels SP disposed in the display panel 110. This sensing process can be referred to as an "off-sensing process".

In further another embodiment, while display driving is being performed after the power-on signal is generated and before the power-off signal is generated, the display device 100 can also sense respective characteristic values of corresponding driving transistors of all or one or more of the plurality subpixels SP. This sensing process can be referred to as a "real-time sensing process".

The real-time sensing process can be performed every blank period BLANK between active periods ACT based on a vertical synchronization signal Vsync.

As discussed above, a relatively short period of time can be sufficient for sensing the mobility of a driving transistor DRT, and therefore, mobility sensing can be performed in the second sensing mode, which is the faster sensing mode among the two sensing modes.

Since a relatively short period of time is sufficient for mobility sensing, mobility sensing can be performed using any one of the on-sensing process, the off-sensing process, and the real-time sensing process. For example, mobility sensing, which can be performed in the second sensing mode, can be performed in the real-time sensing process that can reflect a variance in mobility in real time while the display is being driving. Accordingly, mobility sensing can be performed every blank period BLANK while the display is being driven.

As discussed above, threshold voltage sensing of a driving transistor DRT can require a relatively long sensing time including a long saturation time Vsat. Accordingly, threshold voltage sensing can be performed in the first sensing mode corresponding to the slow sensing mode among the two sensing modes.

Since threshold voltage sensing has a relatively long sensing time, threshold voltage sensing is desired to be performed using timing that does not interfere with the user's viewing. Accordingly, threshold voltage sensing of a driving transistor DRT can be performed after a power-off signal is generated by an input event from a user, and the like. For example, the threshold voltage sensing can be performed in a period during which the display device 100 is not driven for display image or a situation in which the user has no intention of viewing. In this manner, threshold voltage sensing can be performed using the off-sensing process.

Figure 8:
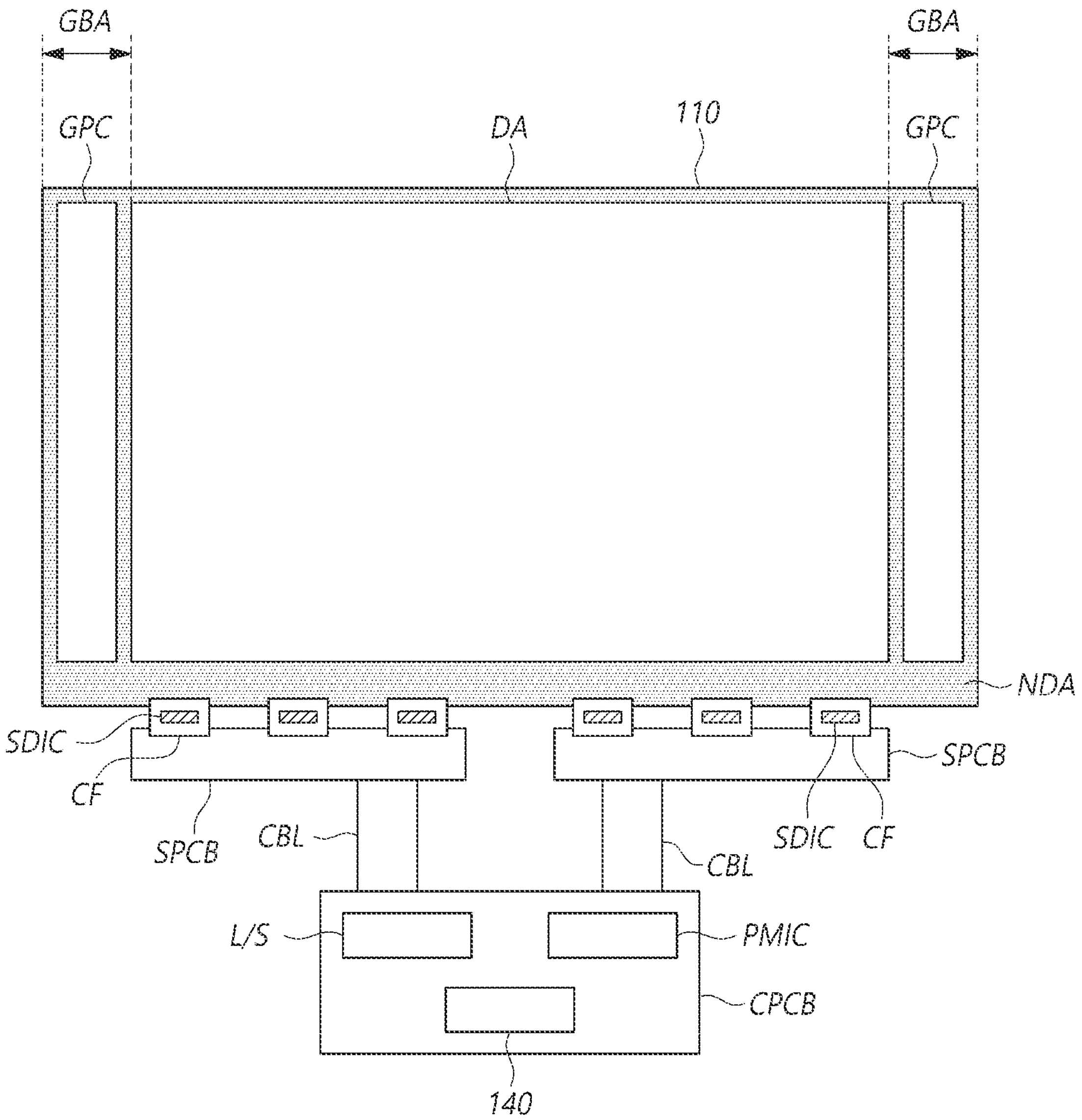
FIG. 8 illustrates another example system configuration of the display device according to aspects of the present disclosure.

FIG. 8 illustrates another example system configuration of the display device according to aspects of the present disclosure.

Referring to FIG. 8, the display panel 110 can include a display area DA in which one or more images can be displayed and a non-display area NDA in which an image is not displayed.

According to the configuration of FIG. 8, a data driving circuit 120 (e.g., the data driving circuit 120 discussed above with reference to FIG. 1) can include a plurality of source driver integrated circuits SDIC and can be implemented using the chip-on-film (COF) technique. For example, each of the plurality of source driver integrated circuits SDIC can be mounted on a corresponding circuit film CF connected to the non-display area NDA of the display panel 110. In this example, the circuit film CF can be also referred to as a flexible printed circuit.

In an embodiment, in the configuration of FIG. 8, one or more gate driving circuits 130 can be implemented using the gate-in-panel (GIP) technique. Hereinafter, a gate driving circuit 130 implemented using the gate-in-panel (GIP) technique can be also referred to as a gate driving panel circuit GPC.

One or more gate driving panel circuit GPC can be located in the non-display area NDA of the display panel 110. In an embodiment, in the configuration of FIG. 8, one or more gate driving panel circuits GPC can be located in, and/or electrically connected to, but not limited to, one or more areas of the non-display area NDA of the display panel 110.

For example, the one or more gate driving panel circuits GPC can be located in, and/or electrically connected to, only one side or portion (e.g., a left edge, a right edge, an upper edge, or a lower edge), or two sides or portions (e.g., a left edge and a right edge, an upper edge and a lower edge, or the like) of the display panel 110. Hereinafter, two or more gate driving panel circuits GPC, which are gate driving circuits 130 configured using the GIP technique, can be disposed in the display panel 110 as shown in FIG. 8; however, for merely convenience of description, discussions related to the gate driving panel circuits GPC will be provided by restricting to one gate driving panel circuit GPC unless explicitly stated otherwise. It should be therefore understood that the scope of the present disclosure includes examples where the two or more gate driving panel circuits GPC are disposed in the display panel 110.

The display device 100 can include at least one source printed circuit board SPCB and a control printed circuit board CPCB for a circuital connection between the plurality of source driver integrated circuits SDIC and other devices or components (e.g., 140, L/S, PMIC, and the like).

At least one circuit film CF on which a corresponding source driver integrated circuit SDIC is mounted can be connected to a corresponding one of the at least one source printed circuit board SPCB. For example, a first side of each of the at least one circuit film CF on which a corresponding source driver integrated circuit SDIC is mounted can be electrically connected to the display panel 110, and a second opposing side thereof can be electrically connected to the source printed circuit board SPCB.

A controller 140 (e.g., the controller 140 discussed above with reference to FIG. 1) and a power management integrated circuit PMIC can be mounted on the control printed circuit board CPCB.

The controller 140 can perform an overall control function related to the driving of the display panel 110 and control operations of the plurality of source driver integrated circuits SDIC and the gate driving panel circuit GPC.

The power management integrated circuit PMIC can supply various types of voltages or currents to the plurality of source driver integrated circuits SDIC, the gate driving panel circuit GPC, and the like, or control the various types of voltages or currents to be supplied.

A circuital connection between the at least one source printed circuit board SPCB and the control printed circuit board CPCB can be performed through at least one connection cable CBL. For example, the connection cable CBL can be one of a flexible printed circuit (FPC) and a flexible flat cable (FFC).

In an embodiment, the at least one source printed circuit board SPCB and the control printed circuit board CPCB can be integrated into one printed circuit board.

In an embodiment, the display device 100 according to aspects of the present disclosure can further include at least one level shifter L/S for adjusting a voltage level of a signal. For example, the level shifter L/S can be disposed on the control printed circuit board CPCB or the at least one source printed circuit board SPCB.

In an embodiment, in the display device 100 according to aspects of the present disclosure, the level shifter L/S can output signals needed for gate driving to the gate driving panel circuit GPC, which is the gate driving circuit 130 configured using the GIP technique.

For example, the power management integrated circuit PMIC can supply a signal to the level shifter L/S. The level shifter L/S can adjust a voltage level of the signal supplied by the power management integrated circuit PMIC. The signal whose voltage level has been adjusted by the level shifter L/S can be supplied to the gate driving panel circuit GPC.

For example, the level shifter L/S can supply a plurality of clock signals with different phases to the gate driving panel circuit GPC. The gate driving panel circuit GPC can generate a plurality of gate signals (e.g., at least one scan signal SC, at least one sensing signal SE, and the like) based on the plurality of clock signals supplied by the level shifter L/S, and output the generated gate signals to a plurality of gate lines (e.g., at least one scan signal line SCL, at least one sensing signal line SENL, and the like).

The non-display area NDA of the display panel 110 can include one or more gate bezel areas GBA. FIG. 8 illustrates two or more gate bezel areas GBA disposed in the non-display area NDA, but for merely convenience of description, discussions related to the gate bezel areas GBA will be provided by restricting to one gate bezel area GBA unless explicitly stated otherwise. It should be therefore understood that the scope of the present disclosure includes examples where the two or more gate bezel areas GBA are disposed in the non-display area NDA. The gate bezel area GBZ can refer to an area where the gate driving panel circuit GPC, which is the gate driving circuit 130 configured using the GIP technique, and several types of lines connected to the gate driving panel circuit GPC are disposed.

The several types of lines connected to the gate driving panel circuit GPC can include one or more clock lines, one or more high level gate voltage lines, and one or more low level gate voltage lines, and the like.

Hereinafter, discussions are provided on an example configuration of the gate driving panel circuit GPC and an example structure of the gate bezel area GBA where the gate driving panel circuit GPC is disposed in the display device 100 according to aspects of the present disclosure.

Figure 9A:
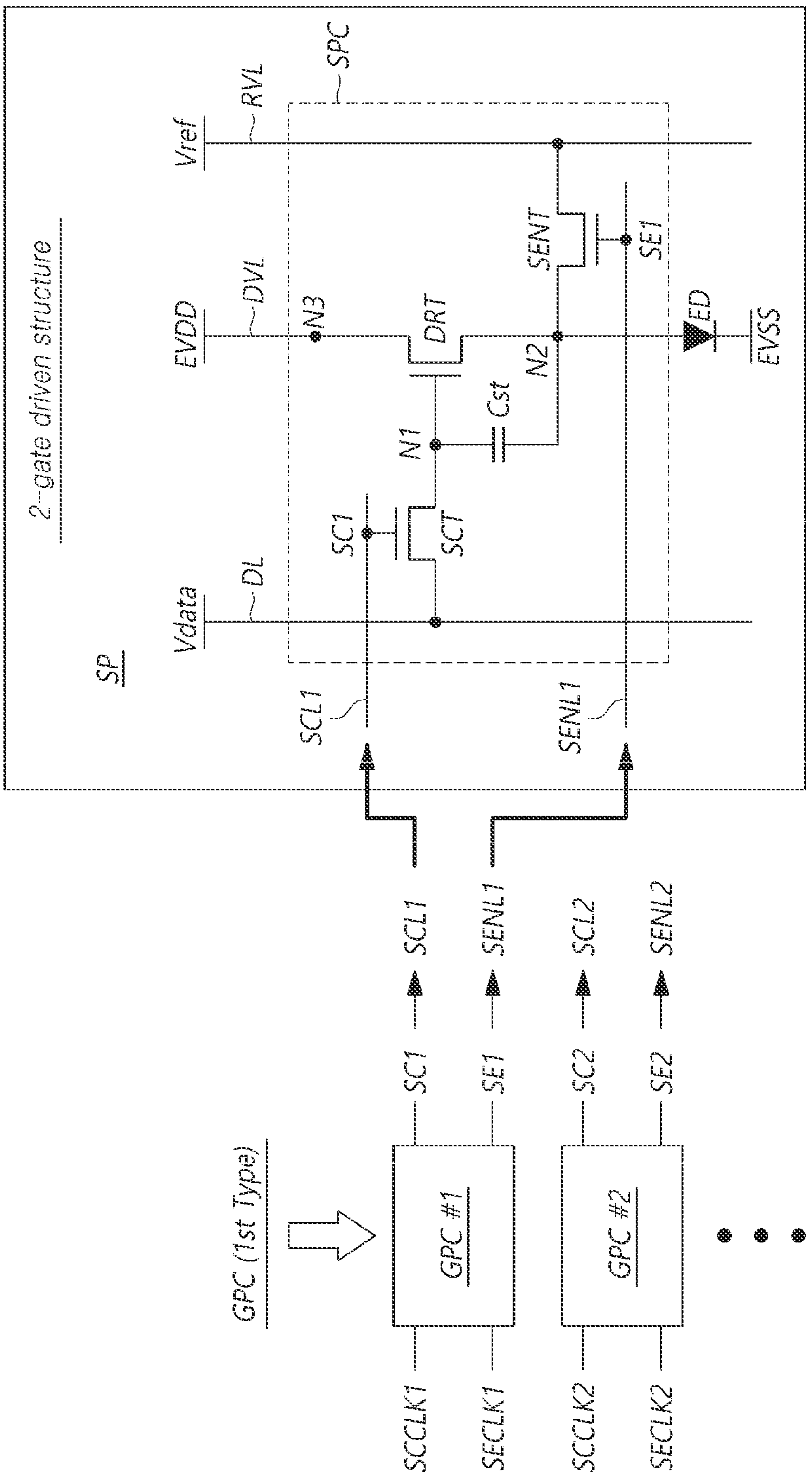
FIG. 9A illustrates inputs and outputs of an example gate driving panel circuit in an example where the gate driving panel circuit is configured with a first type in the display device according to aspects of the present disclosure.

FIG. 9A illustrates inputs and outputs of an example gate driving panel circuit GPC in an example where the gate driving panel circuit GPC is configured with a first type (which can be referred to as a "first type of gate driving panel circuit GPC") in the display device 100 according to aspects of the present disclosure.

Referring to FIG. 9A, in examples where each subpixel SP disposed in the display panel 110 has the two-gate driven structure (see FIG. 3A), the gate driving panel circuit GPC can be configured with the first type.

In the example where the first type of gate driving panel circuit GPC is applied, a first gate driving panel circuit GPC #1 included in the gate driving panel circuit GPC can receive a first scan clock signal SCCLK1 and a first sensing clock signal SECLK1, and output a first scan signal SC1 and a first sensing signal SE1.

The first scan clock signal SCCLK1 and the first sensing clock signal SECLK1 can be output by a level shifter L/S.

The first scan signal SC1 and the first sensing signal SE1 can be applied to a first scan signal line SCL1 and a first sensing signal line SENL1, respectively.

In the example where the first type of gate driving panel circuit GPC is applied, a second gate driving panel circuit GPC #2 included in the gate driving panel circuit GPC can receive a second scan clock signal SCCLK2 and a second sensing clock signal SECLK2, and output a second scan signal SC2 and a second sensing signal SE2.

The second scan clock signal SCCLK2 and the second sensing clock signal SECLK2 can be output by a level shifter L/S.

The second scan signal SC2 and the second sensing signal SE2 can be applied to a second scan signal line SCL2 adjacent to the first scan signal line SCL1 and a second sensing signal line SENL2 adjacent to the first sensing signal line SENL1, respectively.

Figure 9B:
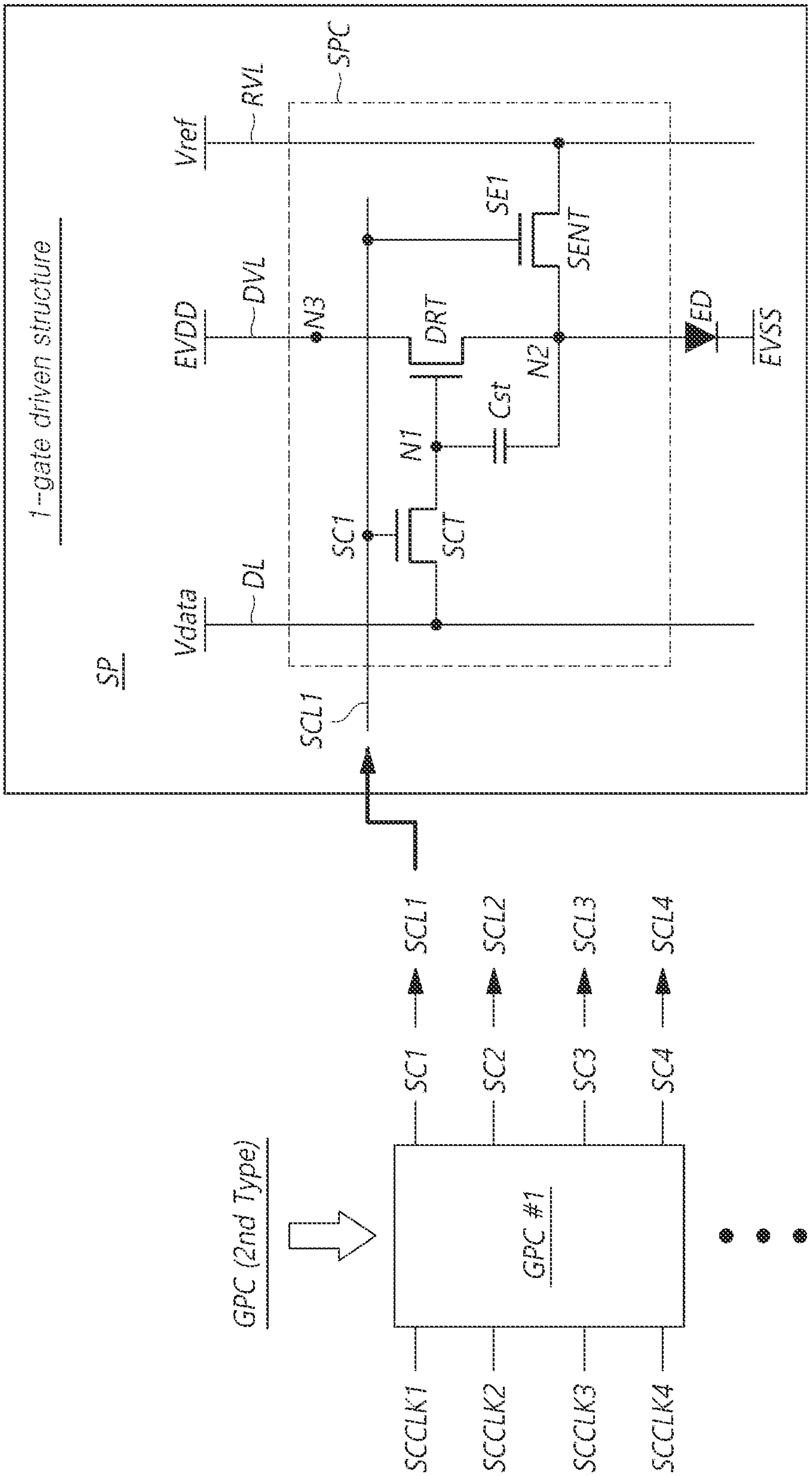
FIG. 9B illustrates inputs and outputs of an example gate driving panel circuit in an example where the gate driving panel circuit is configured with a second type in the display device according to aspects of the present disclosure.

FIG. 9B illustrates inputs and outputs of an example gate driving panel circuit GPC in an example where the gate driving panel circuit GPC is configured with a second type (which can be referred to as a "second type of gate driving panel circuit GPC") in the display device 100 according to aspects of the present disclosure.

Referring to FIG. 9B, in examples where each subpixel SP disposed in the display panel 110 has the one-gate driven structure (see FIG. 3B), the gate driving panel circuit GPC can be configured with the second type.

In the example where the second type of gate driving panel circuit GPC is applied, a first gate driving panel circuit GPC1 included in the gate driving panel circuit GPC can receive a first scan clock signal SCCLK1, a second scan clock signal SCCLK2, a third scan clock signal SCCLK3, and a fourth scan clock signal SCCLK4, and output a first scan signal SC1, a second scan signal SC2, a third scan signal SC3, and a fourth scan signal SC4.

The first scan clock signal SCCLK1, the second scan clock signal SCCLK2, the third scan clock signal SCCLK3, and the fourth scan clock signal SCCLK4 can be output by a level shifter L/S.

The first scan signal SC1 can be applied to a first scan signal line SCL1. The second scan signal SC2, the third scan signal SC3, and the fourth scan signal SC4 respectively can be applied to a second scan signal line SCL2, a third scan signal line SCL3, and a fourth scan signal line SCL4, which are adjacent to the first scan signal line SCL1.

Figure 10:
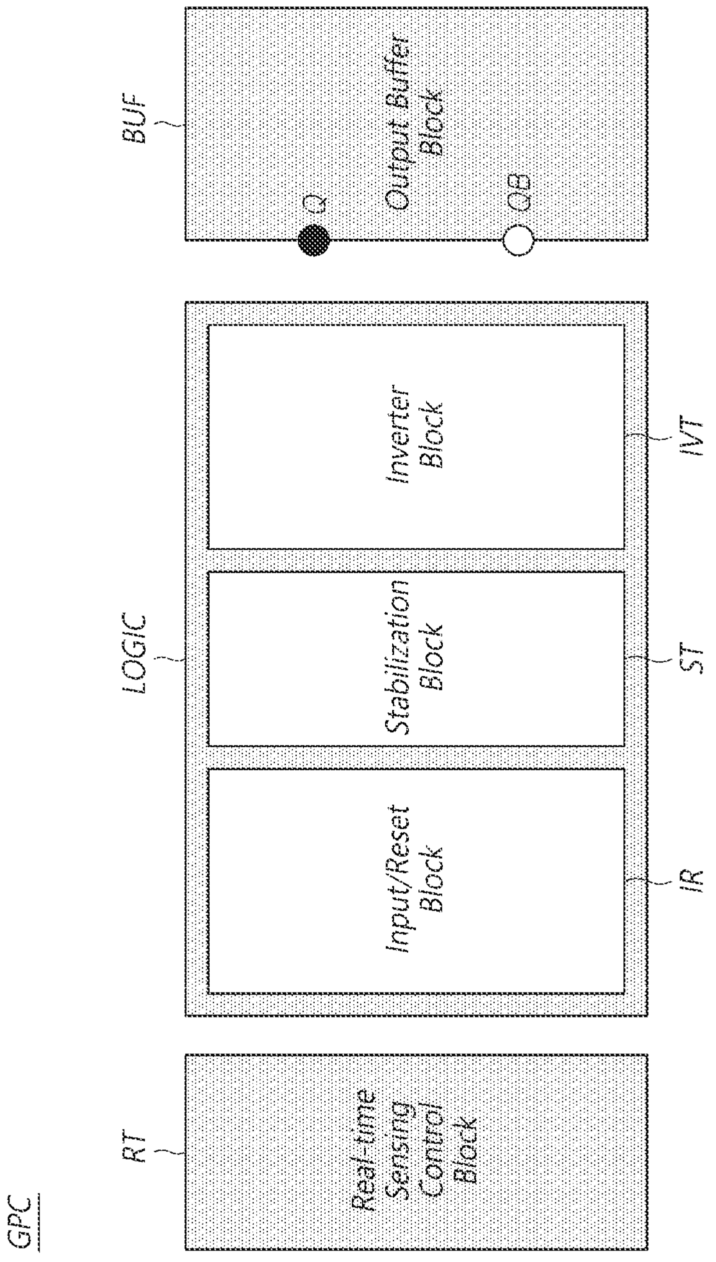
FIG. 10 illustrates an example system configuration of a gate driving panel circuit in the display device according to aspects of the present disclosure.

FIG. 10 illustrates an example system configuration of a gate driving panel circuit GPC (e.g., the gate driving panel circuit in FIG. 9) in the display device 100 according to aspects of the present disclosure.

Referring to FIG. 10, the gate driving panel circuit GPC can include an output buffer block BUF, a logic block LOGIC, and a real-time sensing control block RT.

Referring to FIG. 10, the output buffer block BUF can be configured to output two or more gate signals.

In the example where the first type of gate driving panel circuit GPC is applied, the output buffer block BUF can output at least one scan signal SC and at least one sensing signal SE.

In the example where the first type of gate driving panel circuit GPC is applied, a subpixel SP can have the two-gate driven structure as illustrated in FIG. 3A.

In the example where the second type of gate driving panel circuit GPC is applied, the output buffer block BUF can output two or more scan signals SC.

In the example where the second type of gate driving panel circuit GPC is applied, a subpixel SP can have the one-gate driven structure as illustrated in FIG. 3B.

The output buffer block BUF can be controlled depending on respective voltage values or voltage levels of a Q node and a QB node. The operation and output of the output buffer block BUF can vary depending on the voltage values or voltage levels of the Q node and QB node.

The Q node and QB node can have different voltage levels. For example, during a first period, when a voltage of the Q node is a high level voltage, a voltage of the QB node can be a low level voltage. During a second period before or after the first period, when a voltage of the Q node is a low level voltage, a voltage of the QB node can be a high level voltage.

The logic block LOGIC can be a circuit block configured to control the operation of the output buffer block BUF and implement the operation of a shift register. The logic block LOGIC can control voltages of the Q node and QB node to control the operation of the output buffer block BUF.

The logic block LOGIC can include an input and reset block IR, a stabilization block ST, an inverter block IVT, and the like.

The input and reset block IR can be a circuit block configured to control charging and discharging of the Q node. The inverter block IVT can be configured to control an electrical value (or level) of the Q node or the QB node such that a voltage level resulting from inverting a voltage level of the Q node becomes a voltage level of the QB node depending on a voltage of the Q node. The stabilization block ST can be configured to stabilize the Q node and the output of the gate driving panel circuit GPC depending on a voltage of the QB node during a period during which an output signal of the gate driving panel circuit GPC has a turn-off level voltage.

Each of the input and reset block IR, the stabilization block ST, and inverter block IVT can include at least one transistor.

The real-time sensing control block RT can be a circuit block configured to control the operation of the output buffer block BUF for real-time sensing driving. The real-time sensing driving can be a sensing driving performed in real time while the display is being driven, and be a sensing driving performed in each blank period BLANK between active periods ACT (see FIG. 7). The real-time sensing driving can proceed in the second sensing mode corresponding to a fast sensing mode (see FIG. 6B). The real-time sensing driving can be a sensing driving for sensing the mobility of a corresponding driving transistor DRT of each subpixel SP (see FIG. 6B).

The real-time sensing control block RT can include at least one transistor.

In the example where the first type of gate driving panel circuit GPC is applied, the real-time sensing control block RT can control voltages of the Q node and the QB node so that the output buffer block BUF can output a scan signal SC and a sensing signal SE to a subpixel SP where real-time sensing driving is performed.

In the example where the second type of gate driving panel circuit GPC is applied, the real-time sensing control block RT can control voltages of the Q node and the QB node so that the output buffer block BUF can output at least one scan signal SC to a subpixel SP where real-time sensing driving is performed.

Figure 11:
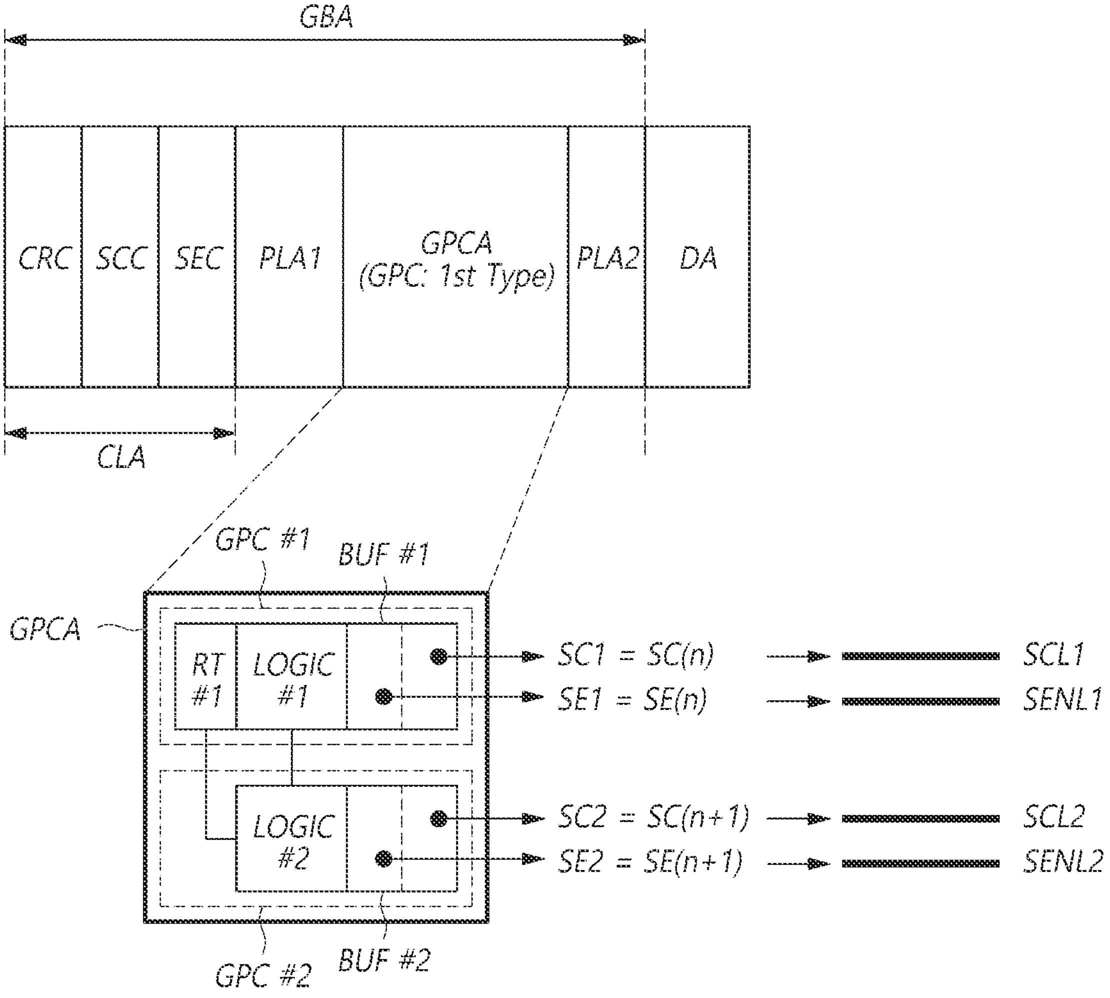
FIG. 11 illustrates, in the example where the first type of gate driving panel circuit is applied, an example configuration of a gate bezel area of the display panel according to aspects of the present disclosure.

FIG. 11 illustrates, in the example where the first type of gate driving panel circuit GPC is applied, an example configuration of the gate bezel area GBA of the display panel 110 according to aspects of the present disclosure.

Referring to FIG. 11, in one or more embodiments, the gate bezel area GBA of the display panel 110 can include a clock signal line area CLA, a first power line area PLA1, a gate driving panel circuit area GPCA, a second power line area PLA2, and the like.

The gate driving panel circuit area GPCA can be an area in which the first type of gate driving panel circuit GPC is disposed. The first type of gate driving panel circuit GPC can output scan signals SC and sensing signals SE to be supplied to subpixels SP having the two-gate driven structure.

In an embodiment, several types of lines for supplying power, voltage, and signals to the gate driving panel circuit GPC can be disposed around the gate driving panel circuit area GPCA. For example, the clock signal line area CLA, the first power line area PLA1, and the second power line area PLA2 can be disposed around the gate driving panel circuit area GPCA of the gate bezel area GBA, For example, the clock signal line area CLA and the first power line area PLA1 can be located on a first side of the gate driving panel circuit area GPCA, and the second power line area PLA2 can be located on a second opposing side of the gate driving panel circuit area GPCA.

For example, the gate driving panel circuit area GPCA can be located on a first side of the second power line area PLA2, and the display area DA can be located on a second opposing side of the second power line area PLA2.

The clock signal line area CLA can be an area in which clock signal lines are disposed for delivering several types of clock signals to the gate driving panel circuit GPC.

The first power line area PLA1 can be an area in which at least one gate high voltage line is disposed for delivering at least one gate high voltage to the gate driving panel circuit GPC.

In an embodiment, at least one control signal line for delivering at least one control signal to the gate driving panel circuit GPC can be further disposed in the first power line area PLA1. For example, the at least one control signal can include at least one of a start signal, a reset signal, and a line selection signal.

The second power line area PLA2 can be an area in which at least one gate low voltage line is disposed for delivering at least one gate low voltage to the gate driving panel circuit GPC.

In the example where the first type of gate driving panel circuit GPC is applied, the clock signal line area CLA can include a carry clock signal line area CRC, a scan clock signal line area SCC, and a sensing clock signal line area SEC.

The carry clock signal line area CRC can be an area in which carry clock signal lines are disposed for delivering carry clock signals to the gate driving panel circuit GPC.

The scan clock signal line area SCC can be an area in which scan clock signal lines are disposed for delivering scan clock signals to the gate driving panel circuit GPC.

The sensing clock signal line area SEC can be an area in which sensing clock signal lines are disposed for delivering sensing clock signals to the gate driving panel circuit GPC.

An order in which the carry clock signal line area CRC, the scan clock signal line area SCC, and the sensing clock signal line area SEC are located can be set in various orders (e.g., CRC-SCC-SEC, SCC-CRC-SEC, SCC-SEC-CRC, SEC-SCC-CRC, or the like).

For example, among the carry clock signal line area CRC, the scan clock signal line area SCC, and the sensing clock signal line area SEC, the scan clock signal line area SCC can be located between the carry clock signal line area CRC and the sensing clock signal line area SEC, and the carry clock signal line area CRC can be located further away from the display area DA or the gate driving panel circuit area GPCA than the sensing clock signal line area SEC.

Referring to FIG. 11, in the example where the first type of gate driving panel circuit GPC is applied, the gate driving panel circuit GPC disposed in the gate driving panel circuit area GPCA can include a first gate driving panel circuit GPC #1 (e.g., the first gate driving panel circuit GPC #1 of FIG. 9A) and a second gate driving panel circuit GPC #2 (e.g., the second gate driving panel circuit GPC #2 of FIG. 9A). Each of the first gate driving panel circuit GPC #1 and the second gate driving panel circuit GPC #2 can have a separate Q node and a separate QB node.

The first gate driving panel circuit GPC #1 can include a first output buffer block BUF #1, a first logic block LOGIC #1, and a first real-time sensing control block RT #1.

The first output buffer block BUF #1 can be configured to output a first scan signal SC1 and a first sensing signal SE1 respectively to a first scan signal line SCL1 and a first sensing signal line SENL1 connected to a first subpixel SP. For example, the first scan signal SC1 can be an n-th scan signal SC(n), and the first sensing signal SE1 can be an n-th sensing signal SE(n).

The first logic block LOGIC #1 can be configured to control operation of the first output buffer block BUF #1 by controlling respective voltages of Q and QB nodes of the first gate driving panel circuit GPC #1.

The second gate driving panel circuit GPC #2 can include only a second output buffer block BUF #2 and a second logic block LOGIC #2.

The second output buffer block BUF #2 can be configured to output a second scan signal SC2 and a second sensing signal SE2 respectively to a second scan signal line SCL2 and a second sensing signal line SENL2 connected to a second subpixel SP. For example, the second scan signal SC2 can be an (n+1)-th scan signal SC(n+1), and the second sensing signal SE2 can be an (n+1)-th sensing signal SE(n+1).

The second logic block LOGIC #2 can be configured to control operation of the second output buffer block BUF #2 by controlling respective voltages of the Q node and the QB node of the second gate driving panel circuit GPC #2.

The first real-time sensing control block RT #1 can be shared by the first gate driving panel circuit GPC #1 and the second gate driving panel circuit GPC #2. Accordingly, the size of the gate bezel area GBA can be significantly reduced.

The first real-time sensing control block RT #1 can be configured to control operation of the first output buffer block BUF #1 so that the first output buffer block BUF #1 can output a first scan signal SC1 and a first sensing signal SE1 for sensing driving to a corresponding first subpixel SP where real-time sensing driving will be performed by controlling respective voltages of the Q node and QB node of the first gate driving panel circuit GPC #1 during a first real-time sensing driving period (a first blank period).

The first real-time sensing control block RT #1 can be configured to control operation of the second output buffer block BUF #2 so that the second output buffer block BUF #2 can output a second scan signal SC2 and a second sensing signal SE2 for sensing driving to a corresponding second subpixel SP where real-time sensing driving will be performed by controlling respective voltages of the Q node and QB node of the second gate driving panel circuit GPC #2 during a second real-time sensing driving period (a second blank period), which is different from the first real-time sensing driving period (the first blank period).

At least one specific node of the first logic block LOGIC #1 and at least one specific node of the second logic block LOGIC #2 can be electrically connected to each other.

Among the first output buffer block BUF #1, the first logic block LOGIC #1, and the first real-time sensing control block RT #1, the first real-time sensing control block RT #1 can be located furthest away from the display area DA.

The gate driving panel circuit area GPCA can be disposed between the first power line area PLA1 and the second power line area PLA2.

Accordingly, at least one gate high voltage line disposed in the first power line area PLA1 and at least one gate low voltage line disposed in the second power line area PLA2 can be separated by the gate driving panel circuit GPC disposed in the gate driving panel circuit area GPCA.

According to the configuration of the power-related lines and areas discussed above, since at least one high voltage line and at least one low voltage line do not overlap with each other, one or more high voltages (e.g., GVDD, GVDD2, GVDD_o, and GVDD_e in FIG. 12) and one or more low voltages (e.g., GVSS0, GVSS1, and GVSS2 of FIG. 12) can be stabilized or stably supplied.

Figure 12:
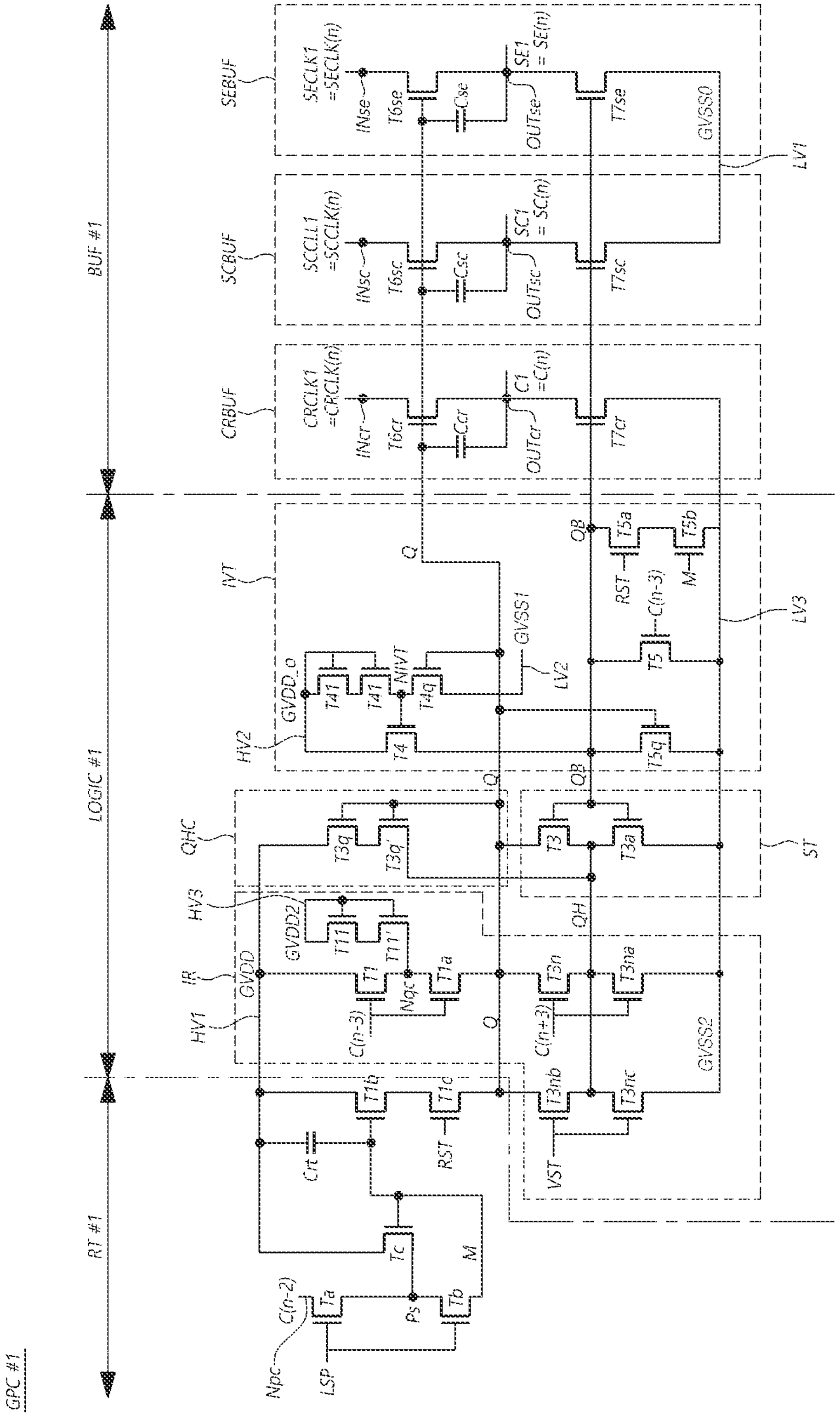
FIG. 12 illustrates, in the example where the first type of gate driving panel circuit is applied, an example first gate driving panel circuit included in the gate driving panel circuit in the display device according to aspects of the present disclosure.

FIG. 12 illustrates, in the example where the first type of gate driving panel circuit GPC is applied, an example first gate driving panel circuit GPC #1 included in the gate driving panel circuit GPC in the display device 100 according to aspects of the present disclosure.

In this implementation, the first gate driving panel circuit GPC #1 can be configured to output an odd-numbered n-th scan signal SC(n) and an odd-numbered n-th sensing signal SE(n). The n-th scan signal SC(n) can be supplied to an odd-numbered n-th scan signal line SCL, and the n-th sensing signal SE(n) can be supplied to an odd-numbered n-th sensing signal line SENL. Hereinafter, for convenience of description, the n-th scan signal SC(n) can be also referred to as a first scan signal SC1, and the n-th sensing signal SE(n) can be also referred to as a first sensing signal SE1.

Referring to FIG. 12, the first gate driving panel circuit GPC #1 can include a first output buffer block BUF #1, a first logic block LOGIC #1, and a first real-time sensing control block RT #1.

The first output buffer block BUF #1 can include a carry output buffer CRBUF, a scan output buffer SCBUF, and a sensing output buffer SEBUF.

The carry output buffer CRBUF can include a carry pull-up transistor T6*cr* and a carry pull-down transistor T7*cr*.

The carry pull-up transistor T6*cr* can be turned on or turned off depending on a voltage of a Q node, and thereby, control a connection between a carry clock node INcr to which an n-th carry clock signal CRCLK(n) is input and a carry output node OUTcr from which an n-th carry signal C(n) is output. Here, the n-th carry clock signal CRCLK(n) can also be referred to as a first carry clock signal CRCLK1, and the n-th carry signal C(n) can also be referred to as a first carry signal C1.

The gate node of the carry pull-up transistor T6*cr* can be the Q node or be electrically connected to the Q node. The source node (or drain node) of the carry pull-up transistor T6*cr* can be the carry output node OUTcr or be electrically connected to the carry output node OUTcr. The drain node (or source node) of the carry pull-up transistor T6*cr* can be the carry clock node INcr or be electrically connected to the carry clock node INcr.

When the carry pull-up transistor T6*cr* is turned on, the carry pull-up transistor T6*cr* can output the first carry signal C1 having a high level voltage using the first carry clock signal CRCLK1.

The carry output buffer CRBUF can further include a carry bootstrapping capacitor Ccr connected between the gate node and the source node (or drain node) of the carry pull-up transistor T6*cr*.

The carry pull-down transistor T7*cr* can be turned on or turned off depending on a voltage of a QB node, and thereby, control a connection between a third gate low voltage node LV3 to which a third gate low voltage GVSS2 is input and the carry output node OUTcr from which the n-th carry signal C(n) is output.

The gate node of the carry pull-down transistor T7*cr* can be the QB node or can be electrically connected to the QB node. The drain node or source node of the carry pull-down transistor T7*cr* can be the third gate low voltage node LV3 or be electrically connected to the third gate low voltage node LV3, and the source node or drain node of the carry pull-down transistor T7*cr* can be the carry output node OUTcr or be electrically connected to the carry output node OUTcr.

When the carry pull-down transistor T7*cr* is turned on, the carry pull-down transistor T7*cr* can output the first carry signal C1 having a low level voltage using the third gate low voltage GVSS2.

The scan output buffer SCBUF can be configured to output an n-th scan signal SC(n) having a turn-on level voltage or a turn-off level voltage to a scan output node OUTsc. The n-th scan signal SC(n) output to the scan output node OUTsc can be applied to a first scan signal line SCL1 electrically connected to the scan output node OUTsc.

The scan output buffer SCBUF can include a scan pull-up transistor T6*sc* and a scan pull-down transistor T7*sc*.

The scan pull-up transistor T6*sc* can be turned on or turned off depending on a voltage of the Q node, and thereby, control a connection between a scan clock node INsc to which an n-th scan clock signal SCCLK(n) is input and the scan output node OUTsc from which the n-th scan signal SC(n) is output. Here, the n-th scan clock signal SCCLK(n) can also be referred to as a first scan clock signal SCCLK1, and the n-th scan signal SC(n) can also be referred to as a first scan signal SC1.

The gate node of the scan pull-up transistor T6*sc* can be the Q node or be electrically connected to the Q node. The source node (or drain node) of the scan pull-up transistor T6*sc* can be the scan output node OUTsc or be electrically connected to the scan output node OUTsc. The drain node (or source node) of the scan pull-up transistor T6*sc* can be the scan clock node INsc or be electrically connected to the scan clock node INsc.

When the scan pull-up transistor T6*sc* is turned on, the scan pull-up transistor T6*sc* can output the first scan signal SC1 having a turn-on level voltage (e.g., a high level voltage) using the scan clock signal SCCLK to the scan output node OUTsc. The first scan signal SC1 having the turn-on level voltage (e.g., the high level voltage) output from the scan pull-up transistor T6*sc* can be applied to the first scan signal line SCL1.

The scan output buffer SCBUF can further include a scan bootstrapping capacitor Csc connected between the gate node and the source node (or drain node) of the scan pull-up transistor T6*sc*.

The scan pull-down transistor T7*sc* can be turned on or turned off depending on a voltage of the QB node, and thereby, control a connection between a first gate low voltage node LV1 to which a first gate low voltage GVSS0 is input and the scan output node OUTsc from which the n-th scan signal SC(n) is output.

The gate node of the scan pull-down transistor T7*sc* can be the QB node or can be electrically connected to the QB node. The drain node or source node of the scan pull-down transistor T7*sc* can be the first gate low voltage node LV1 or be electrically connected to the first gate low voltage node LV1. The source node or drain node of the scan pull-down transistor T7*sc* can be the scan output node OUTsc or be electrically connected to the scan output node OUTsc.

When the scan pull-down transistor T7*sc* is turned on, the scan pull-down transistor T7*sc* can output the first scan signal SC1 having a turn-off level voltage (e.g., a low level voltage) using the first gate low voltage GVSS0 to the scan output node OUTsc. The first scan signal SC1 having the turn-off level voltage (e.g., the low level voltage) output from the scan pull-down transistor T7*sc* can be applied to the first scan signal line SCL1.

The sensing output buffer SEBUF can be configured to output an n-th sensing signal SE(n) having a turn-on level voltage or a turn-off level voltage to a sensing output node OUTse. The n-th sensing signal SE(n) output to the sensing output node OUTse can be applied to a first sensing signal line SENL1 electrically connected to the sensing output node OUTse.

The sensing output buffer SEBUF can include a sensing pull-up transistor T6*se* and a sensing pull-down transistor T7*se*.

The sensing pull-up transistor T6*se* can be turned on or turned off depending on a voltage of the Q node, and thereby, control a connection between a sensing clock node INse to which an n-th sensing clock signal SECLK(n) is input and the sensing output node OUTse from which the n-th sensing signal SE(n) is output. Here, the n-th sensing clock signal SECLK(n) can also be referred to as a first sensing clock signal SECLK1, and the n-th sensing signal SE(n) can also be referred to as a first sensing signal SE1.

The gate node of the sensing pull-up transistor T6*se* can be the Q node or be electrically connected to the Q node. The source node (or drain node) of the sensing pull-up transistor T6*se* can be the sensing output node OUTse or be electrically connected to the sensing output node OUTse. The drain node (or source node) of the sensing pull-up transistor T6*se* can be the sensing clock node INse or be electrically connected to the sensing clock node INse.

When the scan pull-up transistor T6*se* is turned on, the scan pull-up transistor T6*se* can output the first sensing signal SE1 having a turn-on level voltage (e.g., a high level voltage) using the sensing clock signal SECLK to the sensing output node OUTse. The first sensing signal SE1 having the turn-on level voltage (e.g., the high level voltage) output from the sensing pull-up transistor T6*se* can be applied to the first sensing signal line SENL1.

The sensing output buffer SEBUF can further include a sensing bootstrapping capacitor Cse connected between the gate node and the source node (or drain node) of the sensing pull-up transistor T6*se*.

The sensing pull-down transistor T7*se* can be turned on or turned off depending on a voltage of the QB node, and thereby, control a connection between the first gate low voltage node LV1 to which the first gate low voltage GVSS0 is input and the sensing output node OUTse from which the n-th sensing signal SE(n) is output.

The gate node of the sensing pull-down transistor T7*se* can be the QB node or can be electrically connected to the QB node. The drain node or source node of the sensing pull-down transistor T7*se* can be the first gate low voltage node LV1 or be electrically connected to the first gate low voltage node LV1. The source node (or drain node) of the sensing pull-down transistor T7*se* can be the sensing output node OUTse or be electrically connected to the sensing output node OUTse.

When the sensing pull-down transistor T7*se* is turned on, the sensing pull-down transistor T7*se* can output the first sensing signal SE1 having a turn-off level voltage (e.g., a low level voltage) using the first gate low voltage GVSS0 to the sensing output node OUTse. The first sensing signal SE1 having the turn-off level voltage (e.g., the low level voltage) output from the sensing pull-down transistor T7*se* can be applied to the first sensing signal line SENL1.

The respective gate nodes of the carry pull-up transistor T6*cr*, the scan pull-up transistor T6*sc*, and the sensing pull-up transistor T6*se* included in the first output buffer block BUF #1 can be electrically connected to each other.

The Q node can be shared by the carry output buffer CRBUF, the scan output buffer SCBUF, and the sensing output buffer SEBUF included in the first output buffer block BUF #1. The Q node can be electrically connected to the gate node of the carry pull-up transistor T6*cr*, the gate node of the scan pull-up transistor T6*sc*, and the gate node of the sensing pull-up transistor T6*se*. This structure can also be referred to as a "Q node sharing structure."

The respective gate nodes of the carry pull-down transistor T7*cr*, the scan pull-down transistor T7*sc*, and the sensing pull-down transistor T7*se* included in the first output buffer block BUF #1 can be electrically connected to each other.

The QB node can be shared by the carry output buffer CRBUF, the scan output buffer SCBUF, and the sensing output buffer SEBUF included in the first output buffer block BUF #1. The Q node can be electrically connected to the gate node of the carry pull-down transistor T7*cr*, the gate node of the scan pull-down transistor T7*sc*, and the gate node of the sensing pull-down transistor T7*se*.

The first logic block LOGIC #1 can be a circuit block configured to control voltages of the Q node and QB node to control operation of the first output buffer block BUF #1, and include an input and reset block IR, a stabilization block ST, and an inverter block IVT.

The input and reset block IR can be a circuit block configured to control charging and discharging of the Q node, and include a Q node charging block connected between a first gate high voltage node HV1 and the Q node and a Q node discharging block connected between the Q node and the third gate low voltage node LV3. For example, a first gate high voltage GVDD can be input to the first gate high voltage node HV1. The third gate low voltage GVSS2 can be input to the third gate low voltage node LV3.

To cause the Q node to charge, the Q node charging block of the input and reset block IR can include at least one Q node charging transistor, which can be turned on or turned off by an (n−3)-th carry signal C(n−3) and thereby, control a connection between the first gate high voltage node HV1 and the Q node.

For example, the Q node charging block of the input and reset block IR can include a first Q node charging transistor T1 and a second Q node charging transistor T1*a* connected in series between the first gate high voltage node HV1 and the Q node.

The gate node of the first Q node charging transistor T1 and the gate node of the second Q node charging transistor T1*a* can be electrically connected to each other, and receive the (n−3)-th carry signal C(n−3) together.

The first Q node charging transistor T1 can be connected between the first gate high voltage node HV1 and a Q node charging control node Nqc, and the second Q node charging transistor T1*a* can be connected between the Q node charging control node Nqc and the Q node.

To control the Q node charging control node Nqc, the Q node charging block of the input and reset block IR can further include a first Q node charging control transistor T11 and a second Q node charging control transistor T11' connected in series between a third gate high voltage node HV3 and the Q node charging control node Nqc. For example, a third gate high voltage GVDD2 can be applied to the third gate high voltage node HV3.

The gate node of the first Q node charge control transistor T11 and the gate node of the second Q node charge control transistor T11' can be electrically connected to each other, and be connected to the third gate high voltage node HV3 together.

To cause the Q node to discharge, the Q node discharging block of the input and reset block IR can include a first Q node discharging transistor T3*n* and a second Q node discharging transistor T3*na* connected in series between the Q node and the third gate low voltage node LV3.

The first Q node discharging transistor T3*n* and the second Q node discharging transistor T3*na* can be turned on or turned off together by an (n+3)-th carry signal C(n+3), and control a connection between the Q node and the third gate low voltage node LV3.

The first Q node discharging transistor T3*n* can be connected between the Q node and a holding node (QH node), and the second Q node discharging transistor T3*na* can be connected between the holding node (QH node) and the third gate low voltage node LV3.

The gate node of the first Q node discharging transistor T3*n* and the gate node of the second Q node discharging transistor T3*na* can be electrically connected to each other, and receive the (n+3)-th carry signal C(n+3) together.

To cause the Q node to discharge, the Q node discharging block of the input and reset block IR can further include a third Q node discharging transistor T3*nb* and a fourth Q node discharging transistor T3*nc* connected in series between the Q node and the third gate low voltage node LV3.

The third Q node discharging transistor T3*nb* and the fourth Q node discharging transistor T3*nc* can be turned on or turned off together by a start signal VST, and control a connection between the Q node and the third gate low voltage node LV3.

The third Q node discharging transistor T3*nb* can be connected between the Q node and the holding node (QH node), and the fourth Q node discharging transistor T3*nc* can be connected between the holding node (QH node) and the third gate low voltage node LV3.

The stabilization block ST can be a circuit block configured to stabilize the Q node and the output of the gate driving panel circuit GPC depending on a voltage of the QB node during a period during which an output signal of the gate driving panel circuit GPC has a turn-off level voltage.

The stabilization block ST can include a first stabilization transistor T3 and a second stabilization transistor T3*a*, which can be turned on or turned off depending on a voltage of the QB node and thereby, control a connection between the Q node and the third gate low voltage node LV3.

The first stabilization transistor T3 can be connected between the Q node and the holding node (QH node). The first stabilization transistor T3 can be turned on or turned off depending on a voltage of the QB node, and thereby, control a connection between the Q node and the holding node (QH node).

The second stabilization transistor T3*a* can be connected between the holding node (QH node) and the third gate low voltage node LV3. The second stabilization transistor T3*a* can be turned on or turned off depending on a voltage of the QB node, and thereby, control a connection the holding node (QH node) and the third gate low voltage node LV3.

The inverter block IVT can be a circuit block configured to control an electrical value (or level) of the Q node or the QB node such that a voltage level resulting from inverting a voltage level of the Q node becomes a voltage level of the QB node depending on a voltage of the Q node.

The inverter block IVT can include a QB node charging transistor T4 to cause the QB node to charge.

The QB node charging transistor T4 can be connected between a second gate high voltage node HV2 and the QB node. The QB node charging transistor T4 can be turned on or turned off depending on a voltage of an inverter control node NIVT, and thereby, control a connection between the second gate high voltage node HV2 and the QB node. For example, a second gate high voltage GVDD_o can be applied to the second gate high voltage node HV2.

The inverter block IVT can further include a first inverter control transistor T4*q* for controlling the voltage of the inverter control node NIVT.

The first inverter control transistor T4*q* can be connected between the inverter control node NIVT and a second gate low voltage node LV2. The first inverter control transistor T4*q* can be turned on or turned off depending on a voltage of the Q node, and thereby, control a connection between the inverter control node NIVT and the second gate low voltage node LV2. For example, a second gate low voltage GVSS1 can be applied to the second gate low voltage node LV2.

As the Q node has a low level voltage, the first inverter control transistor T4*q* can be turned off. In this situation, the inverter control node NIVT can be in a state in which the second gate high voltage GVDD_o supplied by a second inverter control transistor T41 is applied. Accordingly, the QB node charging transistor T4 can be turned on, and thereby, the second gate high voltage GVDD_o can be applied to the QB node (QB node charging).

As the Q node has a high level voltage, the first inverter control transistor T4*q* can be turned on, and thereby, pass the second gate low voltage GVSS1 to the inverter control node NIVT. Accordingly, the QB node charging transistor T4 can be turned off, thereby preventing the second gate high voltage GVDD_o from being applied to the QB node.

The inverter block IVT can further include a second inverter control transistor T41 for controlling the voltage of the inverter control node NIVT.

The second inverter control transistor T41 can be connected between the second gate high voltage node HV2 and the inverter control node NIVT. The second inverter control transistor T41 can be turned on or turned off depending on the second gate low voltage GVSS1, and thereby, control a connection between the gate high voltage node HV2 and the inverter control node NIVT.

The second inverter control transistor T41 can always remain in a turn-on state, and can pass the second gate high voltage GVDD_o to the inverter control node NIVT.

To cause the QB node to discharge, the inverter block IVT can include a first QB node discharging transistor T5 connected between the QB node and the third gate low voltage node LV3.

The first QB node discharging transistor T5 can be turned on or turned off depending on an (n−3)-th carry signal C(n−3), and thereby, control a connection between the QB node and the third gate low voltage node LV3. When first QB node discharging transistor T5 is turned on, the third gate low voltage GVSS2 can be applied to the QB node. Accordingly, the QB node can be discharged.

To cause the QB node to discharge, the inverter block IVT can further include a second QB node discharging transistor T5*q* connected between the QB node and the third gate low voltage node LV3.

The second QB node discharging transistor T5*q* can be turned on or turned off depending on a voltage of the Q node, and thereby, control a connection between the QB node and the third gate low voltage node LV3. When second QB node discharging transistor T5*q* is turned on, the third gate low voltage GVSS2 can be applied to the QB node. Accordingly, the QB node can be discharged.

To cause the QB node to discharge, the inverter block IVT can further include a third QB node discharging transistor T5*a* and a fourth QB node discharging transistor T5*b* connected in series between the QB node and the third gate low voltage node LV3.

A reset signal RST can be input to the gate node of the third QB node discharging transistor T5*a*. For example, the third QB node discharging transistor T5*a* can be turned on or turned off depending on a voltage of the reset signal RST.

The gate node of the fourth QB node discharging transistor T5*b* can be electrically connected to an intermediate node M. For example, the fourth QB node discharging transistor T5*b* can be turned on or turned off depending on a voltage of the intermediate node M. For example, the intermediate node M can be a node included in the first real-time sensing control block RT #1.

Among the plurality of QB node discharging transistors (T5, T5*q*, T5*a*, and T5*b*) included in the inverter block IVT, the first QB node discharging transistor T5 and the second QB node discharging transistor T5*q* can be configured to discharge the QB node for display driving during an active period ACT, and the third QB node discharging transistor T5*a* and the fourth QB node discharging transistor T5*b* can be configured to discharge the QB node for sensing driving during a blank period BLANK.

The first logic block LOGIC #1 can further include a holding node control block QHC for controlling a voltage of the holding node (QH node). The holding node control block QHC can be connected between the first gate high voltage node HV1 and the holding node (QH node).

The holding node control block QHC can include a first holding node control transistor T3*q* and a second holding node control transistor T3*q*' connected in series between the first gate high voltage node HV1 and the holding node (QH node).

Respective gate nodes of the first holding node control transistor T3*q* and the second holding node control transistor T3*q*' can be connected to the Q node together.

When the Q node has a high level voltage, both the first holding node control transistor T3*q* and the second holding node control transistor T3*q*' can be turned on, and thereby, the first gate high voltage GVDD can be applied to the holding node (QH node). As the holding node (QH node) has the first gate high voltage GVDD, regardless of respective switching of the third Q node discharging transistor T3*nb*, the first Q node discharging transistor T3*n*, and the first stabilization transistor T3, the Q node can stably maintain a high level voltage.

The first real-time sensing control block RT #1 can be a circuit block configured to control operation of the first output buffer block BUF #1 for real-time sensing driving. The first real-time sensing control block RT #1 can be configured to control a voltage of the Q node so that a first scan signal SC1 and a first sensing signal SE1 can be output at a preset timing by the first output buffer block BUF #1 during a blank period BLANK.

The first real-time sensing control block RT #1 can perform a control operation so that during a blank period BLANK, the first scan signal SC1 can be output by the first output buffer block BUF #1 to a corresponding one of a plurality of scan signal lines SCL, and the first sensing signal SE1 can be output by the first output buffer block BUF #1 to a corresponding one of a plurality of sensing signal lines SENL. Through this operation, sensing driving can be performed for a subpixel (or subpixels) SP included in a corresponding one of a plurality of subpixel lines (or subpixel arrays).

The first real-time sensing control block RT #1 can include a first sensing control transistor Ta, a second sensing control transistor Tb, a third sensing control transistor Tc, a fourth sensing control transistor T1*b*, and a fifth sensing control transistor T1*c*.

The first sensing control transistor Ta and the second sensing control transistor Tb can be connected in series between a previous carry input node Npc and the intermediate node M. For example, an (n−2)-th carry signal C(n−2) can be input to the previous carry input node Npc.

In order that real-time sensing driving is performed for a subpixel SP intended to receive (or to be determined to receive) the first scan signal SC1 and the first sensing signal SE1 output from the first gate driving panel circuit GPC #1, the first gate driving panel circuit GPC #1 is needed to output the first scan signal SC1 and the first sensing signal SE1 as sensing driving gate signals during a real-time sensing driving period. For example, the real-time sensing driving period can be included in a blank period BLANK.

The first real-time sensing control block RT #1 can use a line selection signal LSP so that the first scan signal SC1 and the first sensing signal SE1 can be output as sensing driving gate signals during a real-time sensing driving period.

During the real-time sensing driving period, the line selection signal LSP can be commonly input to respective gate nodes of the first sensing control transistor Ta and the second sensing control transistor Tb. For example, the line selection signal LSP can be a pulse-shaped signal, and can be commonly applied to the gate nodes of the first sensing control transistor Ta and the second sensing control transistors Tb in a period between a start time and an end time of a frame.

The third sensing control transistor Tc can be turned on or turned off depending on a voltage of the intermediate node M, and thereby, control a connection between a connection point Ps and the first gate high voltage node HV1. For example, the connection point Ps can be a point at which the first sensing control transistor Ta and the second sensing control transistor Tb are connected.

The fourth sensing control transistor T1*b* and the fifth sensing control transistor T1*c* can be connected in series between the first gate high voltage node HV1 and the Q node.

The gate node of the fourth sensing control transistor T1*b* can be connected to the intermediate node M. A reset signal RST can be input to the gate node of the fifth sensing control transistor T1*c*.

During a real-time sensing driving period, the fourth sensing control transistor T1*b* and the fifth sensing control transistor T1*c* can be turned on depending on a voltage of the intermediate node M and the reset signal RST, respectively, and thereby, pass the first gate high voltage GVDD to the Q node. Accordingly, the Q node can be charged during the real-time sensing operation period. For example, the real-time sensing driving period can be included in a blank period BLANK.

The first real-time sensing control block RT #1 can include a sensing control capacitor Crt connected between the first gate high voltage node HV1 and the intermediate node M.

Figure 13A:
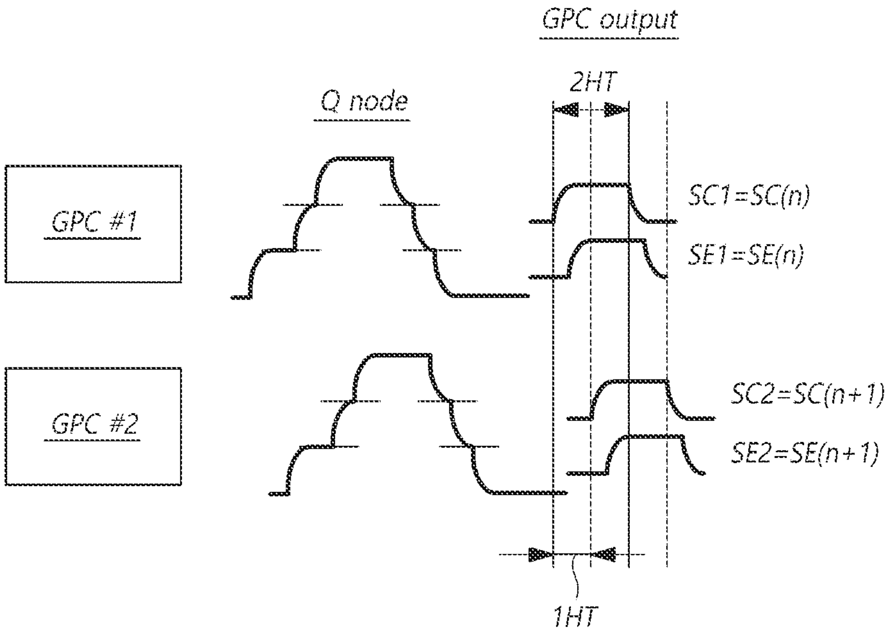
FIG. 13A illustrates, in the example where the first type of gate driving panel circuit is applied, respective example outputs and voltage changes at Q nodes of the first gate driving panel circuit and a second gate driving panel circuit included in the gate driving panel circuit in the display device according to aspects of the present disclosure.

FIG. 13A illustrates, in the example where the first type of gate driving panel circuit GPC is applied, respective example outputs and voltage changes at Q nodes of the first gate driving panel circuit GPC #1 and the second gate driving panel circuit GPC #2 included in the gate driving panel circuit GPC in the display device 100 according to aspects of the present disclosure.

Referring to FIG. 13A, voltage rising (boosting) can occur two or more times during a period during which a voltage of the Q node of the first gate driving panel circuit GPC #1 increases. Further, voltage rising can occur two or more times during a period during which a voltage of the Q node of the second gate driving panel circuit GPC #2 increases.

When the Q node of the first gate driving panel circuit GPC #1 has a high level voltage, the first gate driving panel circuit GPC #1 can output a first scan signal SC1 having a high level voltage and a first sensing signal SE1 having a high level voltage. A high level voltage period of the first sensing signal SE1 can proceed after a high level voltage period of the first scan signal SC1.

When the Q node of the second gate driving panel circuit GPC #2 has a high level voltage, the second gate driving panel circuit GPC #2 can output a second scan signal SC2 having a high level voltage and a second sensing signal SE2 having a high level voltage. A high level voltage period of the second sensing signal SE2 can proceed after a high level voltage period of the second scan signal SC2.

A time period of a respective high level voltage period of each of the first scan signal SC1 and the second scan signal SC2 can be two horizontal times 2HT (which can refer to a time period corresponding two horizontal periods).

The high level voltage period of the first scan signal SC1 and the high level voltage period of the second scan signal SC2 can overlap in time. A time period during which the high level voltage period of the first scan signal SC1 and the high level voltage period of the second scan signal SC2 overlap each other can be one horizontal time 1HT (which can refer to a time period corresponding one horizontal period). As described above, a gate driving scheme in which respective high level voltage periods of two scan signals (SC1 and SC2), which are output immediately adjacent to each other in time, overlap in time can be referred to as an "overlap gate driving scheme."

The high level voltage period of the first sensing signal SE1 and the high level voltage period of the second sensing signal SE2 can overlap in time. A time period during which the high level voltage period of the first sensing signal SE1 and the high level voltage period of the second sensing signal SE2 overlaps each other in time can be one horizontal time 1HT.

Figure 13B:
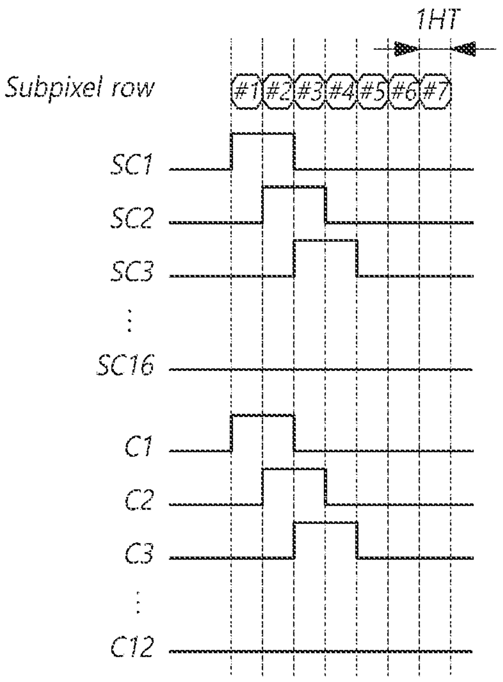
FIG. 13B illustrates, in the example where the first type of gate driving panel circuit is applied, example scan signals and carry signals produced from the gate driving panel circuit in the display device according to aspects of the present disclosure.

FIG. 13B illustrates, in the example where the first type of gate driving panel circuit GPC is applied, example scan signals (SC1 to SC16) and carry signals (C1 to C12) produced from the gate driving panel circuit GPC in the display device 100 according to aspects of the present disclosure.

Referring to FIG. 13B, the gate driving panel circuit GPC can supply a corresponding scan signal to each of a plurality of subpixel rows (e.g., subpixel row: #1, #2, #3, . . . , and #7). The gate driving panel circuit GPC can supply a first scan signal SC1, a second scan signal SC2, and a third scan signal SC3 to a first subpixel row #1, a second subpixel row #2, and a third subpixel row #3, respectively.

A time period of a respective high level voltage period of each of the scan signals (SC1 to SC16) can be two horizontal times 2HT. The second half of the high level voltage period of the first scan signal SC1 and the first half of the high level voltage period of the second scan signal SC2 can overlap by one horizontal time 1HT. The second half of the high level voltage period of the second scan signal SC2 and the first half of the high level voltage period of the third scan signal SC3 can overlap by one horizontal time 1HT.

The carry signals (C1 to C12) can be output by circuit blocks or elements in the gate driving panel circuit GPC.

A time period of a respective high level voltage period of each of the carry signals (C1 to C12) can be two horizontal times 2HT. The second half of the high level voltage period of the first carry signal C1 and the first half of the high level voltage period of the second carry signal C2 can overlap by one horizontal time 1HT. The second half of the high level voltage period of the second carry signal C2 and the first half of the high level voltage period of the third carry signal C3 can overlap by one horizontal time 1HT.

Figure 14:
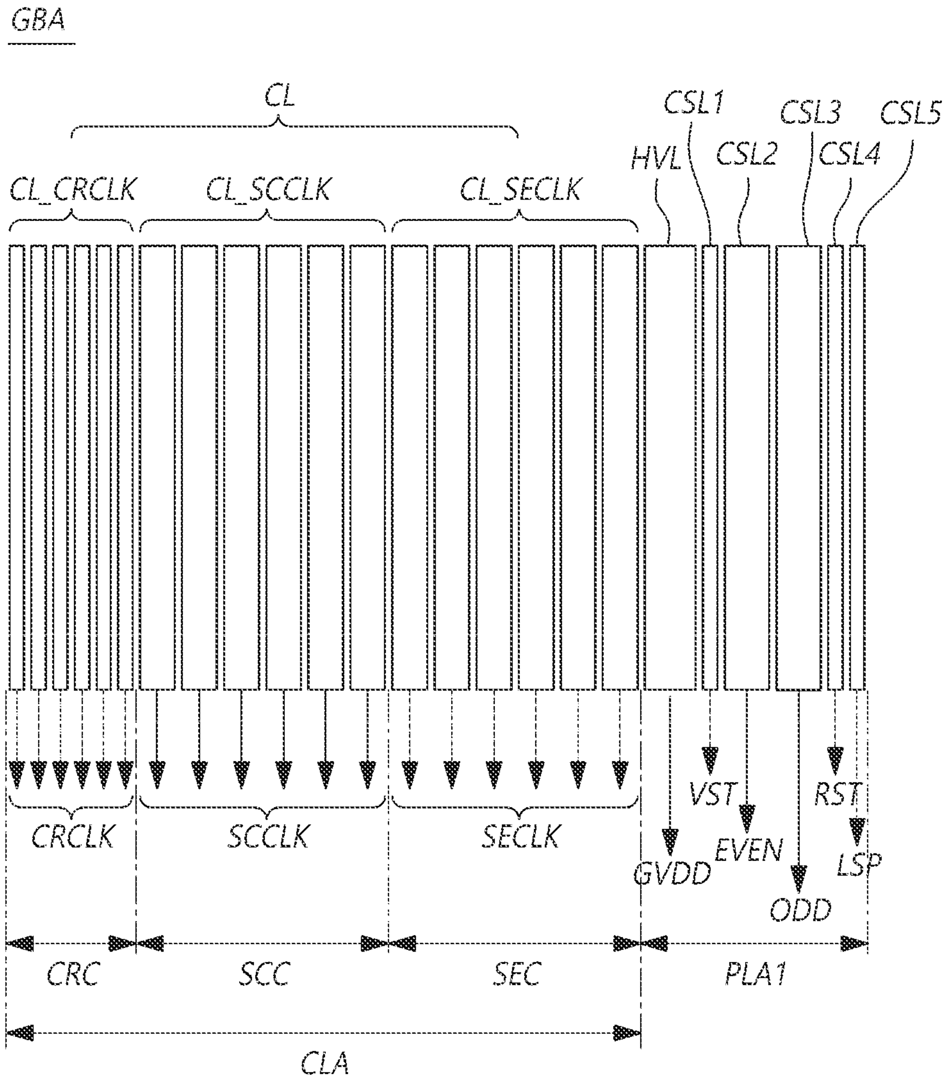
FIG. 14 illustrates, in the example where the first type of gate driving panel circuit is applied, an example line arrangement in a clock signal line area and a first power line area included in the gate bezel area in the display device according to aspects of the present disclosure.

FIG. 14 illustrates, in the example where the first type of gate driving panel circuit GPC (see FIG. 9A) is applied, an example line arrangement in a clock signal line area CLA and a first power line area PLA1 included in the gate bezel area GBA in the display device according to aspects of the present disclosure.

Referring to FIG. 14, the gate bezel area GBA of the display panel 110 can include the clock signal line area CLA and the first power line area PLA1. The clock signal line area CLA and the first power line area PLA1 can be located on a first side of a gate driving panel circuit area GPCA (e.g., the gate driving panel circuit area GPCA of FIG. 11) in which the first type of gate driving panel circuit GPC is disposed.

In the example where the first type of gate driving panel circuit GPC is applied, the clock signal line area CLA in which a plurality of clock signal lines CL are disposed can include a carry clock signal line area CRC, a scan clock signal line area SCC, and a sensing clock signal line area SEC.

Carry clock signal lines CL_CRCLK for delivering carry clock signals CRCLK to the gate driving panel circuit GPC can be disposed in the carry clock signal line area CRC.

Scan clock signal lines CL_SCCLK for delivering scan clock signals SCCLK to the gate driving panel circuit GPC can be disposed in the scan clock signal line area SCC.

Sensing clock signal lines CL_SECLK for delivering sensing clock signals SECLK to the gate driving panel circuit GPC can be disposed in the sensing clock signal line area SEC.

Among the carry clock signal line area CRC, the scan clock signal line area SCC, and the sensing clock signal line area SEC, the scan clock signal line area SCC can be located between the carry clock signal line area CRC and the sensing clock signal line area SEC, the carry clock signal line area CRC can be located furthest away from the display area DA, and the sensing clock signal line area SEC can be located closest to the display area DA.

Among the carry clock signal line area CRC, the scan clock signal line area SCC, and the sensing clock signal line area SEC, the carry clock signal line area CRC can be located furthest away from the gate driving panel circuit area GPCA, and the sensing clock signal line area SEC can be located closest to the gate driving panel circuit area GPCA.

In an embodiment, a width of one scan clock signal line CL_SCCLK can be greater than that of one carry clock signal line CL_CRCLK. In an embodiment, a width of one sensing clock signal line CL_SECLK can be greater than that of one carry clock signal line CL_CRCLK.

At least one gate high voltage line HVL for delivering at least one gate high voltage GVDD to the gate driving panel circuit GPC can be disposed in the first power line area PLA1.

At least one control signal line can be further disposed in the first power line area PLA1. For example, the at least one control signal line can include at least one of a start signal line CSL1 for delivering a start signal VST for indicating the start of gate driving operation to the gate driving panel circuit GPC, a first driving sequence control signal line CSL2 for delivering an even-numbered driving control signal EVEN to the gate driving panel circuit GPC, a second driving sequence control signal line CSL3 for delivering an odd-numbered driving control signal ODD to the gate driving panel circuit GPC, a reset signal line CSL4 for delivering a reset signal RST for indicating the end of the gate driving operation to the gate driving panel circuit GPC, and a line selection signal line CSL5 for delivering a line selection signal LSP to the gate driving panel circuit GPC.

The gate high voltage line HVL can have a greater width than the start signal line CSL1, the reset signal line CSL4, and the line selection signal line CSL5.

For example, the first driving sequence control signal line CSL2 and the second driving sequence control signal line CSL3 can be disposed in two specific line areas in the first power line area PLA1. In another example, instead of the first driving sequence control signal line CSL2 and the second driving sequence control signal line CSL3, two gate high voltage lines can be disposed in the two specific line areas in the first power line area PLA1.

Figure 15:
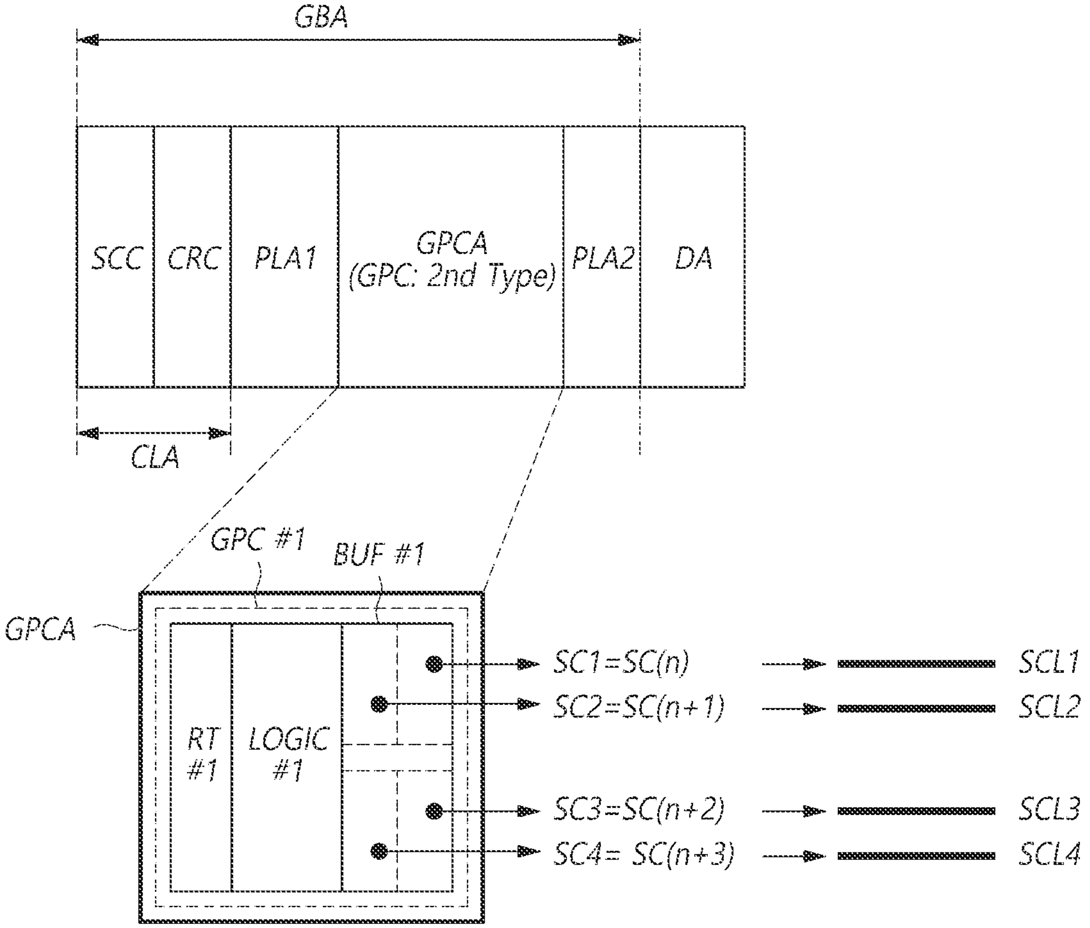
FIG. 15 illustrates, in the example where the second type of gate driving panel circuit is applied, an example configuration of the gate bezel area of the display panel according to aspects of the present disclosure.

FIG. 15 illustrates, in the example where the second type of gate driving panel circuit GPC is applied, an example configuration of the gate bezel area GBA of the display panel 110 according to aspects of the present disclosure.

Referring to FIG. 15, in one or more embodiments, the gate bezel area GBA in the non-display area NDA of the display panel 110 can include a clock signal line area CLA, a first power line area PLA1, a gate driving panel circuit area GPCA, and a second power line area PLA2.

Referring to FIG. 15, an arrangement of the remaining sub-areas, except for the clock signal line area CLA and the gate driving panel circuit area GPCA among sub-areas in the gate bezel area GBA in the example where the second type of gate driving panel circuit GPC (see FIG. 9B) is disposed can be nearly the same as an arrangement of corresponding sub-areas of the sub-areas in the gate bezel area GBA in the example where the first type of gate driving panel circuit GPC (see FIG. 9A) is disposed (see FIG. 11). Accordingly, discussions on the sub-areas of FIG. 15 will be provided by focusing on different configurations from sub-areas in the gate bezel area GBA in the example where the first type of gate driving panel circuit GPC is disposed (see FIG. 11).

The gate driving panel circuit area GPCA can be an area in which the second type of gate driving panel circuit GPC is disposed. The second type of gate driving panel circuit GPC can output scan signals SC to be supplied to subpixels SP having the one-gate driving structure.

For example, the clock signal line area CLA, the first power line area PLA1, and the second power line area PLA2 can be disposed around the gate driving panel circuit area GPCA in the gate bezel area GBA, For example, the clock signal line area CLA and the first power line area PLA1 can be located on a first side of the gate driving panel circuit area GPCA, and the first power line area PLA1 can be located between the clock signal line area CLA and the gate driving panel circuit area GPCA. The second power line area PLA2 can be located on a second opposing side of the gate driving panel circuit area GPCA. The second power line area PLA2 can be located between the gate driving panel circuit area GPCA and the display area DA. For example, the gate driving panel circuit area GPCA can be located on a first side of the second power line area PLA2, and the display area DA can be located on a second opposing side of the second power line area PLA2.

The clock signal line area CLA can be included in the gate bezel area GBA of the non-display area NDA, and be an area in which a plurality of clock signal lines for delivering a plurality of clock signals to the gate driving panel circuit GPC are disposed.

The first power line area PLA1 can be included in the gate bezel area GBA of the non-display area NDA, and be an area in which at least one gate high voltage line for delivering at least one gate high voltage to the gate driving panel circuit GPC is disposed.

For example, a plurality of gate high voltage lines for delivering a plurality of gate high voltages to the gate driving panel circuit GPC can be disposed in the first power line area PLA1. For example, all of the plurality of gate high voltages can have a same high voltage value. In another example, one or more of the plurality of gate high voltages can have different high voltage values from the remaining gate high voltages. The plurality of gate high voltages can be high voltages having different usages from each other.

In an embodiment, at least one control signal line for delivering at least one control signal to the gate driving panel circuit GPC can be further disposed in the first power line area PLA1. For example, the at least one control signal can include at least one of a start signal VST, a reset signal RST, and a line selection signal LSP.

The second power line area PLA2 can be included in the gate bezel area GBA of the non-display area NDA, and be an area in which at least one gate low voltage line for delivering at least one gate low voltage to the gate driving panel circuit GPC is disposed.

For example, a plurality of gate low voltage lines for delivering a plurality of gate low voltages to the gate driving panel circuit GPC can be disposed in the second power line area PLA2. For example, all of the plurality of gate low voltages can have a same low voltage value. In another example, one or more of the plurality of gate low voltages can have different high voltage values from the remaining gate low voltages. The plurality of gate low voltages can be low voltages having different usages from each other.

In the example where the second type of gate driving panel circuit GPC is applied, the clock signal line area CLA can include a scan clock signal line area SCC and a carry clock signal line area CRC.

The scan clock signal line area SCC can be an area in which scan clock signal lines are disposed for delivering scan clock signals to the gate driving panel circuit GPC.

The carry clock signal line area CRC can be an area in which carry clock signal lines are disposed for delivering carry clock signals to the gate driving panel circuit GPC.

In the example where the second type of gate driving panel circuit GPC is applied, the clock signal line area CLA may not include a sensing clock signal line area.

For example, among the scan clock signal line area SCC and the carry clock signal line area CRC, the scan clock signal line area SCC can be located further away from the display area DA or the gate driving panel circuit area GPCA than the carry clock signal line area CRC, and the carry clock signal line area CRC can be located closer to the display area DA or the gate driving panel circuit area GPCA than the scan clock signal line area SCC.

In another example, the carry clock signal line area CRC can be located further away from the display area DA or the gate driving panel circuit area GPCA than the scan clock signal line area SCC. The scan clock signal line area SCC can be located closer to the display area DA or the gate driving panel circuit area GPCA than the carry clock signal line area CRC.

In the example where the second type of gate driving panel circuit GPC is applied, the gate driving panel circuit GPC disposed in the gate driving panel circuit area GPCA can include a first gate driving panel circuit GPC #1 (e.g., the first gate driving panel circuit GPC #1 of FIG. 9B), and the like.

The first gate driving panel circuit GPC #1 can include a first output buffer block BUF #1, a first logic block LOGIC #1, and a first real-time sensing control block RT #1.

The first output buffer block BUF #1 can be configured to output two or more scan signals SC to two or more scan signal lines SCL. For example, the first output buffer block BUF #1 can be configured to output four scan signals (SC1, SC2, SC3, and SC4) to four scan signal lines (SCL1, SCL2, SCL3, and SCL4), respectively.

The four scan signals (SC1, SC2, SC3, and SC4) can include a first scan signal SC1 corresponding to an n-th scan signal SC(n), a second scan signal SC2 corresponding to an (n+1)-th scan signal SC(n+1), a third scan signal SC3 corresponding to an (n+2)-th scan signal SC(n+2), and a fourth scan signal SC4 corresponding to an (n+3)-th scan signal SC(n+3).

The first scan signal SC1, the second scan signal SC2, the third scan signal SC3, and the fourth scan signal SC4 can be applied to the first scan signal line SCL1, the second scan signal line SCL2, the third scan signal line SCL3, and the fourth scan signal line SCL4, respectively.

The first logic block LOGIC #1 can be configured to control operation of the first output buffer block BUF #1 by controlling respective voltages of Q and QB nodes of the first gate driving panel circuit GPC #1.

The first real-time sensing control block RT #1 can be configured to control operation of the first output buffer block BUF #1 so that the first output buffer block BUF #1 can output a first scan signal SC1 for sensing driving to a corresponding first subpixel SP where real-time sensing driving will be performed by controlling respective voltages of the Q and QB nodes of the first gate driving panel circuit GPC #1 during a first real-time sensing driving period.

As the gate driving panel circuit area GPCA is disposed between the first power line area PLA1 and the second power line area PLA2, the first power line area PLA1 and the second power line area PLA2 can be separated from each other by the gate driving panel circuit area GPCA.

Accordingly, at least one gate high voltage line disposed in the first power line area PLA1 and at least one gate low voltage line disposed in the second power line area PLA2 can be separated by the gate driving panel circuit GPC disposed in the gate driving panel circuit area GPCA.

According to the configuration of the power-related lines and areas discussed above, since at least one high voltage line and at least one low voltage line do not overlap with each other, one or more high voltages (e.g., GVDD, GVDD2, GVDD_o, and GVDD_e in FIG. 16) and one or more low voltages (e.g., GVSS0, GVSS1, and GVSS2 of FIG. 16) can be stabilized or stably supplied.

Figure 16:
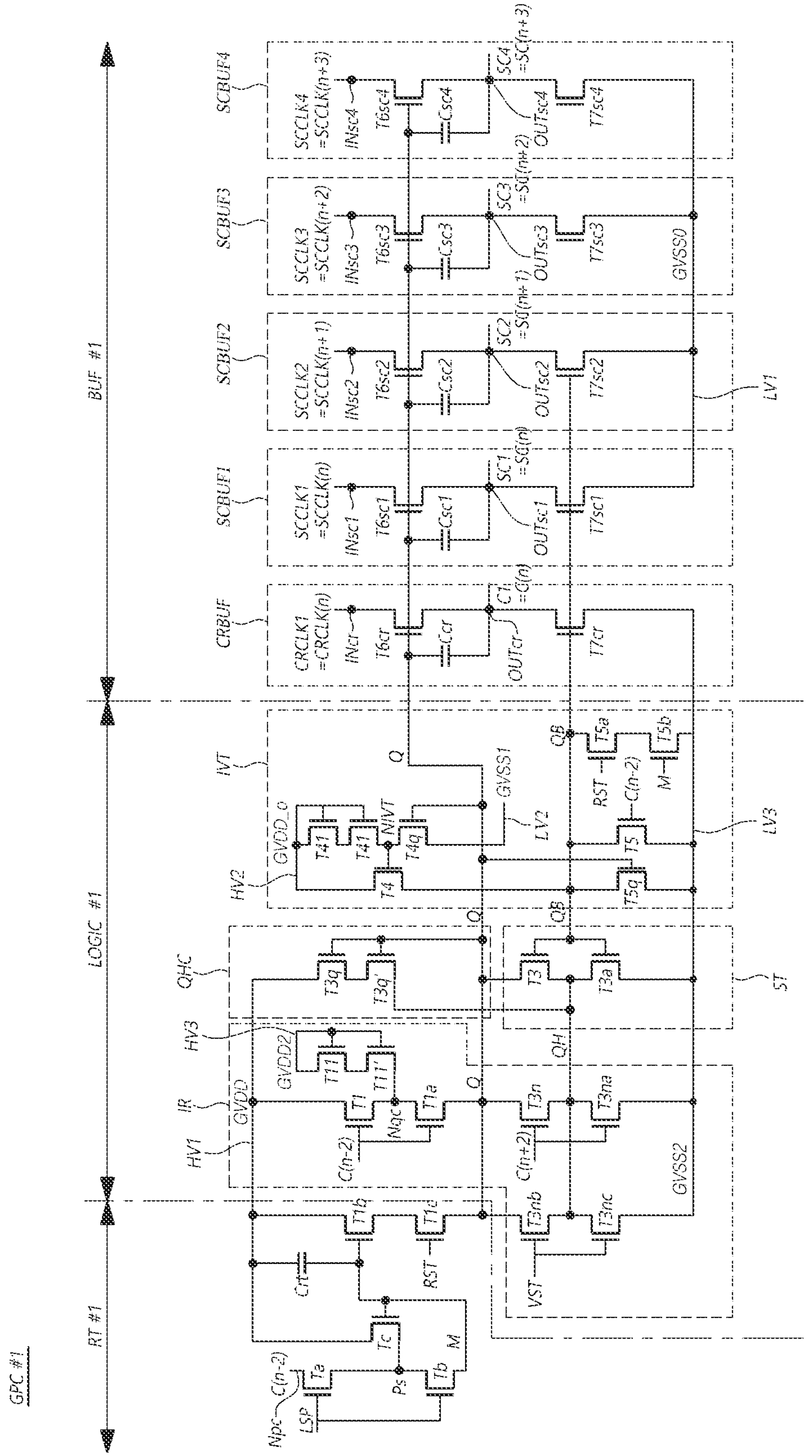
FIG. 16 illustrates, in the example where the second type of gate driving panel circuit is applied, an example first gate driving panel circuit included in the gate driving panel circuit in the display device according to aspects of the present disclosure.

FIG. 16 illustrates, in the example where the second type of gate driving panel circuit GPC is applied, an example first gate driving panel circuit GPC #1 (e.g., the first gate driving panel circuit GPC #1 of FIG. 9B) included in the gate driving panel circuit GPC in the display device 100 according to aspects of the present disclosure.

Hereinafter, for convenience of description, an n-th scan signal SC(n) can be referred to as a first scan signal SC1, and an (n+1)-th scan signal SC(n+1) can be referred to as a second scan signal SC2, an (n+2)-th scan signal SC(n+2) can be referred to as a third scan signal SC3, and an (n+3)-th scan signal SC(n+3) can be referred to as a fourth scan signal SC4.

Further, for convenience of description, an n-th scan clock signal SCCLK(n) can be referred to as a first scan clock signal SCCLK1, an (n+1)-th scan clock signal SCCLK(n+1) can be described as a second scan clock signal SCCLK2, an (n+2)-th scan clock signal SCCLK(n+2) can be described as a third scan clock signal SCCLK3, and an (n+3)-th scan clock signal SCCLK(n+3) can be referred to as a fourth scan clock signal SCCLK4.

Further, for convenience of description, an n-th carry signal C(n) can be referred to as a first carry signal C1, and an n-th carry clock signal CRCLK(n) can be referred to as a first carry clock signal CRCLK1. Referring to FIG. 16, the first gate driving panel circuit GPC #1 can include a first output buffer block BUF #1, a first logic block LOGIC #1, and a first real-time sensing control block RT #1.

Except for input carry signals and a configuration of the first output buffer block BUF #1, the first gate driving panel circuit GPC #1 of the second type of gate driving panel circuit GPC illustrated in FIG. 16 can have the same basic structure and configuration as the first gate driving panel circuit GPC #1 of the first type of gate driving panel circuit GPC illustrated in FIG. 12. Considering such similarity, discussions on the first gate driving panel circuit GPC #1 of the second type of gate driving panel circuit GPC will be provided by focusing on different configurations from the first gate driving panel circuit GPC #1 of the first type of gate driving panel circuit GPC illustrated in FIG. 12.

Referring to FIG. 16, the first output buffer block BUF #1 can include a carry output buffer CRBUF and two or more scan output buffers. For example, the first output buffer block BUF #1 can include a carry output buffer CRBUF, a first scan output buffer SCBUF1, a second scan output buffer SCBUF2, a third scan output buffer SCBUF3, and a fourth scan output buffer SCBUF4.

The carry output buffer CRBUF can include a carry pull-up transistor T6*cr* and a carry pull-down transistor T7*cr*.

The carry pull-up transistor T6*cr* can be turned on or turned off depending on a voltage of a Q node, and thereby, control a connection between a carry clock node INcr to which a first carry clock signal CRCLK1 is input and a carry output node OUTcr from which a first carry signal C1 is output.

The gate node of the carry pull-up transistor T6*cr* can be the Q node or be electrically connected to the Q node. The source node (or drain node) of the carry pull-up transistor T6*cr* can be the carry output node OUTcr or be electrically connected to the carry output node OUTcr. The drain node (or source node) of the carry pull-up transistor T6*cr* can be the carry clock node INcr or be electrically connected to the carry clock node INcr.

When the carry pull-up transistor T6*cr* is turned on, the carry pull-up transistor T6*cr* can output the first carry signal C1 having a high level voltage using the first carry clock signal CRCLK1.

The carry output buffer CRBUF can further include a carry bootstrapping capacitor Ccr connected between the gate node and the source node (or drain node) of the carry pull-up transistor T6*cr*.

The carry pull-down transistor T7*cr* can be turned on or turned off depending on a voltage of a QB node, and thereby, control a connection between a third gate low voltage node LV3 to which a third gate low voltage GVSS2 is input and the carry output node OUTcr from which the first carry signal C1 is output.

The gate node of the carry pull-down transistor T7*cr* can be the QB node or can be electrically connected to the QB node. The drain node or source node of the carry pull-down transistor T7*cr* can be the third gate low voltage node LV3 or be electrically connected to the third gate low voltage node LV3, and the source node or drain node of the carry pull-down transistor T7*cr* can be the carry output node OUTcr or be electrically connected to the carry output node OUTcr. When the carry pull-down transistor T7*cr* is turned on, the carry pull-down transistor T7*cr* can output the first carry signal C1 having a low level voltage using the third gate low voltage GVSS2.

The first scan output buffer SCBUF1 can be configured to output a first scan signal SC1 having a turn-on level voltage or a turn-off level voltage to a first scan output node OUTsc1. The first scan signal SC1 output to the first scan output node OUTsc1 can be applied to a first scan signal line SCL1 electrically connected to the first scan output node OUTsc1.

The first scan output buffer SCBUF1 can include a first scan pull-up transistor T6*sc*1 and a first scan pull-down transistor T7*sc*1.

The first scan pull-up transistor T6*sc*1 can be turned on or turned off depending on a voltage of the Q node, and control a connection between a first scan clock node INsc1 to which a first scan clock signal SCCLK1 is input and the first scan output node OUTsc1 from which the first scan signal SC1 is output.

The gate node of the first scan pull-up transistor T6*sc*1 can be the Q node or be electrically connected to the Q node. The source node (or drain node) of the first scan pull-up transistor T6*sc*1 can be the first scan output node OUTsc1 or can be electrically connected to the first scan output node OUTsc1. The drain node (or source node) of the first scan pull-up transistor T6*sc*1 can be the first scan clock node INsc1 or can be electrically connected to the first scan clock node INsc1.

When the first scan pull-up transistor T6*sc*1 is turned on, the first scan pull-up transistor T6*sc*1 can output the first scan signal SC1 having a turn-on level voltage (e.g., a high level voltage) using the first scan clock signal SCCLK1 to the first scan output node OUTsc1.

The first scan output buffer SCBUF1 can further include a first scan bootstrapping capacitor Csc1 connected between the gate node and the source node (or drain node) of the first scan pull-up transistor T6*sc*1.

The first scan pull-down transistor T7*sc*1 can be turned on or turned off depending on a voltage of the QB node, and control a connection between a first gate low voltage node LV1 to which a first gate low voltage GVSS0 is input and the first scan output node OUTsc1 from which the first scan signal SC1 is output.

The gate node of the first scan pull-down transistor T7*sc*1 can be the QB node or can be electrically connected to the QB node. The drain node or source node of the first scan pull-down transistor T7*sc*1 can be the first gate low voltage node LV1 or be electrically connected to the first gate low voltage node LV1. The source node or drain node of the first scan pull-down transistor T7*sc*1 can be the first scan output node OUTsc1 or can be electrically connected to the first scan output node OUTsc1.

When the first scan pull-down transistor T7*sc*1 is turned on, the first scan pull-down transistor T7*sc*1 can output the first scan signal SC1 having a turn-off level voltage (e.g., a low level voltage) using the first gate low voltage GVSS0 to the first scan output node OUTsc1.

Referring to FIG. 16, the second scan output buffer SCBUF2 can be configured to output a second scan signal SC2 having a turn-on level voltage or a turn-off level voltage to a second scan output node OUTsc2. The second scan signal SC2 output to the second scan output node OUTsc2 can be applied to a second scan signal line SCL2 electrically connected to the second scan output node OUTsc2.

The second scan output buffer SCBUF2 can include a second scan pull-up transistor T6*sc*2 and a second scan pull-down transistor T7*sc*2.

The second scan pull-up transistor T6*sc*2 can be turned on or turned off depending on a voltage of the Q node, and control a connection between a second scan clock node INsc2 to which a second scan clock signal SCCLK2 is input and the second scan output node OUTsc2 from which the second scan signal SC2 is output.

The gate node of the second scan pull-up transistor T6*sc*2 can be the Q node or be electrically connected to the Q node. The source node or drain node of the second scan pull-down transistor T6*sc*2 can be the second scan output node OUTsc2 or can be electrically connected to the second scan output node OUTsc2. The drain node (or source node) of the second scan pull-up transistor T6*sc*2 can be the second scan clock node INsc2 or can be electrically connected to the second scan clock node INsc2.

When the second scan pull-up transistor T6*sc*2 is turned on, the second scan pull-up transistor T6*sc*2 can output the second scan signal SC2 having a turn-on level voltage (e.g., a high level voltage) using the second scan clock signal SCCLK2 to the second scan output node OUTsc2.

The second scan output buffer SCBUF2 can further include a second scan bootstrapping capacitor Csc2 connected between the gate node and the source node (or drain node) of the second scan pull-up transistor T6*sc*2.

The second scan pull-down transistor T7*sc*2 can be turned on or turned off depending on a voltage of the QB node, and control a connection between the first gate low voltage node LV1 to which the first gate low voltage GVSS0 is input and the second scan output node OUTsc2 from which the second scan signal SC2 is output.

The gate node of the second scan pull-down transistor T7*sc*2 can be the QB node or can be electrically connected to the QB node. The drain node or source node of the second scan pull-down transistor T7*sc*2 can be the first gate low voltage node LV1 or be electrically connected to the first gate low voltage node LV1. The source node or drain node of the second scan pull-down transistor T7*sc*2 can be the second scan output node OUTsc2 or can be electrically connected to the second scan output node OUTsc2.

When the second scan pull-down transistor T7*sc*2 is turned on, the second scan pull-down transistor T7*sc*2 can output the second scan signal SC2 having a turn-off level voltage (e.g., a low level voltage) using the first gate low voltage GVSS0 to the second scan output node OUTsc2.

The third scan output buffer SCBUF3 can be configured to output a third scan signal SC3 having a turn-on level voltage or a turn-off level voltage to a third scan output node OUTsc3. The third scan signal SC3 output to the third scan output node OUTsc3 can be applied to a third scan signal line SCL3 electrically connected to the third scan output node OUTsc3.

The third scan output buffer SCBUF3 can include a third scan pull-up transistor T6*sc*3 and a third scan pull-down transistor T7*sc*3.

The third scan pull-up transistor T6*sc*3 can be turned on or turned off depending on a voltage of the Q node, and control a connection between a third scan clock node INsc3 to which a third scan clock signal SCCLK3 is input and the third scan output node OUTsc3 from which the third scan signal SC3 is output.

The gate node of the third scan pull-up transistor T6*sc*3 can be the Q node or be electrically connected to the Q node. The source node or drain node of the third scan pull-down transistor T6*sc*3 can be the third scan output node OUTsc3 or can be electrically connected to the third scan output node OUTsc3. The drain node (or source node) of the third scan pull-up transistor T6*sc*3 can be the third scan clock node INsc3 or can be electrically connected to the third scan clock node INsc3.

When the third scan pull-up transistor T6*sc*3 is turned on, the third scan pull-up transistor T6*sc*3 can output the third scan signal SC3 having a turn-on level voltage (e.g., a high level voltage) using the third scan clock signal SCCLK3 to the third scan output node OUTsc3.

The third scan output buffer SCBUF3 can further include a third scan bootstrapping capacitor Csc3 connected between the gate node and the source node (or drain node) of the third scan pull-up transistor T6*sc*3.

The third scan pull-down transistor T7*sc*3 can be turned on or turned off depending on a voltage of the QB node, and control a connection between the first gate low voltage node LV1 to which the first gate low voltage GVSS0 is input and the third scan output node OUTsc3 from which the third scan signal SC3 is output.

The gate node of the third scan pull-down transistor T7*sc*3 can be the QB node or can be electrically connected to the QB node. The drain node or source node of the third scan pull-down transistor T7*sc*3 can be the first gate low voltage node LV1 or be electrically connected to the first gate low voltage node LV1. The source node or drain node of the third scan pull-down transistor T7*sc*3 can be the third scan output node OUTsc3 or can be electrically connected to the third scan output node OUTsc3.

When the third scan pull-down transistor T7*sc*3 is turned on, the third scan pull-down transistor T7*sc*3 can output the third scan signal SC3 having a turn-off level voltage (e.g., a low level voltage) using the first gate low voltage GVSS0 to the third scan output node OUTsc3.

The fourth scan output buffer SCBUF4 can be configured to output a fourth scan signal SC4 having a turn-on level voltage or a turn-off level voltage to a fourth scan output node OUTsc4. The fourth scan signal SC4 output to the fourth scan output node OUTsc4 can be applied to a fourth scan signal line SCL4 electrically connected to the fourth scan output node OUTsc4.

The fourth scan output buffer SCBUF4 can include a fourth scan pull-up transistor T6*sc*4 and a fourth scan pull-down transistor T7*sc*4.

The fourth scan pull-up transistor T6*sc*4 can be turned on or turned off depending on a voltage of the Q node, and control a connection between a fourth scan clock node INsc4 to which a fourth scan clock signal SCCLK4 is input and the fourth scan output node OUTsc4 from which the fourth scan signal SC4 is output.

The gate node of the fourth scan pull-up transistor T6*sc*4 can be the Q node or be electrically connected to the Q node. The source node or drain node of the fourth scan pull-up transistor T6*sc*4 can be the fourth scan output node OUTsc4 or can be electrically connected to the fourth scan output node OUTsc4. The drain node (or source node) of the fourth scan pull-up transistor T6*sc*4 can be the fourth scan clock node INsc4 or can be electrically connected to the fourth scan clock node INsc4.

When the fourth scan pull-up transistor T6*sc*4 is turned on, the fourth scan pull-up transistor T6*sc*4 can output the fourth scan signal SC4 having a turn-on level voltage (e.g., a high level voltage) using the fourth scan clock signal SCCLK4 to the fourth scan output node OUTsc4.

The fourth scan output buffer SCBUF4 can further include a fourth scan bootstrapping capacitor Csc4 connected between the gate node and the source node (or drain node) of the fourth scan pull-up transistor T6*sc*4.

The fourth scan pull-down transistor T7*sc*4 can be turned on or turned off depending on a voltage of the QB node, and control a connection between the first gate low voltage node LV1 to which the first gate low voltage GVSS0 is input and the fourth scan output node OUTsc4 from which the fourth scan signal SC4 is output.

The gate node of the fourth scan pull-down transistor T7*sc*4 can be the QB node or can be electrically connected to the QB node. The drain node or source node of the fourth scan pull-down transistor T7*sc*4 can be the first gate low voltage node LV1 or be electrically connected to the first gate low voltage node LV1. The source node or drain node of the fourth scan pull-down transistor T7*sc*4 can be the fourth scan output node OUTsc4 or can be electrically connected to the fourth scan output node OUTsc4.

When the fourth scan pull-down transistor T7*sc*4 is turned on, the fourth scan pull-down transistor T7*sc*4 can output the fourth scan signal SC4 having a turn-off level voltage (e.g., a low level voltage) using the first gate low voltage GVSS0 to the fourth scan output node OUTsc4.

Respective gate nodes of the carry pull-up transistor T6*cr*, the first scan pull-up transistor T6*sc*1, the second scan pull-up transistor T6*sc*2, the third scan pull-up T6*sc*3, and the fourth scan pull-up transistor T6*sc*4, which are included in the first output buffer block BUF #1, can be electrically connected to each other.

For example, the Q node can be shared by the carry output buffer CRBUF, the first scan output buffer SCBUF1, the second scan output buffer SCBUF2, the third scan output buffer SCBUF3, and the fourth scan output buffer SCBUF4, which are included in the first output buffer block BUF #1. The Q node can be electrically connected to respective gate nodes of the carry pull-up transistor T6*cr*, the first scan pull-up transistor T6*sc*1, the second scan pull-up transistor T6*sc*2, the third scan pull-up T6*sc*3, and the fourth scan pull-up transistor T6*sc*4, which are included in the first output buffer block BUF #1. This structure can also be referred to as a “Q node sharing structure.”

Respective gate nodes of the carry pull-down transistor T7*cr*, the first scan pull-down transistor T7*sc*1, the second scan pull-down transistor T7*sc*2, the third scan pull-down T7*sc*3, and the fourth scan pull-down transistor T7*sc*4, which are included in the first output buffer block BUF #1, can be electrically connected to each other.

For example, the QB node can be shared by the carry output buffer CRBUF, the first scan output buffer SCBUF1, the second scan output buffer SCBUF2, the third scan output buffer SCBUF3, and the fourth scan output buffer SCBUF4, which are included in the first output buffer block BUF #1. The QB node can be electrically connected to respective gate nodes of the carry pull-down transistor T7*cr*, the first scan pull-down transistor T7*sc*1, the second scan pull-down transistor T7*sc*2, the third scan pull-down T7*sc*3, and the fourth scan pull-down transistor T7*sc*4, which are included in the first output buffer block BUF #1.

The first logic block LOGIC #1 can be a circuit block configured to control voltages of the Q node and QB node to control operation of the first output buffer block BUF #1, and include an input and reset block IR, a stabilization block ST, and an inverter block IVT.

The first logic block LOGIC #1 can further include a holding node control block QHC for controlling a voltage of a holding node (QH node). The holding node control block QHC can be connected between a first gate high voltage node HV1 and the holding node (QH node).

The first logic block LOGIC #1 illustrated in FIG. 16 can have the same circuit configuration as the first logic block LOGIC #1 illustrated in FIG. 12, except for the following differences.

As a first difference, in the input and reset block IR of the first logic block LOGIC #1 illustrated in FIG. 16, the gate node of a first Q node charging transistor T1 and the gate node of a second Q node charging transistor T1*a* can be electrically connected to each other and receive an (n−2)-th carry signal C(n−2) together, and the gate node of a first Q node discharging transistor T3*n* and the gate node of a second Q node discharging transistor T3*na* can be electrically connected to each other and receive an (n+2)-th carry signal C(n+2) together.

As a second difference, in the inverter block IVT of the first logic block LOGIC #1 illustrated in FIG. 16, the (n−2)-th carry signal C(n−2) can be input to the gate node of a first QB node discharging transistor T5.

Hereinafter, the circuit configuration of the first logic block LOGIC #1 illustrated in FIG. 16 will be briefly described.

Referring to FIG. 16, the input and reset block IR can be a circuit block configured to control charging and discharging of the Q node, and include a Q node charging block connected between the first gate high voltage node HV1 and the Q node and a Q node discharging block connected between the Q node and the third gate low voltage node LV3. For example, a first gate high voltage GVDD can be input to the first gate high voltage node HV1. The third gate low GVSS2 can be input to the third gate low voltage node LV3.

To cause the Q node to charge, the Q node charging block of the input and reset block IR can include at least one Q node charging transistor, which can be turned on or turned off by the (n−2)-th carry signal C(n−2) and thereby, control a connection between the first gate high voltage node HV1 and the Q node.

For example, the Q node charging block of the input and reset block IR can include the first Q node charging transistor T1 and the second Q node charging transistor T1*a* connected in series between the first gate high voltage node HV1 and the Q node.

To control a Q node charging control node Nqc, the Q node charging block of the input and reset block IR can further include a first Q node charging control transistor T11 and a second Q node charging control transistor T11' connected in series between a third gate high voltage node HV3 and the Q node charging control node Nqc. For example, a third gate high voltage GVDD2 can be applied to the third gate high voltage node HV3.

To cause the Q node to discharge, the Q node discharging block of the input and reset block IR can include the first Q node discharging transistor T3*n* and the second Q node discharging transistor T3*na* connected in series between the Q node and the third gate low voltage node LV3.

To cause the Q node to discharge, the Q node discharging block of the input and reset block IR can further include a third Q node discharging transistor T3*nb* and a fourth Q node discharging transistor T3*nc* connected in series between the Q node and the third gate low voltage node LV3.

The stabilization block ST can be a circuit block configured to stabilize the Q node and the output of the gate driving panel circuit GPC depending on a voltage of the QB node during a period during which an output signal of the gate driving panel circuit GPC has a turn-off level voltage.

The stabilization block ST can include a first stabilization transistor T3 and a second stabilization transistor T3*a*, which can be turned on or turned off depending on a voltage of the QB node and thereby, control a connection between the Q node and the third gate low voltage node LV3.

The inverter block IVT can be a circuit block configured to control an electrical value (or level) of the Q node or the QB node such that a voltage level resulting from inverting a voltage level of the Q node becomes a voltage level of the QB node depending on a voltage of the Q node.

The inverter block IVT can include a QB node charging transistor T4 to cause the QB node to charge.

The inverter block IVT can further include a first inverter control transistor T4*q* for controlling the voltage of an inverter control node NIVT corresponding to the gate node of the QB node charging transistor T4.

The inverter block IVT can further include a second inverter control transistor T41 for controlling the voltage of the inverter control node NIVT.

To cause the QB node to discharge, the inverter block IVT can include the first QB node discharging transistor T5 connected between the QB node and the third gate low voltage node LV3. The first QB node discharging transistor T5 can be turned on or turned off depending on the (n−2)-th carry signal C(n−2).

To cause the QB node to discharge, the inverter block IVT can further include a second QB node discharging transistor T5*q* connected between the QB node and the third gate low voltage node LV3. The second QB node discharging transistor T5*q* can be turned on or turned off depending on a voltage of the Q node.

To cause the QB node to discharge, the inverter block IVT can further include a third QB node discharging transistor T5*a* and a fourth QB node discharging transistor T5*b* connected in series between the QB node and the third gate low voltage node LV3.

Among the plurality of QB node discharging transistors (T5, T5*q*, T5*a*, and T5*b*) included in the inverter block IVT, the first QB node discharging transistor T5 and the second QB node discharging transistor T5*q* can be configured to discharge the QB node for display driving during an active period ACT, and the third QB node discharging transistor T5*a* and the fourth QB node discharging transistor T5*b* can be configured to discharge the QB node for sensing driving during a blank period BLANK.

The holding node control block QHC can include a first holding node control transistor T3*q* and a second holding node control transistor T3*q*' connected in series between the first gate high voltage node HV1 and the holding node (QH node).

Respective gate nodes of the first holding node control transistor T3*q* and the second holding node control transistor T3*q*' can be connected to the Q node together.

The first real-time sensing control block RT #1 can be a circuit block configured to control operation of the first output buffer block BUF #1 for real-time sensing driving. The first real-time sensing control block RT #1 can be configured to control a voltage of the Q node so that a first scan signal SC1 can be output at a preset timing by the first output buffer block BUF #1 during a blank period BLANK.

The first real-time sensing control block RT #1 can perform a control operation so that during a blank period BLANK, the first scan signal SC1 can be output by the first output buffer block BUF #1 to a corresponding one of a plurality of scan signal lines. Through this operation, sensing driving can be performed for a subpixel (or subpixels) SP included in a corresponding one of a plurality of subpixel lines (or subpixel arrays).

The first real-time sensing control block RT #1 can include a first sensing control transistor Ta, a second sensing control transistor Tb, a third sensing control transistor Tc, a fourth sensing control transistor T1*b*, and a fifth sensing control transistor T1*c*.

The first real-time sensing control block RT #1 can include a sensing control capacitor Crt connected between the first gate high voltage node HV1 and an intermediate node M.

Figure 17A:
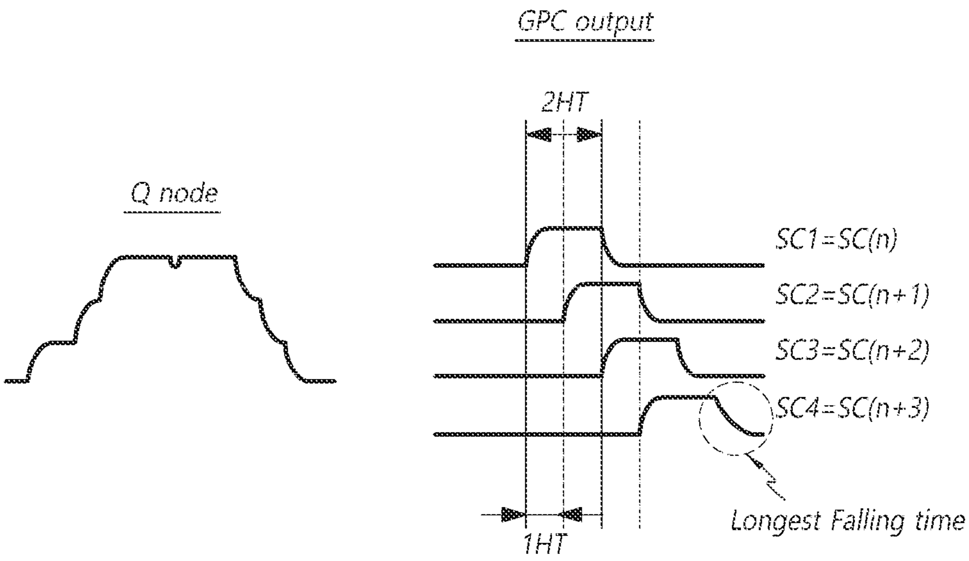
FIG. 17A illustrates, in the example where the second type of gate driving panel circuit is applied, example outputs and voltage changes at a Q node of the first gate driving panel circuit included in the gate driving panel circuit in the display device according to aspects of the present disclosure.

FIG. 17A illustrates, in the example where the second type of gate driving panel circuit is applied, example outputs and voltage changes at the Q node of the first gate driving panel circuit GPC #1 included in the gate driving panel circuit GPC in the display device 100 according to aspects of the present disclosure.

Referring to FIG. 17A, voltage rising (boosting) can occur two or more times during a period during which a voltage of the Q node of the first gate driving panel circuit GPC #1 increases.

When the Q node of the first gate driving panel circuit GPC #1 has a high level voltage, the first gate driving panel circuits GPC #1 can sequentially output first to fourth scan signals (SC1, SC2, SC3, and SC4) having a high level voltage.

A time period of a respective high level voltage period of each of the first to fourth scan signals (SC1, SC2, SC3, and SC4) can be two horizontal times 2HT (which can refer to a time period corresponding two horizontal periods).

Further, respective high level voltage periods of two scan signals adjacent in time to each other among the first to fourth scan signals (SC1, SC2, SC3, and SC4) can overlap in time. A time period during which respective high level voltage periods of two scan signals adjacent in time to each other overlaps each other can be one horizontal time 1HT (which can refer to a time period corresponding one horizontal period).

The high level voltage period of the first scan signal SC1 and the high level voltage period of the second scan signal SC2 can overlap in time. The high level voltage period of the second scan signal SC2 and the high level voltage period of the third scan signal SC3 can overlap in time. The high level voltage period of the third scan signal SC3 and the high level voltage period of the fourth scan signal SC4 can overlap in time.

As described above, a gate driving scheme in which respective high level voltage periods of two scan signals, which are output immediately adjacent to each other in time, overlap in time can be referred to as an "overlap gate driving scheme."

According to the Q node sharing structure and overlap gate driving, among the first to fourth scan signals (SC1, SC2, SC3, and SC4) output from the first output buffer block BUF #1 configured to share one Q node, a falling duration (i.e., a period until a corresponding voltage level reaches a low level), or a falling distance, of the fourth scan signal SC4, which is output lastly, can be the greatest. The fact that the falling duration, or the falling distance, of the fourth scan signal SC4 output lastly is greatest can mean that the falling time (voltage falling time) of the fourth scan signal SC4 is the greatest.

Figure 17B:
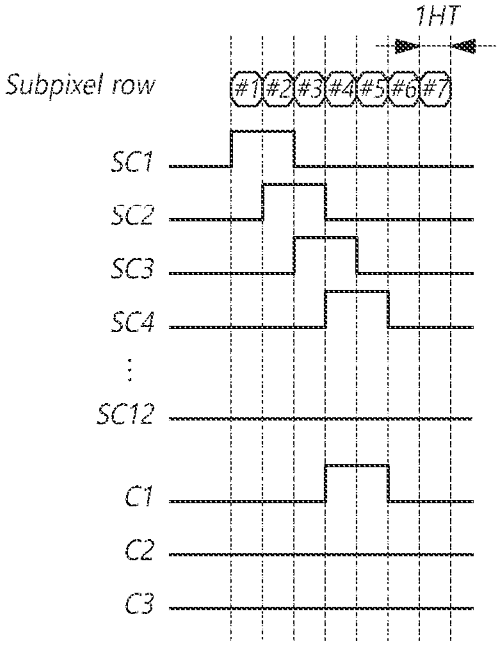
FIG. 17B illustrates, in the example where the second type of gate driving panel circuit is applied, example scan signals and carry signals produced from the gate driving panel circuit in the display device according to aspects of the present disclosure.

FIG. 17B illustrates, in the example where the second type of gate driving panel circuit GPC is applied, example scan signals (SC1 to SC12) and carry signals (C1 to C3) produced from the gate driving panel circuit GPC in the display device 100 according to aspects of the present disclosure.

Referring to FIG. 17B, the gate driving panel circuit GPC can supply a corresponding scan signal to each of a plurality of subpixel rows (e.g., subpixel row: #1, #2, #3, . . . , and #7). The gate driving panel circuit GPC can supply a first scan signal SC1, a second scan signal SC2, and a third scan signal SC3 to a first subpixel row #1, a second subpixel row #2, and a third subpixel row #3, respectively.

A time period of a respective high level voltage period of each of the scan signals (SC1 to SC12) can be two horizontal times 2HT. The second half of the high level voltage period of the first scan signal SC1 and the first half of the high level voltage period of the second scan signal SC2 can overlap by one horizontal time 1HT. The second half of the high level voltage period of the second scan signal SC2 and the first half of the high level voltage period of the third scan signal SC3 can overlap by one horizontal time 1HT.

The carry signals (C1 to C3) can be output by circuit blocks or elements in the gate driving panel circuit GPC.

Further, a time period of a respective high level voltage period of each of the carry signals (C1 to C3) can be two horizontal times 2HT. During an operation period for outputting a first carry signal C1, the first to fourth scan signals (SC1, SC2, SC3, and SC4) can be sequentially output.

The first half of the high level voltage period of the first carry signal C1 can overlap with the second half of the high level voltage period of the third scan signal SC3. The high level voltage period of the first carry signal C1 can overlap with the high level voltage period of the fourth scan signal SC4.

The high level voltage period of the first carry signal C1 and the high level voltage period of the second carry signal C2 may not overlap with each other. The high level voltage period of the second carry signal C2 and the high level voltage period of the third carry signal C3 may not overlap with each other.

Figure 18:
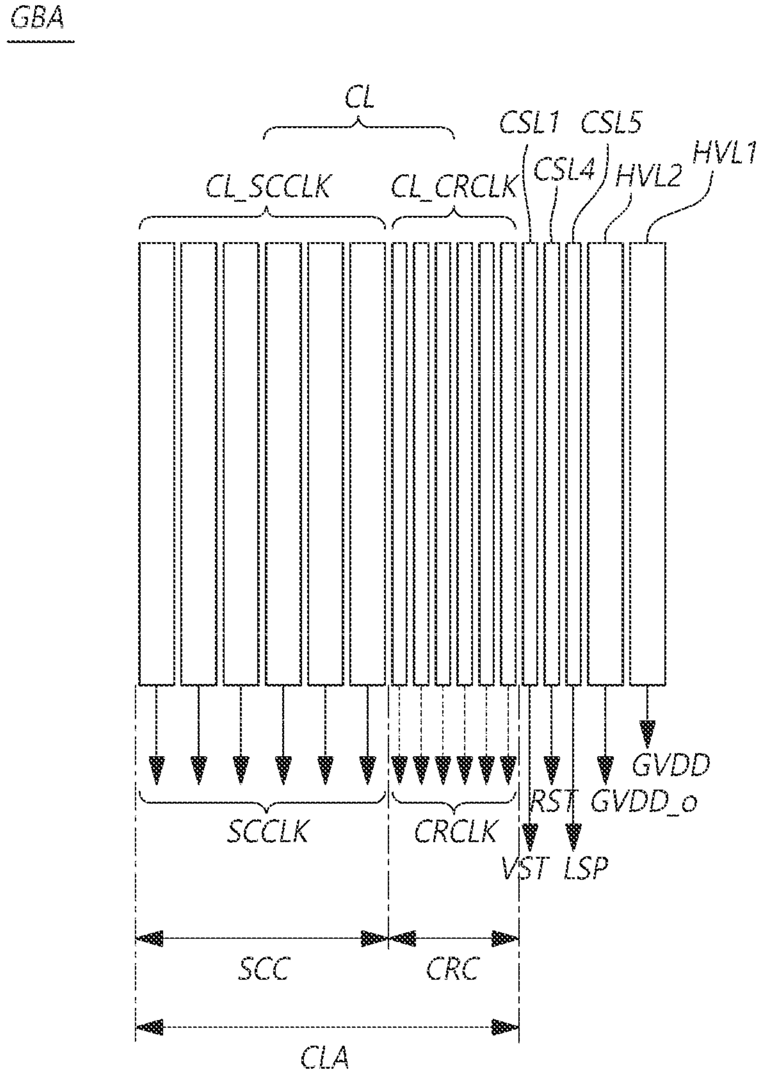
FIG. 18 illustrates, in the example where the second type of gate driving panel circuit is applied, an example line arrangement in a clock signal line area and a first power line area included in the gate bezel area in the display device according to aspects of the present disclosure.

FIG. 18 illustrates, in the example where the second type of gate driving panel circuit GPC is applied, an example line arrangement in a clock signal line area CLA and a first power line area PLA1 included in the gate bezel area GBA in the display device 100 according to aspects of the present disclosure.

Referring to FIG. 18, the gate bezel area GBA of the display panel 110 can include the clock signal line area CLA and the first power line area PLA1. The clock signal line area CLA and the first power line area PLA1 can be located on a first side of a gate driving panel circuit area GPCA (e.g., the gate driving panel circuit area GPCA of FIG. 15) in which the second type of gate driving panel circuit GPC is disposed.

In the example where the second type of gate driving panel circuit GPC is applied, the clock signal line area CLA in which a plurality of clock signal lines CL are disposed can include a scan clock signal line area SCC and a carry clock signal line area CRC.

Scan clock signal lines CL_SCCLK for delivering scan clock signals SCCLK to the gate driving panel circuit GPC can be disposed in the scan clock signal line area SCC.

Carry clock signal lines CL_CRCLK for delivering carry clock signals CRCLK to the gate driving panel circuit GPC can be disposed in the carry clock signal line area CRC.

The scan clock signal line area SCC can be located further away from the display area DA than the carry clock signal line area CRC. The carry clock signal line area CRC can be located closer to the display area DA than the scan clock signal line area SCC.

The scan clock signal line area SCC can be located further away from the gate drive panel circuit area GPCA than the carry clock signal line area CRC. The carry clock signal line area CRC can be located closer to the gate driving panel circuit area GPCA than the scan clock signal line area SCC.

Further, a width of one scan clock signal line CL_SCCLK can be greater than a width of one carry clock signal line CL_CRCLK.

At least one gate high voltage line HVL for delivering at least one gate high voltage GVDD to the gate driving panel circuit GPC can be disposed in the first power line area PLA1. For example, a first gate high voltage line HVL1 and a second gate high voltage line HVL1 for respectively delivering a first gate high voltage GVDD and a second gate high voltage GVDD_o to the gate driving panel circuit GPC can be disposed in the first power line area PLA1.

At least one control signal line can be further disposed in the first power line area PLA1. For example, the at least one control signal line can include at least one of a start signal line CSL1 for delivering a start signal VST for indicating the start of gate driving operation to the gate driving panel circuit GPC, a reset signal line CSL4 for delivering a reset signal RST for indicating the end of the gate driving operation to the gate driving panel circuit GPC, and a line selection signal line CSL5 for delivering a line selection signal LSP to the gate driving panel circuit GPC.

Each of the first gate high voltage line HVL1 and the second gate high voltage line HVL1 can have a greater width than the start signal line CSL1, the reset signal line CSL4, and the line selection signal line CSL5.

The first gate high voltage line HVL1, the second gate high voltage line HVL1, the start signal line CSL1, the reset signal line CSL4, and the line selection signal line CSL5 can be arranged in the first power line area PLA1 in various arrangement orders.

For example, as shown in the example of FIG. 18, the start signal line CSL1, the reset signal line CSL4, the line selection signal line CSL5, the second gate high voltage line HVL2, and the first gate high voltage HVL1 can be arranged in this sequential order. In this example, the start signal line CSL1 can be located closest to the clock signal line area CLA, and the first gate high voltage line HVL1 can be located furthest away from the clock signal line area CLA. For example, a third gate high voltage line HVL3 for delivering a third gate high voltage GVDD2 to the gate driving panel circuit GPC can be further disposed inside of the first gate high voltage line HVL1 in the first power line area PLA1.

Figure 19:
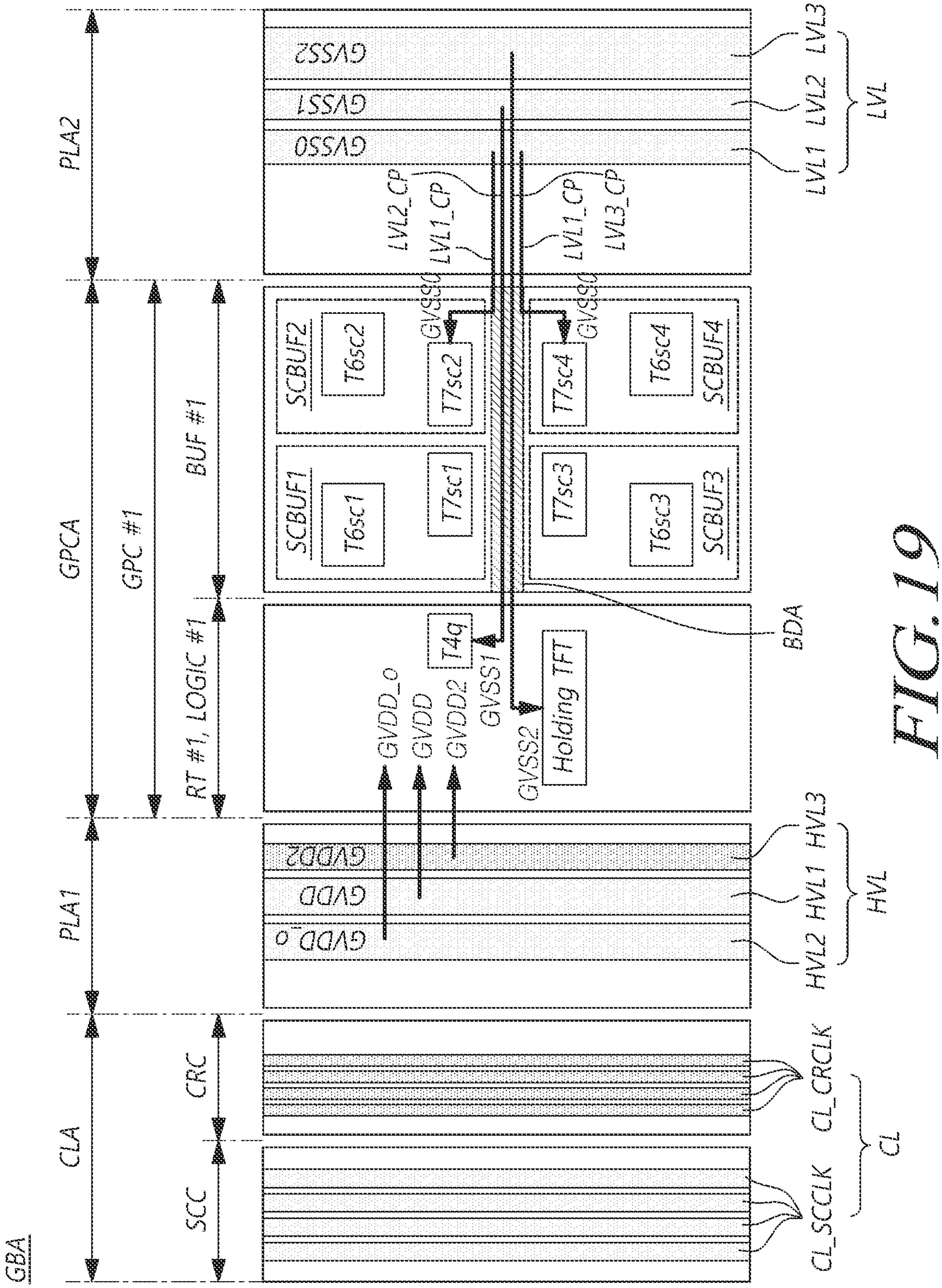
FIG. 19 is an example plan view of the gate bezel area of the display panel according to aspects of the present disclosure.

FIG. 19 is an example plan view of the gate bezel area GBA of the display panel 110 according to aspects of the present disclosure. For simplicity, discussions will be provided based on examples where a second type of first gate driving panel circuit GPC #1 (e.g., the first gate driving panel circuit GPC1 GPC #1 configured with the second type shown in FIG. 9B and FIG. 15) is disposed in a gate driving panel circuit area GPCA.

Referring to FIG. 19, a first output buffer block BUF #1, a first logic block LOGIC #1, and a first real-time sensing control block RT #1 can be disposed in the gate driving panel circuit area GPCA.

The first output buffer block BUF #1 can include a first scan output buffer SCBUF1 for outputting a first scan signal SC1, a second scan output buffer SCBUF1 for outputting a second scan signal SC2, a third scan output buffer SCBUF3 for outputting a third scan signal SC3, and a fourth scan output buffer SCBUF4 for outputting a fourth scan signal SC4.

The four scan output buffers (SCBUF1 to SCBUF4) can be configured such that two scan output buffers are placed over the central area BDA (which can be referred to as two upper scan output buffers), and two scan output buffers are placed under the central area BDA (which can be referred to as two lower scan output buffers). For example, the two upper scan output buffers can be the first scan output buffer SCBUF1 and the second scan output buffer SCBUF2, and the two lower scan output buffers can be the third scan output buffer SCBUF3 and the fourth scan output buffer SCBUF4. Accordingly, the first scan output buffer SCBUF1 and the second scan output buffer SCBUF2 can be located in a first direction with respect to the central area BDA, and the third scan output buffer SCBUF3 and the fourth scan output buffer SCBUF4 can be located in a direction opposite to the first direction with respect to the central area BDA.

The first scan output buffer SCBUF1 and the second scan output buffer SCBUF2, which are the two upper scan output buffers, and the third scan output buffer SCBUF3 and the fourth scan output buffers SCBUF4, which are the two lower scan output buffers, can have a symmetrical structure about the central area BDA of the first output buffer block BUF #1.

The locations and shapes of circuit components (T7*sc*1, T7*sc*2, T6*sc*1, T6*sc*2, and the like) included in each of the two upper scan output buffers and the locations and shapes of circuit components (T7*sc*3, T7*sc*4, T6*sc*3, T6*sc*4, and the like) included in each of the two lower scan output buffers can be symmetrical to each other about the central area BDA.

The two upper scan output buffers can have a left-right symmetrical structure. The two lower scan output buffers can have a left-right symmetrical structure.

For example, the first scan output buffer SCBUF1 and the second scan output buffer SCBUF2 can be two upper scan output buffers disposed over the central area BDA, and the third scan output buffer SCBUF3 and the fourth scan output buffer SCBUF4 can be two lower scan output buffers disposed under the central area BDA.

For example, the two upper scan output buffers (SCBUF1 and SCBUF2) and the two lower scan output buffers (SCBUF3 and SCBUF4) can have a symmetrical structure about the central area BDA. For example, the locations and shapes of circuit components included in each of the two upper scan output buffers (SCBUF1 and SCBUF2) and the two lower scan outputs (SCBUF3 and SCBUF4) can be symmetrical about the central area BDA.

For example, the two upper scan output buffers (SCBUF1 and SCBUF2) can have a left-right symmetrical structure. The two lower scan output buffers (SCBUF3 and SCBUF4) can have a left-right symmetrical structure.

A clock signal line area CLA can be located on a first side of the gate driving panel circuit area GPCA and can be an area in which a plurality of clock signal lines CL are disposed.

For example, the plurality of clock signal lines CL can include a plurality of scan clock signal lines CL_SCCLK and a plurality of carry clock signal lines CL_CRCLK.

Since each of the plurality of scan clock signal lines CL_SCCLK and the plurality of carry clock signal lines CL_CRCLK is desired to reduce load for gate driving, therefore, these lines can have a multilayer line structure.

The scan clock signal SCCLK can be more sensitive to signal delay or signal waveform changes in terms of driving than the carry clock signal CRCLK. Therefore, in order to reduce the load of the plurality of scan clock signal lines CL_SCCLK, a line width of each of the plurality of scan clock signal lines CL_SCCLK can be designed to be greater than a line width of each of the plurality of carry clock signal lines CL_CRCLK.

The plurality of scan clock signal lines CL_SCCLK can be located further away from the first gate driving panel circuit GPC #1 than the plurality of carry clock signal lines CL_CRCLK.

A first power line area PLA1 can be located on the first side of the gate driving panel circuit area GPCA and include at least one gate high voltage line HVL disposed in a column direction.

For example, the at least one gate high voltage line HVL can include a first gate high voltage line HVL1 for delivering a first gate high voltage GVDD to the first gate driving panel circuit GPC #1, a second gate high voltage line HVL2 for delivering a second gate high voltage GVDD_o to the first gate driving panel circuit GPC #1, and a third gate high voltage line HVL3 for delivering a third gate high voltage GVDD2 to the first gate driving panel circuit GPC #1.

The first gate high voltage line HVL1 can be a first gate high voltage node HV1 or can be electrically connected to the first gate high voltage node HV1. The second gate high voltage line HVL2 can be a second gate high voltage node HV2 or can be electrically connected to the second gate high voltage node HV2. The third gate high voltage line HVL3 can be a third gate high voltage node HV3 or can be electrically connected to the third gate high voltage node HV3.

The first gate high voltage GVDD, the second gate high voltage GVDD_o, and the third gate high voltage GVDD2 can be supplied to the first logic block LOGIC #1 included in the first gate driving panel circuit GPC #1.

Among the first gate high voltage GVDD, the second gate high voltage GVDD_o, and the third gate high voltage GVDD2, the first gate high voltage GVDD can be supplied to the first real-time sensing control block RT #1 included in the first gate driving panel circuit GPC #1.

A second power line area PLA2 can be located on a second opposing side of the gate driving panel circuit area GPCA and include at least one gate low voltage line LVL disposed in the column direction.

For example, the at least one gate low voltage line LVL can include a first gate low voltage line LVL1 for delivering a first gate low voltage GVSS0 to the first gate driving panel circuit GPC #1, a second gate low voltage line LVL2 for delivering a second gate low voltage GVSS1 to the first gate driving panel circuit GPC #1, and a third gate low voltage line LVL3 for delivering a third gate low voltage GVSS2 to the first gate driving panel circuit GPC #1.

The first gate low voltage line LVL1 can be a first gate low voltage node LV1 or can be electrically connected to the first gate low voltage node LV1. The second gate low voltage line LVL2 can be a second gate low voltage node LV2 or can be electrically connected to the second gate low voltage node LV2. The third gate low voltage line LVL3 can be a third gate low voltage node LV3 or can be electrically connected to the third gate low voltage node LV3.

The first gate low voltage GVSS0 can be supplied to the first to fourth scan output buffers (SCBUF1, SCBUF2, SCBUF3, and SCBUF4) included in the first output buffer block BUF #1 of the first gate driving panel circuit GPC #1.

The first gate low voltage GVSS0 can be applied to drain nodes or source nodes of first to fourth scan pull-down transistors (T7*sc*1, T7*sc*2, T7*sc*3, and T7*sc*4) respectively included in the first to fourth scan output buffers (SCBUF1, SCBUF2, SCBUF3, and SCBUF4).

To implement this, referring to FIG. 19, the display panel 110 can further include a plurality of gate low voltage connection lines (LVL1_CP, LVL2_CP, and LVL3_CP) for connecting the gate low voltage lines (LVL1, LVL2, and LVL3) disposed in the second power line area PLA2 to the first gate driving panel circuit GPC #1 disposed in the gate driving panel circuit area GPCA.

The plurality of gate low voltage connection lines (LVL1_CP, LVL2_CP, and LVL3_CP) can run through the central area BDA in the area of the first output buffer block BUF #1.

For electrically connecting the drain nodes or source nodes of first and second scan pull-down transistors (T7*sc*1 and T7*sc*2) included in the two upper scan output buffers (SCBUF1 and SCBUF2) to the first gate low voltage line LVL1, a first gate low voltage connection line LVL1_CP can be disposed such that the first gate low voltage connection line LVL1_CP extends in the row direction. For electrically connecting the drain nodes or source nodes of third and fourth scan pull-down transistors (T7*sc*3 and T7*sc*4) included in the two lower scan output buffers (SCBUF3 and SCBUF4) to the first gate low voltage line LVL1, a first gate low voltage connection line LVL1_CP can be disposed such that the first gate low voltage connection line LVL1_CP extends in the row direction.

The first gate low voltage connection line LVL1_CP can run through the central area BDA located between the two upper scan output buffers (SCBUF1 and SCBUF2) and the two lower scan output buffers (SCBUF3 and SCBUF4).

The second gate low voltage GVSS1 can be supplied to the first logic block LOGIC #1 of the first gate driving panel circuit GPC #1.

The second gate low voltage GVSS1 can be applied to the drain node or source node of a first inverter control transistor T4*q* included in the first logic block LOGIC #1.

To implement this, for connecting the drain node or source node of the first inverter control transistor T4*q* included in the first logic block LOGIC #1 to the second gate low voltage line LVL2, the second gate low voltage connection line LVL2_CP can be disposed such that the second gate low voltage connection line LVL2_CP extends in the row direction.

The second gate low voltage connection line LVL2_CP can run through the central area BDA located between the two upper scan output buffers (SCBUF1 and SCBUF2) and the two lower scan output buffers (SCBUF3 and SCBUF4).

The third gate low voltage GVSS2 can be supplied to the first logic block LOGIC #1 of the first gate driving panel circuit GPC #1.

The third gate low potential voltage GVSS2 can be applied to the drain nodes or source nodes of holding transistors (Holding TFT) included in the first logic block LOGIC #1 and connected to the third gate low voltage node LV3. The holding transistors can include a second Q node discharging transistor T3*na*, a fourth Q node discharging transistor T3*nc*, a second stabilization transistor T3*a*, a second QB node discharging transistor T5*q*, a first QB node discharging transistor T5, and a fourth QB node discharging transistor T5*b*.

Further, the third gate low voltage GVSS2 can be applied to the drain node or source node of a carry pull-down transistor T7*cr* included in the carry output buffer CRBUF of the first output buffer block BUF #1.

To implement this, for connecting the drain nodes or source nodes of the holding transistors included in the first logic block LOGIC #1 and connected to the third gate low voltage node LV3 to the third gate low voltage line LVL3, the third gate low voltage connection line LVL3_CP can be disposed such that the third gate low voltage connection line LVL3_CP extends in the row direction.

The third gate low voltage connection line LVL3_CP can also connect the drain node or source node of the carry pull-down transistor T7*cr* included in the carry output buffer CRBUF of the first output buffer block BUF #1 to the third gate low voltage line LVL3.

The third gate low voltage connection line LVL3_CP can run through the central area BDA located between the two upper scan output buffers (SCBUF1 and SCBUF2) and the two lower scan output buffers (SCBUF3 and SCBUF4).

As described above, since the two upper scan output buffers (SCBUF1 and SCBUF2) and the two lower scan output buffers (SCBUF3 and SCBUF4) included in the first output buffer block BUF #1 has a symmetrical structure about the central area BDA, therefore, the gate low voltages (GVSS0, GVSS1, and GVSS2) can be efficiently delivered (supplied).

Hereinafter, the usage and structure of the first, second, and third gate high voltage lines (HVL1, HVL2, and HVL3) will be discussed, and the usage and structure of the first, second, and third gate low voltage lines (LVL1, LVL2, and LVL3) will be discussed.

The first gate high voltage GVDD supplied through the first gate high voltage line HVL1 can be a high voltage used to cause the Q node to charge by being supplied to a Q node charging block of the input and reset blocks IR. For example, the first gate high voltage GVDD supplied through the first gate high voltage line HVL1 can be a high voltage used to cause the Q node to charge by being applied to the drain node or source node of a first Q node charging transistor T1.

Further, the first gate high voltage GVDD supplied through the first gate high voltage line HVL1 can be a high voltage used to cause the Q node to charge by being supplied to the real-time sensing control block RT #1 during a real-time sensing driving period.

The second gate high voltage GVDD_o supplied through the second gate high voltage line HVL2 can be a high voltage used to cause the QB node to charge by being supplied to the inverter block IVT.

The third gate high voltage GVDD2 supplied through the third gate high voltage line HVL3 can be applied to the drain node (or source node) and the gate node of a first Q node charging control transistor T11, and be applied to a Q node charging control node Nqc through the first Q node charging control transistor T11. The first Q node charging control transistor T11 can serve to compensate for a negative threshold voltage of the first Q node charging transistor T1.

The first gate low voltage GVSS0 supplied through the first gate low voltage line LVL1 can be supplied to the first to fourth scan output buffers (SCBUF1 to SCBUF4) of the first output buffer block BUF #1. Thereby, the first gate low voltage GVSS0 can cause voltage levels of first to fourth scan signals (SC1 to SC4) to have a turn-off voltage level, and in turn, turn off driving for the first to fourth scan signal lines (SCL1 to SCL4).

The second gate low voltage GVSS1 supplied through the second gate low voltage line LVL2 can be a low voltage applied to the drain node or source node of the first inverter control transistor T4*q* included in the inverter block IVT.

The second gate low voltage GVSS1 can be configured as a separate low voltage separate from the third gate low voltage GVSS2.

The third gate low voltage GVSS2 supplied through the third gate low voltage line LVL3 can be a low voltage used to cause the Q node to discharge (or turn off) and the QB node to discharge (or turn off) by being supplied to the first logic block LOGIC #1.

The third gate low voltage GVSS2 supplied through the third gate low voltage line LVL3 can be a power supply voltage supplied to the largest number of transistors.

Each of the first gate high voltage line HVL1, the second gate high voltage line HVL2, the first gate low voltage line LVL1, the second gate low voltage line LVL2, and the third gate low voltage. Line LVL3 can be desired to have a smaller line resistance because the first gate high voltage GVDD, the second gate high voltage GVDD_o, the first gate low voltage GVSS0, the second gate low voltage GVSS1, and the third gate low voltage GVSS2 directly affect the output of the first gate driving panel circuit GPC #1.

Accordingly, each of the first gate high voltage line HVL1, the second gate high voltage line HVL2, the first gate low voltage line LVL1, the second gate low voltage line LVL2, and the third gate low voltage line LVL3 can have a multilayer line structure.

The first Q node charging control transistor T11 connected to the third gate high voltage line HVL3 may not require a relatively high voltage. Further, one or more lines can intersect, and overlap with, the third gate high voltage line HVL3. Considering these issues, the third gate high voltage line HVL3 can have a single-layer line structure.

The structure in the gate bezel area GBA described with reference to FIG. 19 is for the example where the gate driving panel circuit GPC is configured with the second type. It should be noted here that the structure in the gate bezel area GBA described with reference 19 FIG. 19 can be equally or substantially equally applied to the example where the gate driving panel circuit GPC is configured with the first type. For example, when the gate driving panel circuit GPC is configured with the first type, an area between the first gate driving panel circuit GPC #1 and the second gate driving panel circuit GPC #2 can be the central area BDA through which the first gate low voltage connection line LVL1_CP, the second gate low voltage connection line LVL2_CP, and the third gate low voltage connection line LVL3_CP run.

Hereinafter, the multilayer line structure of the plurality of clock signal lines CL will be described with reference to FIG. 20A, and then, the multilayer line structure of each of the first gate high voltage line HVL1, the second gate high voltage line HVL2, the first gate low voltage line LVL1, the second gate low voltage line LVL2, and the third gate low voltage line LVL3 will be described with reference to FIG. 20B. Thereafter, the single-layer line structure of the third gate high voltage line HVL3 will be described with reference to FIG. 20C.

Figure 20A:
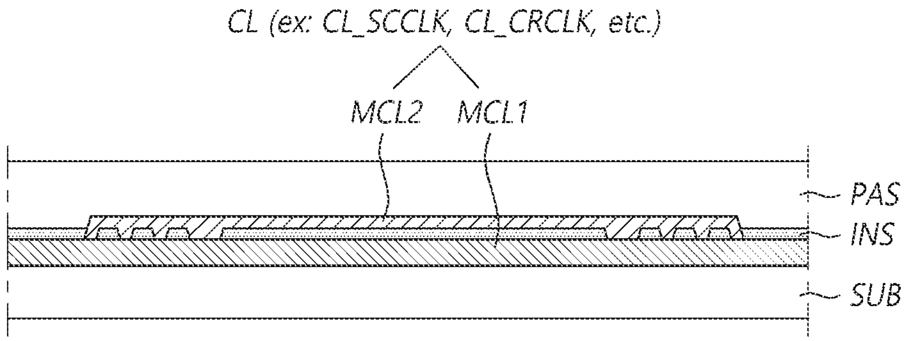
FIG. 20A illustrates an example multilayer line structure of one or more clock signal lines disposed in the gate bezel area of the display panel according to aspects of the present disclosure.

FIG. 20A illustrates an example multilayer line structure of one or more clock signal lines CL disposed in the gate bezel area GBA of the display panel 110 according to aspects of the present disclosure.

Referring to FIG. 20A, a plurality of clock signal lines CL disposed in a clock signal line area CLA can include a carry clock signal line CL_CRCLK and a scan clock signal line CL_SCCLK, and further include a sensing clock signal line. All or one or more of the plurality of clock signal lines CL can be multilayer lines. For example, at least one clock signal line CL can have a multilayer line structure.

The clock signal line(s) CL having such a multilayer line structure can include a first metal clock signal line MCL1 and a second metal clock signal line MCL2, which are electrically connected to each other. The first metal clock signal line MCL1 and the second metal clock signal line MCL2 can be located in different layers and be electrically connected to each other.

The first metal clock signal line MCL1 can be disposed in a first metal layer, which is a metal layer between a substrate SUB and an insulating layer INS on the substrate SUB.

The second metal clock signal line MCL2 can be disposed in a second metal layer, which is a metal layer between the insulating layer INS and a protective layer PAS on the insulating layer INS.

For example, the insulating layer INS can include a buffer layer and a gate insulating layer.

The second metal clock signal line MCL2 can be connected to the first metal clock signal line MCL1 through a contact hole in the insulating layer INS.

For example, a light shield can be located under an active layer (channel) of a driving transistor DRT disposed in the display area DA and can overlap with the channel of the driving transistor DRT. The insulating layer (e.g., the buffer layer) can be disposed between the channel of the driving transistor DRT and the light shield. The light shield can be formed from a first metal (e.g., a light shield metal). For example, the first metal layer can be a metal layer in which the light shield is disposed.

One of two or more capacitor electrodes constituting a storage capacitor Cst formed in the display area DA can be formed from the first metal (the light shield metal). For example, the first metal layer can be a metal layer in which one of two or more capacitor electrodes constituting the storage capacitor Cst is disposed.

In another example, the source and drain electrode of the transistor can be formed from a first metal (e.g., a source-drain metal). For example, the first metal layer can be a metal layer in which the source and drain electrodes of the transistor are disposed.

For example, a scan signal line SCL and a sensing signal line SENL can be formed from a second metal (e.g., a gate metal). For example, the second metal layer can be a metal layer in which the scan signal line SCL and the sensing signal line SENL are disposed. The second metal layer can be a metal layer in which the other one or another one of two or more capacitor electrodes constituting the storage capacitor Cst formed in the display area DA is disposed.

Figure 20B:
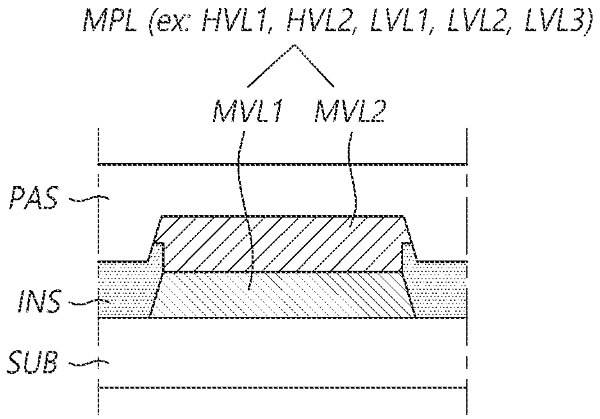
FIG. 20B illustrates an example multilayer line structure of one or more power lines disposed in the gate bezel area of the display panel according to aspects of the present disclosure.

FIG. 20B illustrates an example multilayer line structure of at least one multilayer power line MPL disposed in the gate bezel area GBA of the display panel 110 according to aspects of the present disclosure.

Referring to FIG. 20B, at least one multilayer power line MPL having a multilayer line structure can be disposed in the gate bezel area GBA.

The multilayer power line MPL can include a first metal power line MVL1 and a second metal power line MVL2. The first metal power line MVL1 and the second metal power line MVL2 can be located in different layers and can be electrically connected to each other.

The first metal power line MVL1 can be disposed in a first metal layer between a substrate SUB and an insulating layer INS on the substrate SUB. The second metal power line MVL2 can be disposed in a second metal layer between the insulating layer INS and a protective layer PAS on the insulating layer INS. For example, the insulating layer INS can include a buffer layer and a gate insulating layer.

The second metal power line MVL2 can be connected to the first metal power line MVL1 through a contact hole in the insulating layer INS.

For example, the first metal layer can be a metal layer in which a light shield located under the channel of a driving transistor DRT formed in the display area DA is disposed. The first metal layer can be a metal layer in which one of two or more capacitor electrodes constituting a storage capacitor Cst formed in the display area DA is disposed.

In another example, the first metal layer can be a metal layer constituting the source and drain electrode of the transistor.

For example, the second metal layer can be a metal layer in which a scan signal line SCL and a sensing signal line SENL are disposed. The second metal layer can be a metal layer in which the other one or another one of two or more capacitor electrodes constituting the storage capacitor Cst formed in the display area DA is disposed.

For example, the multilayer power line MPL having the multilayer line structure can include the first gate high voltage line HVL1, the second gate high voltage line HVL2, the first gate low voltage line LVL1, the second gate low voltage line LVL2, and the third gate low voltage line LVL3.

Figure 20C:
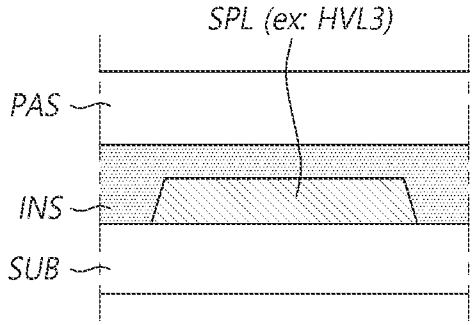
FIG. 20C illustrates an example single-layer line structure of a power line disposed in the gate bezel area of the display panel according to aspects of the present disclosure.

FIG. 20C illustrates an example single-layer line structure of at least one single-layer power line disposed in the gate bezel area GBA of the display panel 110 according to aspects of the present disclosure.

Referring to FIG. 20C, at least one single-layer power line SPL having a single-layer line structure can be disposed in the gate bezel area GBA.

The single-layer power line SPL can be disposed in a first metal layer between a substrate SUB and an insulating layer INS on the substrate SUB. For example, the insulating layer INS can include a buffer layer and a gate insulating layer.

For example, the first metal layer can be a metal layer in which a light shield located under the channel of a driving transistor DRT formed in the display area DA is disposed. The first metal layer can be a metal layer in which one of two or more capacitor electrodes constituting a storage capacitor Cst formed in the display area DA is disposed.

In another example, the first metal layer can be a metal layer constituting the source and drain electrode of the transistor.

For example, the single-layer power line SPL having the single-layer line structure can include the third gate high voltage line HVL3.

Referring to FIGS. 20A, 20B, and 20, all or one or more of the plurality of clock signal lines CL can be multilayer lines. At least one of the plurality of gate high voltage lines HVL can be a single-layer line, and the remaining gate high voltage lines HVL can be multilayer lines. The plurality of gate low voltage lines LVL can be multilayer lines.

Figure 21:
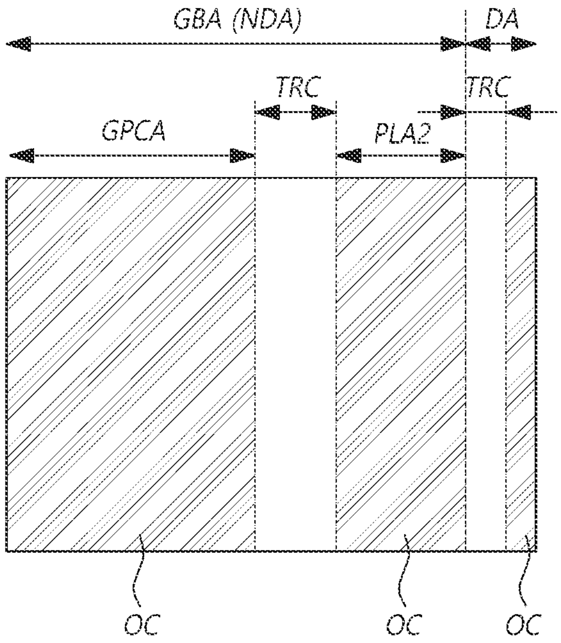
FIGS. 21 and 22 respectively are a plan view and a cross-sectional view for an example area including the gate bezel area in the display panel according to aspects of the present disclosure.

FIG. 21 is a plan view of an example area including the gate bezel area GBA in the display panel 100 according to aspects of the present disclosure.

Referring to FIG. 21, the gate bezel area GBA of the non-display area NDA can include a gate driving panel circuit area GPCA and a second power line area PLA2.

An overcoat layer OC can be disposed in the gate bezel area GBA of the non-display area NDA. At least one trench TRC in which the overcoat layer OC is removed can be present in the gate bezel area GBA.

For example, the at least one trench TRC can be formed in at least one of a first area between the gate driving panel circuit area GPCA and the second power line area PLA2 and a second area between the second power line area PLA2 and the display area DA.

For example, a first trench TRC can be located in the first area between the gate driving panel circuit area GPCA and the second power line area PLA2. For example, the overcoat layer OC can be disposed in each of the gate driving panel circuit area GPCA and the second power line area PLA2, and an area (i.e., the first area) between the gate driving panel circuit area GPCA and the second power line area PLA2, in which the overcoat layer is not disposed, can correspond to the first trench TRC.

For example, a second trench TRC can additionally located in the second area between the second power line area PLA2 and the display area DA. For example, the overcoat layer OC can be disposed in each of the second power line area PLA2 and the display area DA, and an area (i.e., the second area) between the second power line area PLA2 and the display area DA, in which the overcoat layer is not disposed, can correspond to the second trench TRC.

As the display panel 110 has the above-described trench structure, the penetration of moisture $H_2O$ into an emission layer EL can be prevented.

Figure 22:
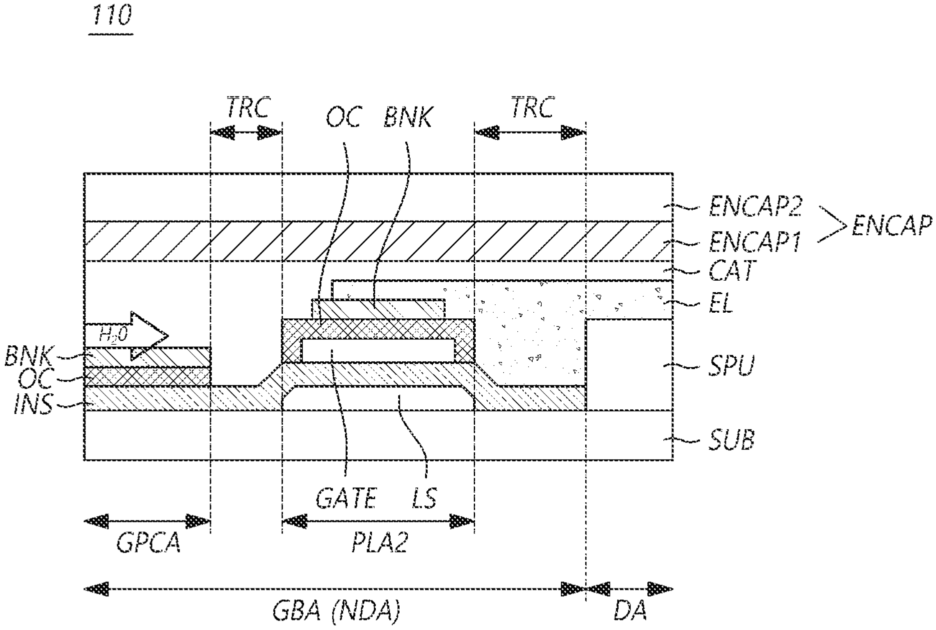

FIG. 22 is a cross-sectional view of an example area including the gate bezel area GBA in the display panel 100 according to aspects of the present disclosure.

Referring to FIG. 22, a light shield LS can be disposed on a substrate SUB in a second power line area PLA2 of the gate bezel area GBA.

In the gate bezel area GBA, an insulating layer INS can be disposed such that the insulating layer INS covers the light shield LS.

In the second power line area PLA2 of the gate bezel area GBA, a gate material layer GATE can be disposed on the insulating layer INS and overlap with the light shield LS.

In a gate driving panel circuit area GPCA of the gate bezel area GBA, an overcoat layer OC can be disposed on the insulating layer INS.

In the second power line area PLA2 of the gate bezel area GBA, the overcoat layer OC can be disposed such that the overcoat layer OC covers the gate material layer GATE on the insulating layer INS.

In a gate driving panel circuit area GPCA and the second power line area PLA2 of the gate bezel area GBA, a bank BNK can be disposed on the overcoat layer OC.

In the gate bezel area GBA, a trench TRC can be formed in an area between the gate driving panel circuit area GPCA and the second power line area PLA2, in which the overcoat layer OC and the bank BNK are not present (or removed).

In the gate bezel area GBA, an additional trench TRC can be formed in an area between the second power line area PLA2 and the display area DA, in which the overcoat layer OC and the bank BNK are not present (or removed).

Meanwhile, in the display area DA, an emission layer EL can be disposed under a cathode electrode CAT, and a subpixel section SPU can be located under the emission layer EL. The subpixel section SPU can include an anode electrode AE, transistors (DRT, SCT, SENT, and the like), and a storage capacitor Cst. The emission layer EL can extend to the gate bezel area GBA of the non-display area NDA.

For example, the emission layer EL can extend from the display area DA to the non-display area NDA and extend to an upper portion of the bank BNK in the second power line area PLA2 via the trench TRC.

In the display area DA, the cathode electrode CAT can be disposed on the emission layer EL. The cathode electrode CAT can extend to the gate bezel area GBA of the non-display area NDA. Accordingly, the cathode electrode CAT can extend from the display area DA to all or a portion of the gate driving panel circuit area GPCA.

The cathode electrode CAT can be disposed in an area in which the trench TRC between the gate driving panel circuit area GPCA and the second power line area PLA2 is present, and be disposed in an area in which the trench TRC between the second power line area PLA2 and the display area DA is present.

An encapsulation layer ENCAP can be disposed on the cathode electrode CAT. The encapsulation layer ENCAP can extend from the display area DA to a portion of the non-display area NDA.

The encapsulation layer ENCAP can include a first encapsulation layer ENCAP1 on the cathode electrode CAT and a second encapsulation layer ENCAP2 on the first encapsulation layer ENCAP1. For example, the first encapsulation layer ENCAP1 can include an adhesive and/or a moisture absorbent having an encapsulation function. The first encapsulation layer ENCAP1 can include an organic material. The second encapsulation layer ENCAP2 can include a metal or an inorganic material.

Figure 23:
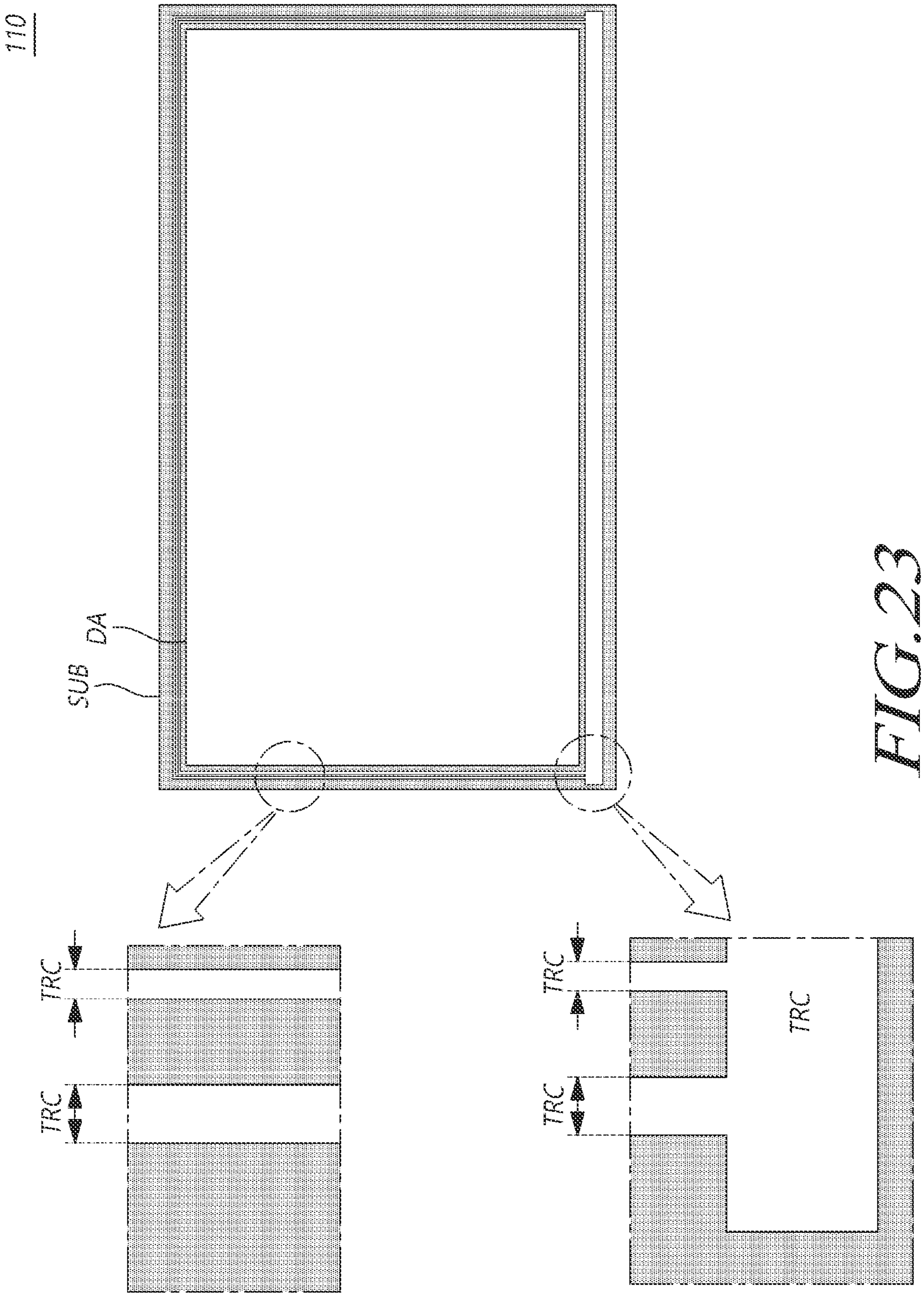
FIG. 23 is an example plan view of the display panel according to aspects of the present disclosure, and illustrates an example trench (or trenches) formed in one or more edges of the display panel.

FIG. 23 is an example plan view of the display panel 110 according to aspects of the present disclosure, and illustrates an example trench (or trenches) formed in one or more edges of the display panel 110 (e.g., upper, lower, left, and/or right edges).

Referring to FIG. 23, a trench TRC can be formed along the entire edge of the display panel 110. For example, the trench TRC can be located in the non-display area NDA such that the trench TRC surrounds the display area DA.

For example, two rows of trenches TRC as shown in FIGS. 21 and 22 can be formed in three outer edges among four outer edges of the display panel 110. For example, a width of a single row of trench TRC (e.g., formed in a bottom outer edge of the display panel 110) can be greater than a width of each of the two rows of trenches TRC.

For example, a single row of trench TRC can be formed in one of the four outer edges of the display panel 110. The one outer edge in which the single row of trench TRC is formed can be an area in which circuit films CF on which source driver integrated circuits SDIC are mounted are connected.

Figure 24:
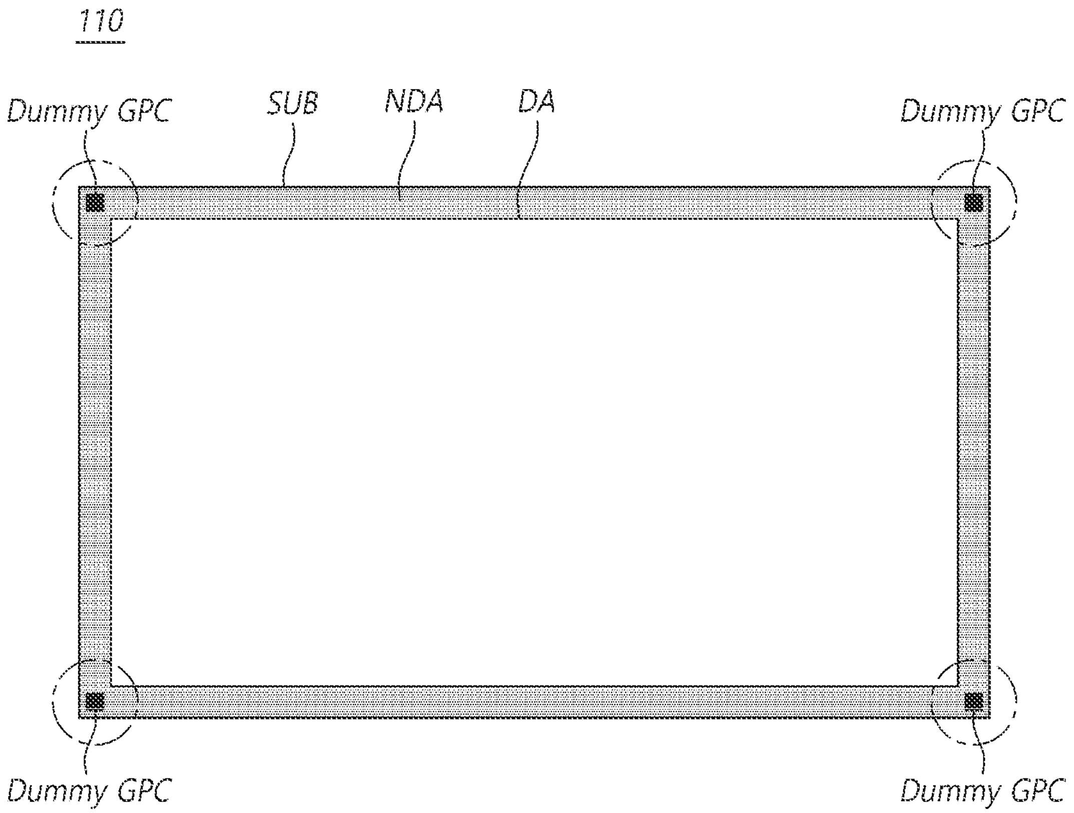
FIG. 24 is an example plan view of the display panel according to aspects of the present disclosure, and illustrates one or more example dummy gate driving panel circuits disposed in one or more corner areas of the display panel.

FIG. 24 is an example plan view of the display panel 110 according to aspects of the present disclosure, and illustrates one or more example dummy gate driving panel circuits (Dummy GPC) disposed in one or more corner areas of the display panel 110 (e.g., upper-left, upper-right, lower-left, and/or lower-rights corners).

Referring to FIG. 24, in one or more embodiments, the display panel 110 according to aspects of the present disclosure can include one or more dummy gate driving panel circuits disposed at all, or one or more, of a plurality of corner areas (or corner points) of the non-display area DNA.

The dummy gate driving panel circuit can have basically the same structure as the first or second type of gate driving panel circuit GPC. However, the dummy gate driving panel circuit may not be connected to a gate line GL actually used to drive the display. For example, such a gate line GL can be a scan signal line SCL or a sensing signal line SENL.

Figure 25:
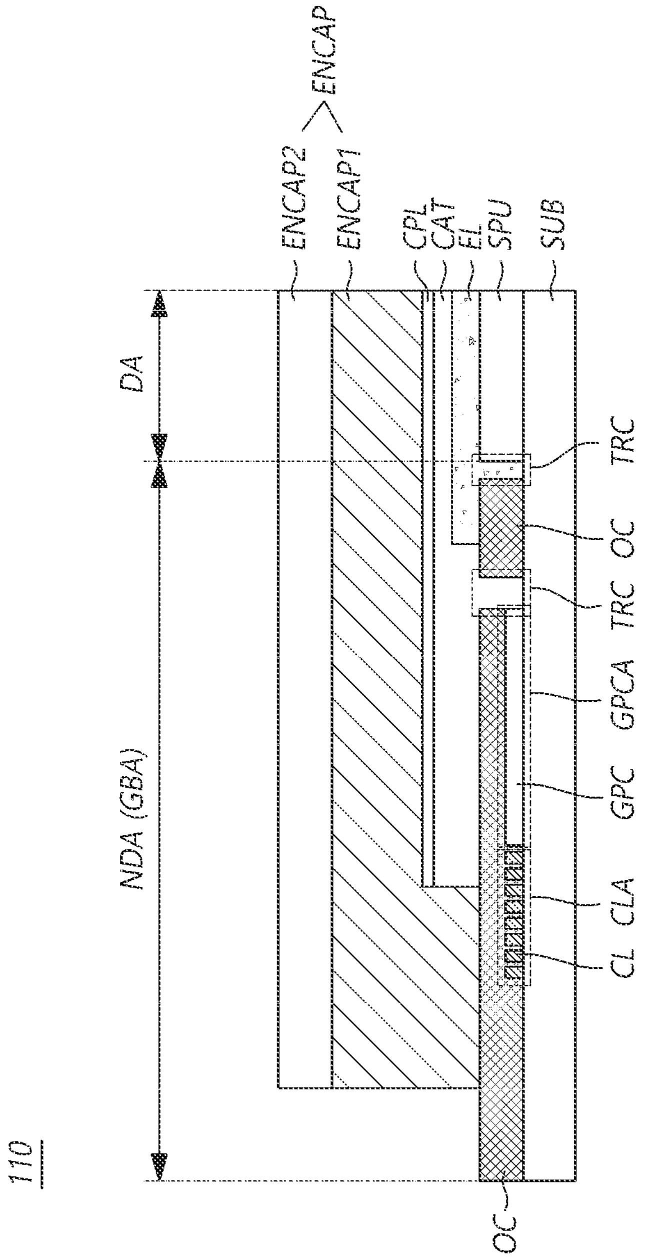
FIG. 25 is an example cross-sectional view of the display panel according to aspects of the present disclosure, and illustrates an area including the gate bezel area and a portion of display area.

FIG. 25 is an example cross-sectional view of the display panel 110 according to aspects of the present disclosure, and illustrates an area including the gate bezel area GBA and a portion of display area DA.

The cross-sectional view of FIG. 25 represents an area including the gate bezel area GBA where a gate driving panel circuit GPC (e.g., the first type of gate driving panel circuit GPC or the second type of gate driving panel circuit GPC discussed above) is disposed and a portion of the display area DA adjacent to the gate bezel area GBA in the non-display area NDA of the display panel 110.

Referring to FIG. 25, in one or more embodiments, the display panel 110 according to aspects of the present disclosure can include a substrate SUB, the gate driving panel circuit GPC, a plurality of clock signal lines CL, an overcoat layer OC, a cathode electrode CAT, and the like.

The display area DA and the non-display area NDA can be defined on the substrate SUB.

The gate driving panel circuit GPC can be disposed on the substrate SUB, disposed in a gate driving panel circuit area GPCA included in the gate bezel area GBA of the non-display area NDA of the substrate SUB, and configured to output a corresponding gate signal to each of a plurality of gate lines GL disposed in the display area DA.

For example, when the first type of gate driving panel circuit GPC is applied, the plurality of gate lines can include a plurality of scan signal lines SCL and a plurality of sensing signal lines SENL. In another example, when the second type of gate driving panel circuit GPC is applied, the plurality of gate lines can include a plurality of scan signal lines SCL.

The plurality of clock signal lines CL can be disposed on the substrate SUB, and disposed in a clock signal line area CLA located on a first side of the gate driving panel circuit area GPCA in the non-display area NDA of the substrate SUB. Each of the plurality of clock signal lines CL can deliver a corresponding clock signal to the gate driving panel circuit GPC.

For example, the clock signal line area CLA can be located further away from the display area DA than the gate driving panel circuit area GPCA. For example, the clock signal line area CLA can be located in a further outer edge of the substrate SUB than the gate driving panel circuit area GPCA.

For example, when the first type of gate driving panel circuit GPC is applied, the plurality of clock signal lines CL can include a plurality of carry clock signal lines CL_CR-CLK, a plurality of scan clock signal lines CL_SCCLK, and a plurality of sensing clock signal lines CL_SECLK. In another example, when the second type of gate driving panel circuit GPC is applied, the plurality of clock signal lines CL can include a plurality of scan clock signal lines CL_SC-CLK and a plurality of carry clock signal lines CL_CRCLK.

The overcoat layer OC can be disposed on the plurality of clock signal lines CL.

The overcoat layer OC can be disposed on the gate driving panel circuit GPC.

The cathode electrode CAT can be disposed in the display area DA and extend to the non-display area NDA.

The cathode electrode CAT can extend to the gate bezel area GBA in the non-display area NDA. For example, the cathode electrode CAT can extend to all or at least a portion of the gate driving panel circuit GPC such that the cathode electrode CAT is located on (or covers) all or at least a portion of the gate driving panel circuit GPC. According to this configuration, the cathode electrode CAT can overlap with all or at least a portion of the gate driving panel circuit GPC.

The cathode electrode CAT can extend to the gate bezel area GBA in the non-display area NDA. For example, the cathode electrode CAT can extend to all, or one or more, of the plurality of clock signal lines CL such that the cathode electrode CAT is located on (or covers) all, or one or more, of the plurality of clock signal lines CL. According to this configuration, the cathode electrode CAT can overlap with all, or one or more, of the plurality of clock signal lines CL.

A first power line area PLA1 can be disposed between the clock signal line area CLA and the gate driving panel circuit area GPCA, and a second power line area PLA2 can be disposed between the gate driving panel circuit area GPCA and the display area DA. It should be noted that, in FIG. 25, the first power line area PLA1 and the second power line area PLA2 are omitted.

An emission layer EL located under the cathode electrode CAT can be disposed in the display area DA and, for example, extend to a portion of the non-display area NDA. The emission layer EL can overlap with a portion of the overcoat layer OC.

A subpixel section SPU can be located under the emission layer EL. The subpixel section SPU can include an anode electrode AE, transistors (DRT, SCT, SENT, and the like), and a storage capacitor Cst.

One or more trenches TRC, which can be holes formed in the overcoat layer OC or areas in which corresponding portions of the overcoat layer OC are removed, can be present in the non-display area NDA. For example, when a plurality of trenches TRC are present, one of the plurality of trenches TRC may not overlap with the emission layer EL, and the other or another thereof can overlap with the emission layer EL. The emission layer EL can extend to the non-display area NDA and be inserted into the one or more trenches TRC formed in the overcoat layer OC.

In one or more embodiments, the display panel 110 according to aspects of the present disclosure can include a capping layer CPL disposed on the cathode electrode CAT and an encapsulation layer ENCAP disposed on the capping layer CPL.

The encapsulation layer ENCAP can include a first encapsulation layer ENCAP1 and a second encapsulation layer ENCAP2. For example, the first encapsulation layer ENCAP1 can include an adhesive and/or a moisture absorbent having an encapsulation function. The first encapsulation layer ENCAP1 can include an organic material. The second encapsulation layer ENCAP2 can include a metal or an inorganic material. The second encapsulation layer ENCAP2 can be disposed such that the second encapsulation layer ENCAP2 covers the cathode electrode CAT, the capping layer CPL, and the first encapsulation layer ENCAP1.

The encapsulation layer ENCAP can overlap with the plurality of clock signal lines CL and the gate driving panel circuit GPC.

Each of the emission layer EL, the cathode electrode CAT, and the capping layer CPL can have a slightly different size or edge position from each other depending on process errors during the manufacturing process of the display panel 110. For example, the cathode electrode CAT may not overlap with all of the plurality of clock signal lines CL disposed in the clock signal line area CLA. Depending on the process errors, a portion of the cathode electrode CAT can overlap with all or one or more of the plurality of clock signal lines CL disposed in the clock signal line area CLA.

Figure 26:
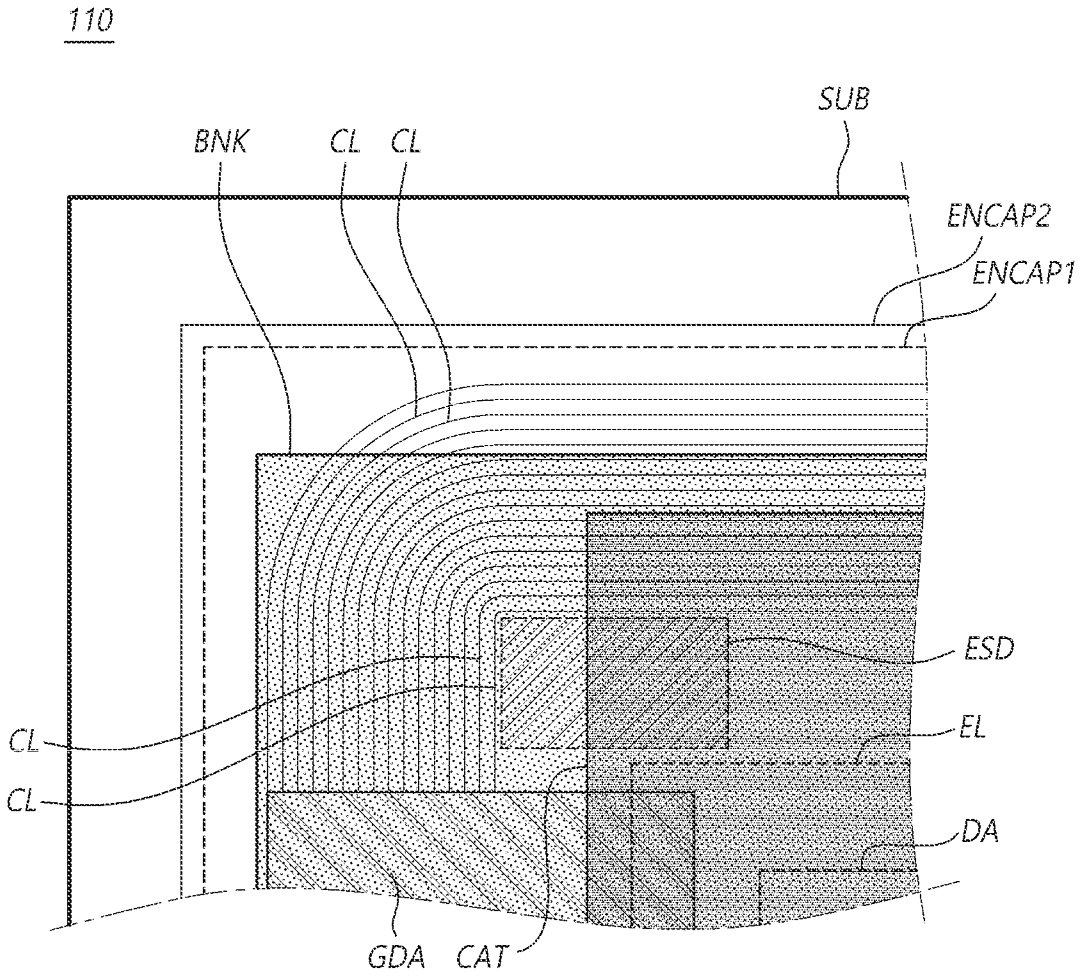
FIG. 26 is a plan view illustrating an example outer corner area of the display panel according to aspects of the present disclosure.

FIG. 26 is a plan view illustrating an example outer corner area of the substrate SUB of the display panel 110 according to aspects of the present disclosure.

Referring to FIG. 26, in one or more embodiments, the display panel 110 according to aspects of the present disclosure can include a bank BNK extending from the display area DA to the non-display area NDA, an emission layer EL (e.g., the emission layer EL discussed above with reference to FIG. 25) extending from the display area DA to the non-display area NDA, a cathode electrode CAT (e.g., the cathode electrode CAT discussed above with reference to FIG. 25) extending from the display area DA to the non-display area NDA and located on the emission layer EL, and an electrostatic discharge component ESD disposed in the outer corner area of the non-display area NDA.

In one or more embodiments, a corner portion of bank BNK, a corner portion of cathode electrode CAT, a corner portion of a first encapsulation layer ENCAP1 (e.g., the first encapsulation layer ENCAP1 discussed above with reference to FIG. 25), and a corner portion of a second encapsulation layer ENCAP2 (e.g., the second encapsulation layer ENCAP2 discussed above with reference to FIG. 25) can be located in the outer corner area of the substrate SUB of the display panel 110.

In the outer corner area of the display panel 110, among the bank BNK, the cathode electrode CAT, the first encapsulation layer ENCAP1, and the second encapsulation layer ENCAP2, the bank BNK can extend further outwardly than the cathode electrode CAT, and the first encapsulation layer ENCAP1 and the second encapsulation layer ENCAP2 can extend further outwardly than the bank BNK. The second encapsulation layer ENCAP2 can extend to a location the same as, or similar to, a location to which the first encapsulation layer ENCAP1 extends, or can extend further outwardly than the first encapsulation layer ENCAP1.

A portion of a gate driving area GDA can be disposed in an outer corner area of the substrate SUB of the display panel 110.

The gate driving area GDA can include a gate driving panel circuit area GPCA in which a gate driving panel circuit GPC is disposed. The gate driving area GDA can further include the clock signal line area CLA, the first power line area PLA1, and the second power line area PLA2.

The gate driving area GDA can overlap with the bank BNK, the first encapsulation layer ENCAP1, and the second encapsulation layer ENCAP2. All or a portion of the gate driving area GDA can overlap with the cathode electrode CAT.

The electrostatic discharge component ESD can be disposed in the outer corner area of the substrate SUB of the display panel 110. For example, the electrostatic discharge component ESD can include an electrostatic discharge circuit or an electrostatic discharge pattern.

A location at which the electrostatic discharge component ESD is disposed is not limited thereto. For example, one or more additional electrostatic discharge components ESD can be disposed in one or more other locations of the display device 100, in addition to the outer corner area shown in FIG. 26, or one or more other portions of the electrostatic discharge component ESD can be disposed in one or more other locations of the display device 100.

The electrostatic discharge component ESD can overlap with the bank BNK. All or a portion of the electrostatic discharge component ESD can overlap with the cathode electrode CAT. The electrostatic discharge component ESD can overlap with the first encapsulation layer ENCAP1 and the second encapsulation layer ENCAP2.

For example, the bank BNK can be disposed on the entire top surface, or overall, of the electrostatic discharge component ESD. The cathode electrode CAT can be disposed on the top surface of, or over, a portion of the electrostatic discharge component ESD.

The plurality of clock signal lines CL can be disposed along an outer corner of the substrate SUB.

The plurality of clock signal lines CL can overlap with the bank BNK, the first encapsulation layer ENCAP1, and the second encapsulation layer ENCAP2. All, or one or more, of the plurality of clock signal lines CL can overlap with the cathode electrode CAT. All, or one or more, of the plurality of clock signal lines CL may not overlap with the electrostatic discharge component ESD.

The emission layer EL can be disposed to extend from the display area DA to the non-display area NDA. For example, the emission layer EL can be one of components for composing one of an organic light emitting diode (OLED), a quantum dot organic light emitting diode (QD-OLED), and a light emitting diode chip (LED chip).

A portion of the gate driving area GDA can overlap with the emission layer EL. The electrostatic discharge component ESD may not overlap with the emission layer EL. In one or more embodiments, the electrostatic discharge component ESD can overlap with all or a portion of the emission layer EL.

Figure 27:
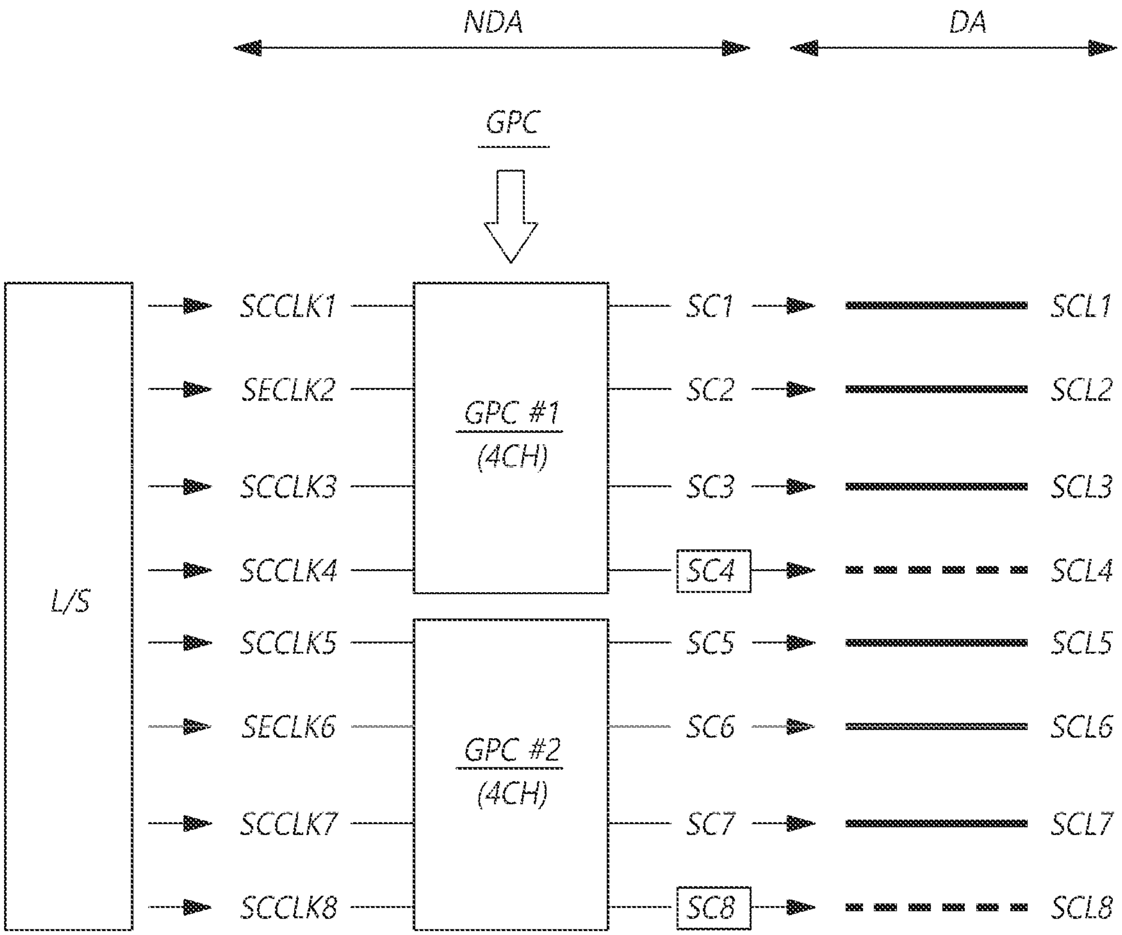
FIG. 27 illustrates an example gate driving operation in the example where a gate driving panel circuit is configured with the second type in the display device according to aspects of the present disclosure.

FIG. 27 illustrates an example gate driving operation in an example where a gate driving panel circuit GPC is configured with the second type in the display device 100 according to aspects of the present disclosure.

Referring to FIG. 27, the second type of gate driving panel circuit GPC according to embodiments of the present disclosure can include a first gate driving panel circuit GPC #1, a second gate driving panel circuit GPC #2, and the like.

The first gate driving panel circuit GPC #1 can be configured to output two or more scan signals (SC1 to SC4) to two or more scan signal lines (SCL1 to SCL4). The second gate driving panel circuit GPC #2 can be configured to output fifth to eighth scan signals (SC5 to SC8) to fifth to eighth scan signal lines (SCL5 to SCL8).

For example, as shown in FIG. 27, each of the first gate driving panel circuit GPC #1 and the second gate driving panel circuit GPC #2 can have four channels. In this example, the first gate driving panel circuit GPC #1 can output four scan signals (SC1, SC2, SC3, and SC4) to four scan signal lines (SCL1, SCL2, SCL3, and SCL4), and the second gate driving panel circuit (GPC #2) can output four scan signals (SC5, SC6, SC7, SC8) to four scan signal lines (SCL5, SCL6, SCL7, and SCL8).

In another example, each of the first gate driving panel circuit GPC #1 and the second gate driving panel circuit GPC #2 can have two channels, which is a different configuration from configuration of FIG. 27. In this example, the first gate driving panel circuit GPC #1 can output two scan signals to two scan signal lines, and the second gate driving panel circuit GPC #2 can output two scan signals to two scan signal lines.

Hereinafter, for convenience of description, discussions that follow are provided based on examples where each of the first gate driving panel circuit GPC #1 and the second gate driving panel circuit GPC #2 has four channels. However, embodiments of the present disclosure are not limited thereto.

A level shifter L/S can supply scan clock signals (SCCLK1 to SCCLK8) to the gate driving panel circuit GPC. The gate driving panel circuit GPC can receive scan clock signals (SCCLK1 to SCCLK8) from the level shifter L/S, generate scan signals (SC1 to SC8), and output the generated scan signals (SC1 to SC8) to scan signal lines (SCL1 to SCL8).

When the first gate driving panel circuit GPC #1 has four channels, the first gate driving panel circuit GPC #1 can receive first to fourth scan clock signals (SCCLK1 to SCCLK4) from the level shifter L/S, generate first to fourth scan signals (SC1 to SC4) based on the first to fourth scan clock signals (SCCLK1 to SCCLK4) using one first logic block LOGIC #1, and output the generated first to fourth scan signals (SC1 to SC4) to first to fourth scan signal lines (SCL1 to SCL4).

When the second gate driving panel circuit GPC #2 has four channels, the second gate driving panel circuit GPC #2 can receive fifth to eighth scan clock signals (SCCLK5 to SCCLK8) from the level shifter L/S, generate fifth to eighth scan signals (SC5 to SC8) based on the fifth to eighth scan clock signals (SCCLK5 to SCCLK8) using another logic block LOGIC, and output the generated fifth to eighth scan signals (SC5 to SC8) to fifth to eighth scan signal lines (SCL5 to SCL8).

In an embodiment, as described above with reference to FIG. 17A, when the second type of gate driving panel circuit GPC is applied, as the gate driving panel circuit GPC has the Q node sharing structure and performs the gate overlap driving, a falling duration of the last scan signal among two or more scan signals (e.g., four scan signals in the example where the gate driving panel circuit GPC has 4 channels) output from an output buffer block BUF by control of one logic block LOGIC can be greater than that of each of the remaining one or more scan signals.

According to the example of FIG. 27, among the first to fourth scan signals (SC1 to SC4) output by control of one first logic block LOGIC #1 in the first gate driving panel circuit GPC #1, a falling duration of the fourth scan signal SC4 can be greater than that of each of the first to third scan signals (SC1, SC2, and SC3).

In addition, among the fifth to eighth scan signals (SC5 to SC8) output by control of another logic block LOGIC in the second gate driving panel circuit GPC #2, a falling duration of the eighth scan signal SC8 can be greater than that of each of the fifth to seventh scan signals (SC5, SC6, and SC7).

Herein, a falling duration difference between two or more scan signals output by control of one logic block LOGIC can be referred to as a scan output characteristic difference. Such a scan output characteristic difference can cause a difference or deviation in display driving characteristics, and in turn, cause degradation of image quality.

To address this issue, embodiments of the present disclosure can provide technology for reducing such a scan output characteristic difference. Hereinafter, discussions will be provided on scan output characteristic differences based on waveforms of input and output signals of the first gate driving panel circuit GPC #1. Thereafter, discussions will be provided on techniques of reducing such scan output characteristic differences.

Figure 28:
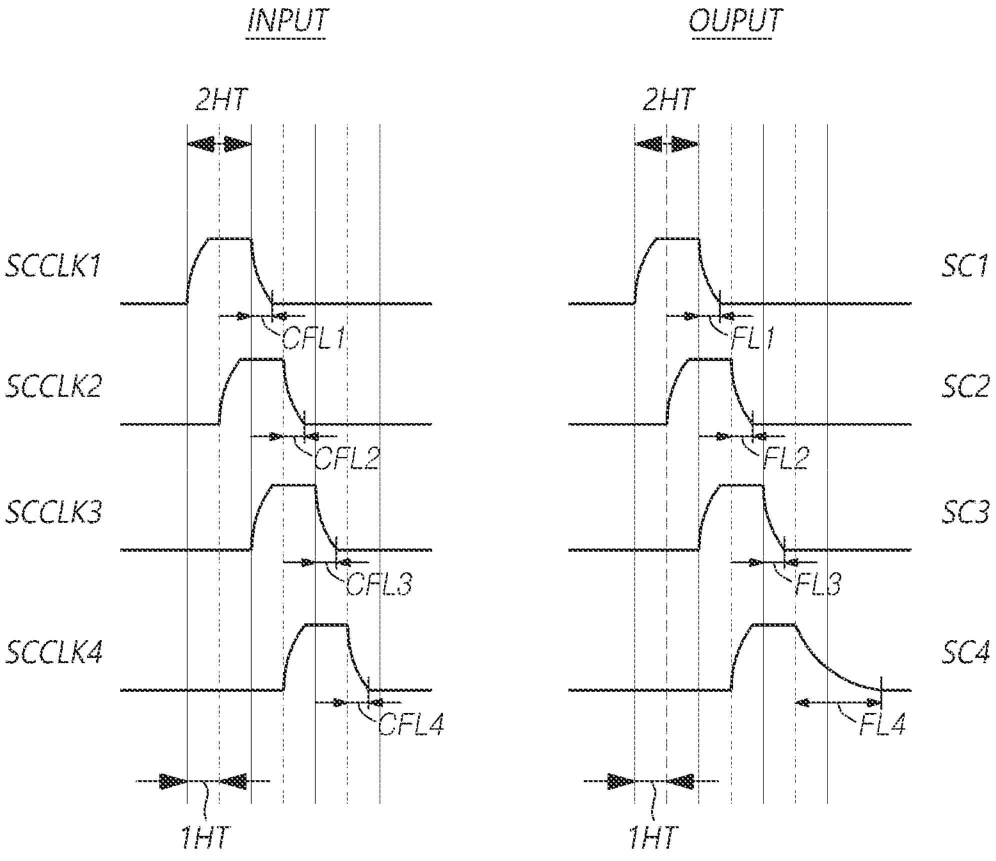
FIG. 28 illustrates a phenomenon in which a scan output characteristic difference occurs, which can be reduced by a gate driving panel circuit, in the display device according to aspects of the present disclosure.

FIG. 28 illustrates a phenomenon in which a scan output characteristic difference occurs, which can be reduced by a first gate driving panel circuit GPC #1 (e.g., the first gate driving panel circuit GPC #1 in the figures discussed above), in the display device 100 according to aspects of the present disclosure.

Referring to FIG. 28, when the first gate driving panel circuit GPC #1 has four channels and is configured with the second type, the first gate driving panel circuit GPC #1 can receive, as input signals, first to fourth scan clock signals (SCCLK1, SCCLK2, SCCLK3, and SCCLK4) from a level shifter L/S.

The first gate driving panel circuit GPC #1 can output, as output signals, first to fourth scan signals (SC1, SC2, SC3, and SC4) to first to fourth scan signal lines (SCL1, SCL2, SCL3, and SCL4).

Since the first gate driving panel circuit GPC #1 has the Q node sharing structure and performs the gate overlap driving, the first to fourth scan signals (SC1, SC2, SC3, and SC4), which are output signals, can have signal waveforms suitable for gate overlap driving, and the first to fourth scan clock signals (SCCLK1, SCCLK2, SCCLK3, and SCCLK4), which are input signals, can also have signal waveforms suitable for the gate overlap driving.

A time period of a corresponding turn-on level voltage period (hereinafter, which can be referred to as a high level voltage period) of each of the first to fourth scan clock signals (SCCLK1, SCCLK2, SCCLK3, and SCCLK4) can be two horizontal times 2HT. It should be noted here that the example where the time period of the high level voltage period of each of the first to fourth scan clock signals (SCCLK1, SCCLK2, SCCLK3, and SCCLK4) is set to two horizontal times 2HT is merely one example. Therefore, embodiments of the present disclosure are not limited thereto, and the time period of the high level voltage period of each of the first to fourth scan clock signals (SCCLK1, SCCLK2, SCCLK3, and SCCLK4) can be set to various values according to design requirements.

A portion of the high level voltage period of the first scan clock signal SCCLK1 and a portion of the high level voltage period of the second scan clock signal SCCLK2 can overlap each other by one horizontal time 1HT. A portion of the high level voltage period of the second scan clock signal SCCLK2 and a portion of the high level voltage period of the third scan clock signal SCCLK3 can overlap each other by one horizontal time 1HT. A portion of the high level voltage period of the third scan clock signal SCCLK3 and a portion of the high level voltage period of the fourth scan clock signal SCCLK4 can overlap each other by one horizontal time 1HT. It should be noted here that the example where the overlapping period of two adjacent scan clock signals among the first to fourth scan clock signals (SCCLK1, SCCLK2, SCCLK3, and SCCLK4) is set to one horizontal time 1HT is merely one example. Therefore, embodiments of the present disclosure are not limited thereto, and the overlapping period of two adjacent scan clock signals among the first to fourth scan clock signals (SCCLK1, SCCLK2, SCCLK3, and SCCLK4) can be set to various values according to design requirements.

All of a falling duration CFL1 of the first scan clock signal SCCLK1, a falling duration CFL2 of the second scan clock signal SCCLK2, a falling duration CFL3 of the third scan clock signal SCCLK3, and a falling duration CFL4 of the fourth scan clock signal SCCLK4 can be the same or substantially the same (i.e., CFL1=CFL2=CFL3=CFL4). Here, the falling duration can refer to a time period until each scan clock signal reaches a low level voltage from a high level voltage.

The time period of the high level voltage period of each of the first to fourth scan signals (SC1, SC2, SC3, and SC4) can be two horizontal times 2HT. It should be noted here that the example where the time period of the high level voltage period of each of the first to fourth scan signals (SC1, SC2, SC3, and SC4) is set to two horizontal times 2HT is merely one example. Therefore, embodiments of the present disclosure are not limited thereto, and the time period of the high level voltage period of each of the first to fourth scan signals (SC1, SC2, SC3, and SC4) can be set to various values according to design requirements.

A portion of the high level voltage period of the first scan signal SC1 and a portion of the high level voltage period of the second scan signal SC2 can overlap each other by one horizontal time 1HT. A portion of the high level voltage period of the second scan signal SC2 and a portion of the high level voltage period of the third scan signal SC3 can overlap each other by one horizontal time 1HT. A portion of the high level voltage period of the third scan signal SC3 and a portion of the high level voltage period of the fourth scan signal SC4 can overlap each other by one horizontal time 1HT. It should be noted here that the example where the overlapping period of two adjacent scan signals among the first to fourth scan signals (SC1, SC2, SC3, and SC4) is set to one horizontal times 1HT is merely one example. Therefore, embodiments of the present disclosure are not limited thereto, and the overlapping period of two adjacent scan signals among the first to fourth scan signals (SC1, SC2, SC3, and SC4) can be set to various values according to design requirements.

All of a falling duration FL1 of the first scan signal SC1, a falling duration FL2 of the second scan signal SC2, and a falling duration FL3 of the third scan signal SC3 can be the same or substantially the same (i.e., FL1=FL2=FL3).

However, according to the Q node sharing structure and gate overlap driving of the first gate driving panel circuit GPC #1, a falling duration FL4 of the fourth scan signal SC4 can be greater than that of each of the falling duration FL1 of the first scan signal SC1, the falling duration FL2 of the second scan signal SC2, and the falling duration FL3 of the third scan signal SC3 (i.e., FL1=FL2=FL3<FL4).

Such a difference in scan output characteristics can cause a difference or deviation in display driving characteristics, and in turn, cause degradation of image quality. To address this issue, embodiments of the present disclosure can provide techniques of reducing such a scan output characteristic difference. Hereinafter, techniques of reducing a scan output characteristic difference according to embodiments of the present disclosure will be described.

Figure 29:
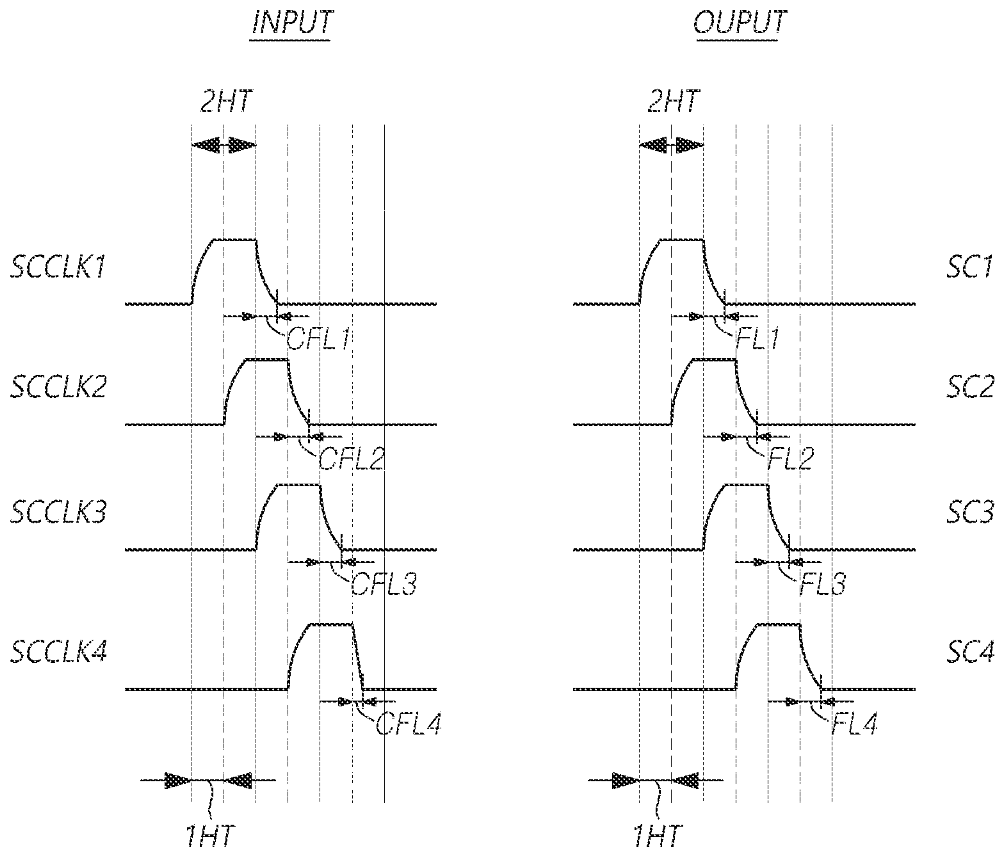
FIG. 29 illustrates example input signals and output signals of a gate driving panel circuit when a scan output characteristic difference reduction technique based on scan clock signal control is applied to the display device according to aspects of the present disclosure.

FIG. 29 illustrates example input signals and output signals of a first gate driving panel circuit GPC #1 when a scan output characteristic difference reduction technique based on scan clock signal control is applied to the display device 100 according to aspects of the present disclosure.

Referring to FIG. 29, in one or more embodiments, the display device 100 can include a substrate SUB including a display area DA and a non-display area NDA, and a first gate driving panel circuit GPC #1 for respectively supplying two or more scan signals (SC1 to SC4) to two or more scan signal lines (SCL1 to SCL4) disposed in the display area DA.

The first gate driving panel circuit GPC #1 can include a first output buffer block BUF #1 and a first logic block LOGIC #1 for controlling operation of the first output buffer block BUF #1. The first output buffer block BUF #1 can include two or more scan output buffers (SCBUF1 to SCBUF4) configured to receive two or more scan clock signals (SCCLK1 to SCCLK4) and output two or more scan signals (SC1 to SC4).

In an embodiment, the first gate driving panel circuit GPC #1 can have the Q node sharing structure. As the Q node sharing structure is applied, the first logic block LOGIC #1 included in the first gate driving panel circuit GPC #1 can be configured to control respective voltages of one Q node and one QB node electrically connected to the first output buffer block BUF #1 including two or more scan output buffers (SCBUF1 to SCBUF4).

In one or more embodiments, the display device 100 can perform a scan output characteristic difference reduction function based on scan clock signal control.

The scan output characteristic difference reduction function based on scan clock signal control can be performed by at least one of the first gate driving panel circuit GPC #1, a level shifter L/S, and one or more other signal control devices.

According to the scan output characteristic difference reduction function based on scan clock signal control, among two or more scan clock signals (SCCLK1 to SCCLK4), falling durations of the remaining scan clock signals (SCCLK1, SCCLK2, and SCCLK3), except for the last scan clock signal SCCLK4 can be the same, or substantially the same, but a falling duration of the last scan clock signal SCCLK4 can be smaller than the falling durations of the remaining scan clock signals (SCCLK1, SCCLK2, and SCCLK3).

The level shifter L/S can supply two or more scan clock signals (SCCLK1 to SCCLK4) to the first output buffer block BUF #1.

In the example where the scan output characteristic difference reduction function based on scan clock signal control is performed by the level shifter L/S, before supplying the last scan clock signal SCCLK4 among two or more scan clock signals (SCCLK1 to SCCLK4) or when supplying the last scan clock signal SCCLK4 among the two or more scan clock signals (SCCLK1 to SCCLK4), the level shifter L/S can set a falling duration of the last scan clock signal SCCLK4 among the two or more scan clock signals (SCCLK1 to SCCLK4) to be smaller than the falling durations of the remaining scan clock signals (SCCLK1, SCCLK2, and SCCLK3) (i.e., CF1=CF2=CF3>CFL4).

Even when the first gate driving panel circuit GPC #1 has the Q node sharing structure and performs the gate overlap driving, since the first gate driving panel circuit GPC #1 generates two or more scan signals (SC1 to SC4) using two or more scan clock signals (SCCLK1 to SCCLK4) intentionally set to have a falling duration difference and outputs the generated two or more scan signals (SC1 to SC4), all respective falling durations (FL1, FL2, FL3, and FL4) of the two or more scan signals (SC1 to SC4) can be the same or substantially the same.

All of the respective falling durations (FL1, FL2, FL3, and FL4) of the two or more scan signals (SC1 to SC4) output from the first gate driving panel circuit GPC #1 can be the same, or substantially the same (i.e., FL1=FL2=FL3=FL4).

The fact that all of the respective falling durations (FL1, FL2, FL3, and FL4) of the two or more scan signals (SC1 to SC4) are substantially the same (FL1=FL2=FL3=FL4) can mean that a difference in respective falling durations (FL1, FL2, FL3, FL4) of the two or more scan signals (SC1~SC4) can be smaller than a difference (e.g., |CFL4-CFL1|, |CFL4-CFL2|, or |CFL4-CFL3|) between a falling duration CFL4 of the last scan clock signal SCCLK4 and respective falling durations (FL1, FL2, and FL3) of the remaining scan clock signal (SCCLK1, SCCLK2, and SCCLK3).

As in the example of FIG. 29, when the first gate driving panel circuit GPC #1 has four channels, the first output buffer block BUF #1 can include first to fourth scan output buffers (SCBUF1 to SCBUF4) configured to receive first to fourth scan clock signals (SCCLK1 to SCCLK4) and output first to fourth scan signals (SC1 to SC4).

According to the scan output characteristic difference reduction function based on scan clock signal control, among the first to fourth scan clock signals (SCCLK1 to SCCLK4), respective falling durations (CFL1, CFL2, and CFL3) of the first to third scan clock signals (SCCLK1, SCCLK2, and SCCLK3) can be the same or substantially the same, but the falling duration CFL4 of the fourth scan clock signal SCCLK4 can be smaller than the respective falling durations (CFL1, CFL2, and CFL3) of the first to third scan clock signals (SCCLK1, SCCLK2, and SCCLK3) (i.e., CFL1=CFL2=CFL3>FL4).

Accordingly, even when the first gate driving panel circuit GPC #1 has the Q node sharing structure and performs the gate overlap driving, since the first gate driving panel circuit GPC #1 generates first to fourth scan signals (SC1 to SC4) using first to fourth scan clock signals (SCCLK1 to SCCLK4) intentionally set to have a falling duration difference and outputs the generated first to fourth scan signals (SC1 to SC4), all of the respective falling durations (FL1, FL2, FL3, and FL4) of the first to fourth scan signals (SC1 to SC4) can be the same or substantially the same.

As described above, the display device 100 according to embodiments of the present disclosure can set the fourth scan clock signal SCCLK4 among the first to fourth scan clock signals (SCCLK1 to SCCLK4) to have a relatively small falling duration CFL4, and thereby, the fourth scan signal SC4 among the first to fourth scan signals (SC1 to SC4) can have a relatively small falling duration FL4. Accordingly, the shortened falling duration FL4 of the fourth scan signal SC4 can become the same or substantially the same as the respective falling durations (FL1, FL2, and FL3) of the first to third scan signals (SC1, SC2, and SC3) (i.e., FL1=FL2=FL3=FL4).

In other words, as the display device 100 performs the scan output characteristic difference reduction function based on scan clock signal control, a difference between scan output characteristics (a difference between falling durations of scan signals (SC1 to SC4)) can be reduced or eliminated by shortening the falling duration CFL4 of the last scan clock signal SCCLK4 among two or more scan clock signals (SCCLK1 to SCCLK4) input to two or more scan output buffers (SCBUF1 to SCBUF4) that share one Q node.

Hereinafter, another technique of reducing a difference between scan output characteristics according to embodiments of the present disclosure will be described.

Figure 30:
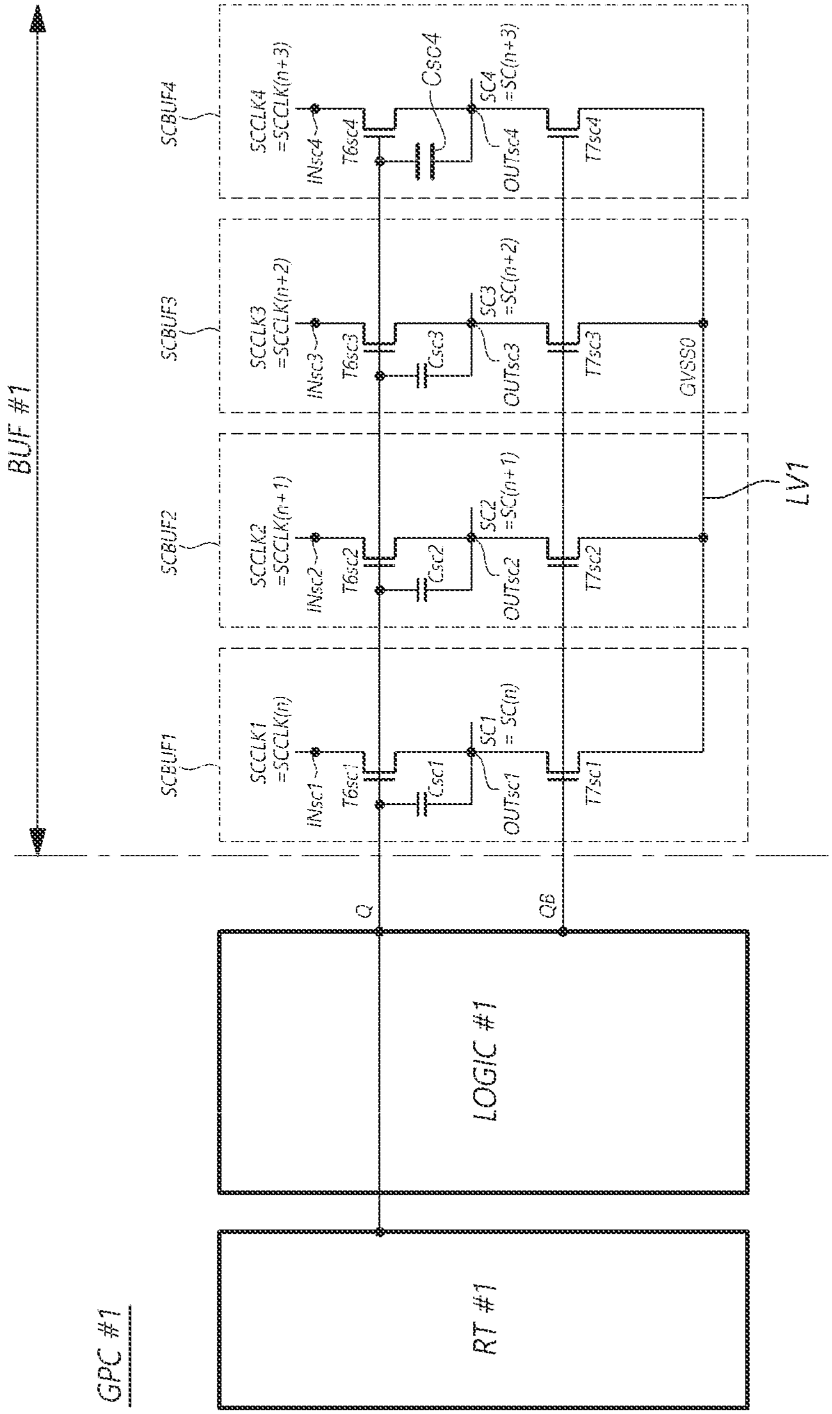
FIG. 30 illustrates an example gate driving panel circuit to which a scan output characteristic difference reduction technique based on differential design between scan bootstrapping capacitors is applied in the display device according to aspects of the present disclosure.

FIG. 30 illustrates an example first gate driving panel circuit GPC #1 to which a scan output characteristic difference reduction technique based on differential design between scan bootstrapping capacitors (Csc1 to Csc4) is applied in the display device 100 according to aspects of the present disclosure. It should be noted that the first gate driving panel circuit GPC #1 of FIG. 30 is the same circuit as the first gate driving panel circuit GPC #1 of FIG. 16. Considering this, for simplicity, FIG. 30 illustrates only the first logic block LOGIC #1 and the first real-time sensing control block RT #1.

Referring to FIG. 30, in one or more embodiments, the first gate driving panel circuit GPC #1 can be disposed on the substrate SUB of the display panel 110, and be configured to supply two or more scan signals (SC1 to SC4) to two or more scan signal lines (SCL1 to SCL4) disposed in the display area DA among the display area DA and the non-display area NDA included in the substrate SUB.

For example, in an embodiment, the first gate driving panel circuit GPC #1 can be disposed in the non-display area NDA.

In an embodiment, the first gate driving panel circuit GPC #1 can a first output buffer block BUF #1 including two or more scan output buffers (SCBUF1 to SCBUF4) configured to receive two or more scan clock signals (SCCLK1 to SCCLK4) and output two or more scan signals (SC1 to SC4), and a first logic block LOGIC #1 configured to control respective voltages of Q and QB nodes electrically connected to the first output buffer block BUF #1.

In an embodiment, in the first gate driving panel circuit GPC #1, the two or more scan output buffers (SCBUF1 to SCBUF4) can include respective scan pull-up transistors (T6*sc*1 to T6*sc*4) between scan clock nodes (INsc1 to INsc4) to which scan clock signals (SCCLK1 to SCCLK4) are input and scan output nodes (OUTsc1 to OUTsc4) from which scan signals (SC1 to SC4) are output, and respective scan pull-down transistors (T7*sc*1 to T7*sc*4) between a first gate low voltage node LV1 to which a first gate low voltage GVSS0 is applied and the scan output nodes (OUTsc1 to OUTsc4).

The gate nodes of the respective scan pull-up transistors (T6*sc*1 to T6*sc*4) of the two or more scan output buffers (SCBUF1 to SCBUF4) can be electrically connected to the Q node together. For example, the scan pull-up transistors (T6*sc*1 to T6*sc*4) of the two or more scan output buffers (SCBUF1 to SCBUF4) can share one Q node.

The two or more scan output buffers (SCBUF1 to SCBUF4) can include scan bootstrapping capacitors (Csc1 to Csc4) between the gate nodes and source nodes of the scan pull-up transistors (T6*sc*1 to T6*sc*4).

The gate nodes of the two or more scan pull-up transistors (T6*sc*1 to T6*sc*4) can correspond to the Q node, and the source nodes of the two or more scan pull-up transistors (T6*sc*1 to T6*sc*4) can correspond to respective scan output nodes (OUTsc1 to OUTsc4) of the two or more scan output buffers (SCBUF1 to SCBUF4).

The scan bootstrapping capacitor Csc4 included in a specific scan output buffer (e.g., SCBUF4) among the two or more scan output buffers (SCBUF1 to SCBUF4) sharing the Q node can have a different capacitance from the one or more scan bootstrapping capacitors (Csc1 to Csc3) included in the remaining one or more scan output buffers (SCBUF1 to SCBUF3), except for the specific scan output buffer SCBUF4 among the two or more scan output buffers (SCBUF1 to SCBUF4).

The specific scan output buffer SCBUF4 among the two or more scan output buffers can be the last scan output buffer lastly outputting a scan signal with a turn-on level voltage among the two or more scan output buffers (SCBUF1 to SCBUF4) sharing the Q node.

For example, the scan bootstrapping capacitor Csc4 included in the specific scan output buffer SCBUF4 can have a greater capacitance than each of the scan bootstrapping capacitors (Csc1 to Csc3) included in the remaining scan output buffers (SCBUF1 to SCBUF3).

According to differential design between the scan bootstrapping capacitors (Csc1 to Csc4) as described above, as a discharge voltage of the shared Q node increases, the falling characteristic of the scan signal SC4 output from the last scan output buffer SCBUF4, which is configured in a location representing a poor falling characteristic, can be improved.

A difference between a capacitance of the scan bootstrapping capacitor Csc4 included in the specific scan output buffer SCBUF4 and a corresponding capacitance of each of the scan bootstrapping capacitors (Csc1~Csc3) included in the remaining output buffers (SCBUF1~SCBUF3) can be set such that all respective falling durations (FL1 to FL4) of the two or more scan signals (SC1 to SC4) output from the two or more scan output buffers (SCBUF1 to SCBUF4) sharing one Q node are the same. For example, the capacitance of the scan bootstrapping capacitor Csc4 included in the specific scan output buffer SCBUF4 can be set so that all of the falling durations (FL1 to FL4) of the two or more scan signals (SC1 to SC4) output from the two or more scan output buffers (SCBUF1 to SCBUF4) sharing one Q node can be the same.

The specific scan output buffer SCBUF4 can be the last scan output buffer SCBUF4 lastly outputting a scan signal with a turn-on level voltage among the two or more scan output buffers (SCBUF1 to SCBUF4) sharing the Q node.

For example, the scan bootstrapping capacitor Csc4 included in the last scan output buffer SCBUF4 among the two or more scan output buffers (SCBUF1 to SCBUF4) can have a greater capacitance than each of the scan bootstrapping capacitors (Csc1 to Csc3) included in the remaining scan output buffers (SCBUF1 to SCBUF3), except for the last scan output buffer SCBUF4 among the two or more scan output buffers (SCBUF1 to SCBUF4).

In an embodiment, since the display device 100 performs the gate overlap driving, respective turn-on level voltage periods of two adjacent scan signals among two or more scan signals (SC1 to SC4) can overlap with each other.

In an embodiment, in the first gate driving panel circuit GPC #1, the first output buffer block BUF #1 can output two or more scan signals (SC1 to SC4) during each active period ACT, and output one of the two or more scan signals (SC1 to SC4) during one blank period BLANK among a plurality of blank periods BLANK. Here, each of the plurality of blank periods BLANK can be a period between two active periods ACT.

The first logic block LOGIC #1 can cause the Q node to charge with a first gate high voltage GVDD, which is a high level voltage, so that the first output buffer block BUF #1 outputs two or more scan signals (SC1 to SC4) during each active period ACT.

In an embodiment, the first gate driving panel circuit GPC #1 can further include a real-time sensing control block RT #1 for causing the Q node to charge with the first gate high voltage GVDD, which is the high level voltage, during any one blank period BLANK among a plurality of blank periods BLANK.

When the Q node is charged by the real-time sensing control block RT #1 during any one blank period BLANK among the plurality of blank periods BLANK, one of the two or more scan signals (SC1 to SC4) can be output during any one blank period BLANK among the plurality of blank periods BLANK. In this manner, real-time sensing driving can be performed for a corresponding subpixel SP.

As described above, the first gate driving panel circuit GPC #1 can have two or more channels. In an example where the first gate driving panel circuit GPC #1 has two channels, the first gate driving panel circuit GPC #1 can receive two scan clock signals and output two scan signals. In another example where the first gate driving panel circuit GPC #1 has four channels, the first gate driving panel circuit GPC #1 can receive four scan clock signals and output four four scan signals.

In the example where the first gate driving panel circuit GPC #1 has four channels, the first output buffer block BUF #1 can include a first scan output buffer SCBUF1, a second scan output buffer SCBUF2, a third scan output buffer SCBUF3, and a fourth scan output buffer SCBUF4.

The first scan output buffer SCBUF1 can include a first scan pull-up transistor T6*sc*1 between a first scan clock node INsc1 to which a first scan clock signal SCCLK1 is input and a first scan output node OUTsc1 from which a first scan signal SC1 is output, a first scan pull-down transistor T7*sc*1 between a first gate low voltage node LV1 to which a first gate low voltage GVSS0 is applied and the first scan output node OUTsc1, and a first scan bootstrapping capacitor Csc1 between the gate node and the source node of the first scan pull-up transistor T6*sc*1.

The second scan output buffer SCBUF2 can include a second scan pull-up transistor T6*sc*2 between a second scan clock node INsc2 to which a second scan clock signal SCCLK2 is input and a second scan output node OUTsc2 from which a second scan signal SC2 is output, a second scan pull-down transistor T7*sc*2 between the first gate low voltage node LV1 to which the first gate low voltage GVSS0 is applied and the second scan output node OUTsc2, and a second scan bootstrapping capacitor Csc2 between the gate node and the source node of the second scan pull-up transistor T6*sc*2.

The third scan output buffer SCBUF3 can include a third scan pull-up transistor T6*sc*3 between a third scan clock node INsc3 to which a third scan clock signal SCCLK3 is input and a third scan output node OUTsc3 from which a third scan signal SC3 is output, a third scan pull-down transistor T7*sc*3 between the first gate low voltage node LV1 to which the first gate low voltage GVSS0 is applied and the third scan output node OUTsc3, and a third scan bootstrapping capacitor Csc3 between the gate node and the source node of the third scan pull-up transistor T6*sc*3.

The fourth scan output buffer SCBUF4 can include a fourth scan pull-up transistor T6*sc*4 between a fourth scan clock node INsc4 to which a fourth scan clock signal SCCLK4 is input and a fourth scan output node OUTsc4 from which a fourth scan signal SC4 is output, a fourth scan pull-down transistor T7*sc*4 between the first gate low voltage node LV1 to which the first gate low voltage GVSS0 is applied and the fourth scan output node OUTsc4, and a fourth scan bootstrapping capacitor Csc4 between the gate node and the source node of the fourth scan pull-up transistor T6*sc*4.

It should be noted here that the first output buffer block BUF #1 can further include a carry output buffer CRBUF (see FIG. 16), but for convenience of explanation, the carry output buffer CRBUF is omitted in FIG. 30.

The first scan output buffer SCBUF1, the second scan output buffer SCBUF2, the third scan output buffer SCBUF3, and the fourth scan output buffer SCBUF4 can share one Q node. and operate together depending on a voltage of the Q node.

According to this configuration, all of the gate node of the first scan pull-up transistor T6*sc*1, the gate node of the second scan pull-up transistor T6*sc*2, the gate node of the third scan pull-up transistor T6*sc*3, and the gate node of the fourth scan pull-up transistor T6*sc*4 can be electrically connected to the Q node.

Among the first scan output buffer SCBUF1, the second scan output buffer SCBUF2, the third scan output buffer SCBUF3, and the fourth scan output buffer SCBUF4, an output timing of a scan signal output from the fourth scan output buffer SCBUF4, which is the last scan output buffer, can be the latest.

The fourth scan bootstrapping capacitor Csc4 included in the fourth scan output buffer SCBUF4, which is the last scan output buffer, can have a greater capacitance than each of the first scan bootstrapping capacitor Csc1, the second scan bootstrapping capacitor Csc2, and the third scan bootstrapping capacitor Csc3. For example, among the first to fourth scan bootstrapping capacitors (Csc1 to Csc4), the fourth scan bootstrapping capacitor Csc4 can have the greatest capacitance.

Accordingly, a difference or deviation between scan output characteristics between the first scan output buffer SCBUF1, the second scan output buffer SCBUF2, the third scan output buffer SCBUF3, and the fourth scan output buffer SCBUF4 can be reduced.

In an embodiment, each of the scan bootstrapping capacitors (Csc1, Csc2, Csc3, and Csc4) included in the two or more scan output buffers (SCBUF1 to SCBUF4) can include a first capacitor electrode and a second capacitor electrode on the first capacitor electrode.

An insulating layer can be disposed between the first capacitor electrode and the second capacitor electrode. For example, the insulating layer can include a buffer layer BL and a gate insulating layer GI.

For example, the first capacitor electrode can electrically correspond to the source node of the corresponding scan pull-up transistor, and electrically correspond to the corresponding scan output node. The second capacitor electrode can electrically correspond to the gate node of the corresponding scan pull-up transistor, and electrically correspond to the Q node.

In another example, the second capacitor electrode can electrically correspond to the source node of the corresponding scan pull-up transistor, and electrically correspond to the corresponding scan output node. The first capacitor electrode can electrically correspond to the gate node of the corresponding scan pull-up transistor, and electrically correspond to the Q node.

In an embodiment, at least one of an electrode overlapping area expansion structure and a parallel capacitor structure can be employed so that the scan bootstrapping capacitor Csc4 included in the last scan output buffer SCBUF4, which is the specific scan output buffer, among the two or more scan output buffers (SCBUF1 to SCBUF4) can have a greater capacitance than each of the scan bootstrapping capacitors (Csc1 to Csc3) included in the remaining scan output buffers (SCBUF1 to SCBUF3).

In the example where the electrode overlapping area expansion structure is employed, an area where the first capacitor electrode and the second capacitor electrode overlap each other in the scan bootstrapping capacitor Csc4 included in the last scan output buffer SCBUF4, which is the specific scan output buffer, can be greater than an area where the corresponding first capacitor electrode and the corresponding second capacitor electrode overlap each other in each of the scan bootstrapping capacitors (Csc1 to Csc3) included in the remaining scan output buffers (SCBUF1 to SCBUF3).

Accordingly, the scan bootstrapping capacitor Csc4 included in the last scan output buffer SCBUF4, which is the specific scan output buffer, can have a greater capacitance than the scan bootstrapping capacitors (Csc1 to Csc3) included in the remaining scan output buffers (SCBUF1 to SCBUF3).

In the example where the parallel capacitor structure is employed, the scan bootstrapping capacitor Csc4 included in the last scan output buffer SCBUF4, which is the specific scan output buffer, can further include a third capacitor electrode on the second capacitor electrode, in addition to the first and second capacitor electrodes. The third capacitor electrode can be electrically connected to the first capacitor electrode.

In this example, a first capacitor can be formed between the first capacitor electrode and the second capacitor electrode, and a second capacitor can be formed between the second capacitor electrode and the third capacitor electrode. As the first capacitor electrode and the third capacitor electrode are electrically connected, the first capacitor and the second capacitor can be connected in parallel. Accordingly, the scan bootstrapping capacitor Csc4 included in the last scan output buffer SCBUF4, which is the specific scan output buffer, can be a composite capacitor formed by a parallel connection of the first capacitor and the second capacitor. Another insulating layer can be disposed between the second capacitor electrode and the third capacitor electrode. For example, this insulating layer can be an interlayer insulating layer ILD. In another example, the insulating layer can include a protective layer PAS and an overcoat layer OC.

Accordingly, the scan bootstrapping capacitor Csc4 included in the last scan output buffer SCBUF4, which is the specific scan output buffer, can have a greater capacitance than the scan bootstrapping capacitors (Csc1 to Csc3) included in the remaining scan output buffers (SCBUF1 to SCBUF3).

Figure 31:
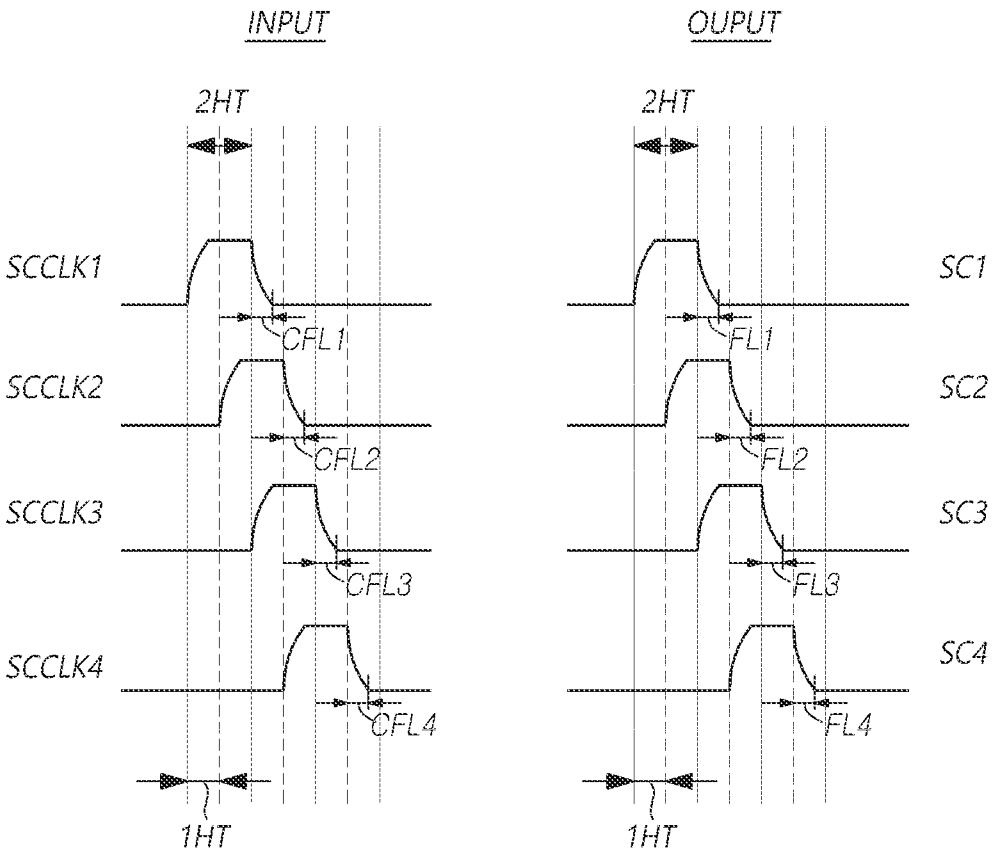
FIG. 31 illustrates example input signals and output signals of the gate driving panel circuit to which the scan output characteristic difference reduction technique based on differential design between scan bootstrapping capacitors is applied in the display device according to aspects of the present disclosure.

FIG. 31 illustrates example input signals (SCCLK1 to SCCLK4) and output signals (SC1 to SC4) of the first gate driving panel circuit GPC #1 to which the scan output characteristic difference reduction technique based on differential design between scan bootstrapping capacitors (Csc1 to Csc4) is applied in the display device 100 according to aspects of the present disclosure.

Referring to FIG. 31, the method of reducing a difference between scan output characteristics based on differential design between scan bootstrapping capacitors (Csc1 to Csc4) according to embodiments of the present disclosure is applied in the display device 100.

Accordingly, all respective falling durations (FL1 to FL4) of first to fourth scan signals (SC1 to SC4) output from the first to fourth scan output buffers (SCBUF1 to SCBUF4) sharing one Q node can be the same or substantially the same.

Further, among the first to fourth scan output buffers (SCBUF1 to SCBUF4) sharing one Q node, the falling duration FL4 of the fourth scan signal SC4 output from the scan bootstrapping capacitor Csc4 of the last scan output buffer SCBUF4, can be the same or substantially the same as each of the respective falling durations (FL1, FL2, and FL3) of the first to third scan signals (SC1 to SC3) output from the first to third scan output buffers (SCBUF1 to SCBUF3) (i.e., FL1=FL2=FL3=FL4).

The fact that the falling duration FL4 of the fourth scan signal SC4 is substantially the same as each of the falling durations (FL1, FL2, and FL3) of the first to third scan signals (SC1 to SC3) can mean that the falling duration FL4 of the fourth scan signal SC4 has a difference in a predefined range (e.g., ±1%, ±2%, ±3%, or ±5%) from each of the falling durations (FL1, FL2, and FL3) of the first to third scan signals (SC1 to SC3).

According to the scan output characteristic difference reduction technique based on differential design between the scan bootstrapping capacitors (Csc1 to Csc4), it is not necessary to perform differential control between the first to fourth scan clock signals (SCCLK1 to SCCLK4).

According to embodiments of the present disclosure, since the first to fourth scan clock signals (SCCLK1 to SCCLK4) are not controlled to reduce a difference between scan output characteristics, all first to fourth scan clock signals (SCCLK1 to SCCLK4) input to the first to fourth scan output buffers (SCBUF1 to SCBUF4) sharing one Q node can be the same or substantially the same.

Among the first to fourth scan output buffers (SCBUF1 to SCBUF4) sharing one Q node, the falling duration CFL4 of the fourth scan clock signal SCCLK4 input to the fourth scan output buffer SCBUF4, which is the last scan output buffer, can be the same or substantially the same as each of the respective falling durations (CFL1, CFL2, and CFL3) of the first to third scan clock signals (SCCLK1 to SCCLK3) input to the remaining first to third scan output buffers (SCBUF1 to SCBUF3), except for the fourth scan output buffer SCBUF4.

The fact that the falling duration CFL4 of the fourth scan clock signal SCCLK4 is substantially the same as each of the falling durations (CFL1, CFL2, and CFL3) of the first to third scan clock signals (SCCLK1 to SCCLK3) can mean that the falling duration CFL4 of the fourth scan clock signal SCCLK4 has a difference in a predefined range from each of the falling durations (CFL1, CFL2, and CFL3) of the first to third scan clock signals (SCCLK1 to SCCLK3).

In an embodiment, in the first gate driving panel circuit GPC #1, respective turn-on level voltage periods (e.g., high level voltage periods) of the two adjacent scan signals among the first to fourth scan signals (SC1 to SC4) output from the first to fourth scan output buffers (SCBUF1 to SCBUF4) sharing one Q node can overlap with each other.

In other words, a portion of the high level voltage period of the first scan signal SC1 can overlap with a portion of the high level voltage period of the second scan signal SC2. A portion of the high level voltage period of the second scan signal SC2 can overlap with a portion of the high level voltage period of the third scan signal SC3. A portion of the high level voltage period of the third scan signal SC3 can overlap with a portion of the high level voltage period of the fourth scan signal SC4.

A time period of each of the high level voltage periods of the first to fourth scan signals (SC1 to SC4) can be two horizontal times 2HT. The high level voltage period of the first scan signal SC1 and the high level voltage period of the second scan signal SC2 can overlap by one horizontal time 1HT. The high level voltage period of the second scan signal SC2 and the high level voltage period of the third scan signal SC3 can overlap by one horizontal time 1HT. The high level voltage period of the third scan signal SC3 and the high level voltage period of the fourth scan signal SC4 can overlap by one horizontal time 1HT. Here, one horizontal time 1HT can correspond to a time taken to display one horizontal line (one subpixel array or one subpixel row).

FIGS. 32 to 35 are example cross-sectional views of first to fourth scan bootstrapping capacitors (Csc1, Csc2, Csc3, and Csc4) included in the gate driving panel circuit GPC #1 to which the scan output characteristic difference reduction technique based on differential design between scan bootstrapping capacitors (Csc1, Csc2, Csc3, and Csc4) is applied in the display device 100 according to aspects of the present disclosure.

Figure 32:
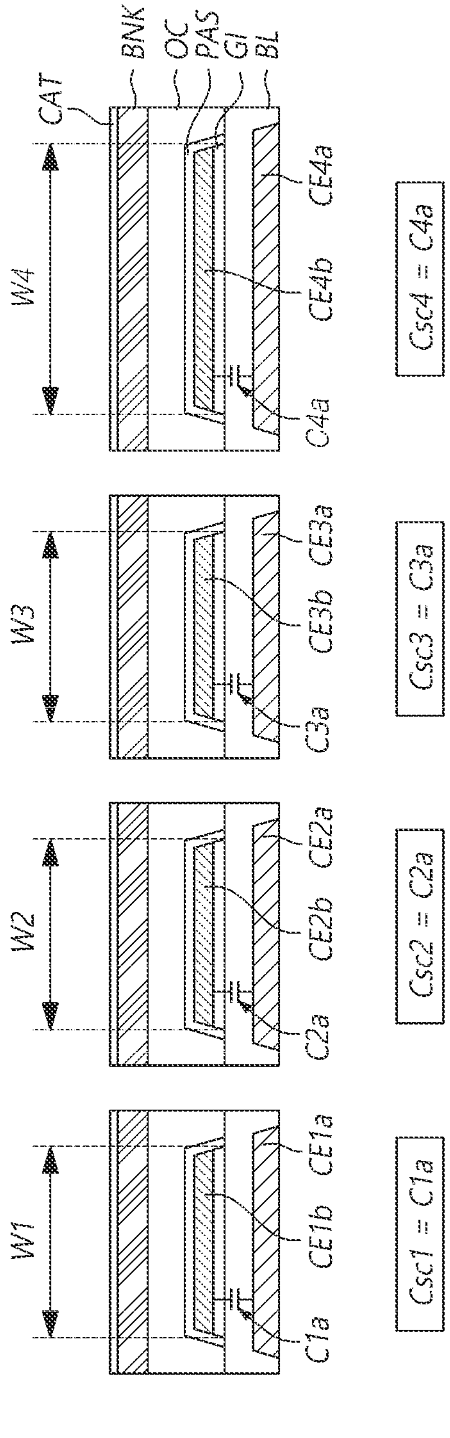
FIGS. 32 to 35 are example cross-sectional views of first to fourth scan bootstrapping capacitors included in the gate driving panel circuit to which the scan output characteristic difference reduction technique based on differential design between scan bootstrapping capacitors is applied in the display device according to aspects of the present disclosure.

Referring to FIG. 32, first to fourth scan bootstrapping capacitors (Csc1 to Csc4) can have a single capacitor structure.

As the fourth scan bootstrapping capacitor Csc4 is configured to have an electrode overlapping area expansion structure, the fourth scan bootstrapping capacitor Csc4 can have a greater capacitance than the first to third scan bootstrapping capacitors (Csc1 to Csc3). The first to third scan bootstrapping capacitors Csc1 to Csc3 can have the same capacitance or substantially the same capacitance.

The first scan bootstrapping capacitor Csc1 can be a capacitor C1*a* between a first capacitor electrode CE1*a* and a second capacitor electrode CE1*b*. The second scan bootstrapping capacitor Csc2 can be a capacitor C2*a* between a first capacitor electrode CE2*a* and a second capacitor electrode CE2*b*. The third scan bootstrapping capacitor Csc3 can be a capacitor C3*a* between a first capacitor electrode CE3*a* and a second capacitor electrode CE3*b*. The fourth scan bootstrapping capacitor Csc4 can be a capacitor C4*a* between a first capacitor electrode CE4*a* and a second capacitor electrode CE4*b*.

An insulating layer including a buffer layer BL and a gate insulating layer GI can be disposed between the first capacitor electrodes (CE1*a*, CE2*a*, CE3*a*, and CE4*a*) and the second capacitor electrodes (CE1*b*, CE2*b*, CE3*b*, and CE4*b*) constituting the first to fourth bootstrapping capacitors (Csc1 to Csc4). A protective layer PAS can be disposed on the second capacitor electrodes CE1*b*, CE2*b*, CE3*b*, and CE4*b*, an overcoat layer OC can be disposed on the protective layer PAS, a bank BNK can be disposed on the overcoat layer OC, and a cathode electrode CAT can be disposed on the bank BNK.

In the first scan bootstrapping capacitor Csc1, an overlapping area between the first capacitor electrode CE1*a* and the second capacitor electrode CE1*b* can be a first overlapping area value W1. In the second scan bootstrapping capacitor Csc2, an overlap area between the first capacitor electrode CE2*a* and the second capacitor electrode CE2*b* can be a second overlapping area value W2. In the third scan bootstrapping capacitor Csc3, an overlap area between the first capacitor electrode CE3*a* and the second capacitor electrode CE3*b* can be a third overlapping area value W3. In the fourth scan bootstrapping capacitor Csc4, an overlap area between the first capacitor electrode CE4*a* and the second capacitor electrode CE4*b* can be a fourth overlapping area value W4.

The first overlapping area value W1, the second overlapping area value W2, and the third overlapping area value W3 can be the same or substantially the same.

The fourth overlapping area value W4 can be greater than each of the first overlapping area value W1, the second overlapping area value W2, and the third overlapping area value W3. Accordingly, the fourth scan bootstrapping capacitor Csc4 can have a greater capacitance than the first to third scan bootstrapping capacitors (Csc1 to Csc3).

Figure 33:
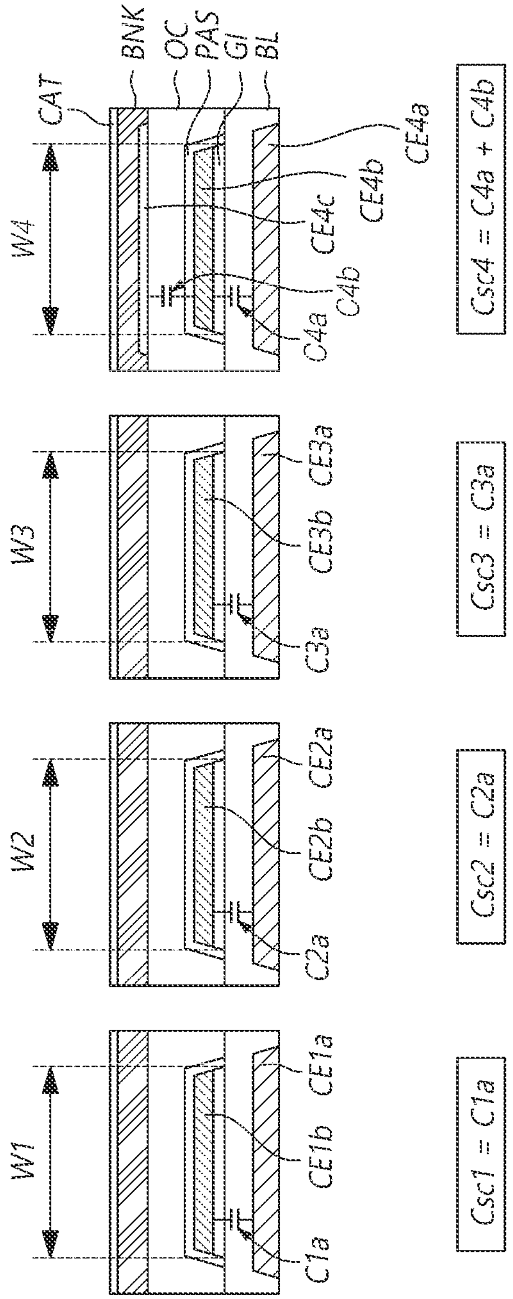

Referring to FIG. 33, among first to fourth scan bootstrapping capacitors (Csc1 to Csc4), the first to third scan bootstrapping capacitors (Csc1 to Csc3) can have a single capacitor structure, and the fourth scan bootstrapping capacitor Csc4 can have a double capacitor structure.

As the fourth scan bootstrapping capacitor Csc4 has ae parallel capacitor structure, the fourth scan bootstrapping capacitor Csc4 can have a greater capacitance than the first to third scan bootstrapping capacitors (Csc1 to Csc3). The first to third scan bootstrapping capacitors Csc1 to Csc3 can have the same capacitance or substantially the same capacitance.

Referring to FIG. 33, the first scan bootstrapping capacitor Csc1 can be a capacitor C1*a* between a first capacitor electrode CE1*a* and a second capacitor electrode CE1*b*. The second scan bootstrapping capacitor Csc2 can be a capacitor C2*a* between a first capacitor electrode CE2*a* and a second capacitor electrode CE2*b*. The third scan bootstrapping capacitor Csc3 can be a capacitor C3*a* between a first capacitor electrode CE3*a* and a second capacitor electrode CE3*b*.

The fourth scan bootstrapping capacitor Csc4 can include a first capacitor C4*a* between a first capacitor electrode CE4*a* and a second capacitor electrode CE4*b* and a second capacitor C4*b* between the second capacitor electrode CE4*b* and a third capacitor electrode CE4*c*.

The first capacitor electrode CE4*a* and the third capacitor electrode CE4*c* can be electrically connected together to the source node of a fourth scan pull-up transistor T6*sc*4, and the second capacitor electrode CE4*b* can be electrically connected to the gate node of the fourth scan pull-up transistor T6*sc*4.

Accordingly, the fourth scan bootstrapping capacitor Csc4 can be a composite capacitor formed by a parallel connection of the first capacitor C4*a* between the first capacitor electrode CE4*a* and the second capacitor electrode CE4*b* and the second capacitor C4*b* between the second capacitor electrode CE4*b* and the third capacitor electrode CE4*c*. Accordingly, the fourth scan bootstrapping capacitor Csc4 can have a greater capacitance than the first to third scan bootstrapping capacitors (Csc1 to Csc3).

In the first scan bootstrapping capacitor Csc1, an overlapping area between the first capacitor electrode CE1*a* and the second capacitor electrode CE1*b* can be a first overlapping area value W1. In the second scan bootstrapping capacitor Csc2, an overlap area between the first capacitor electrode CE2*a* and the second capacitor electrode CE2*b* can be a second overlapping area value W2. In the third scan bootstrapping capacitor Csc3, an overlap area between the first capacitor electrode CE3*a* and the second capacitor electrode CE3*b* can be a third overlapping area value W3. In the fourth scan bootstrapping capacitor Csc4, an overlap area between the first capacitor electrode CE4*a* and the second capacitor electrode CE4*b* can be a fourth overlapping area value W4.

For example, the fourth overlapping area value W4 can be the same or substantially the same, as each of the first overlapping area value W1, the second overlapping area value W2, and the third overlapping area value W3. In another example, the fourth overlapping area value W4 can be greater than each of the first overlapping area value W1, the second overlapping area value W2, and the third overlapping area value W3.

Figure 34:
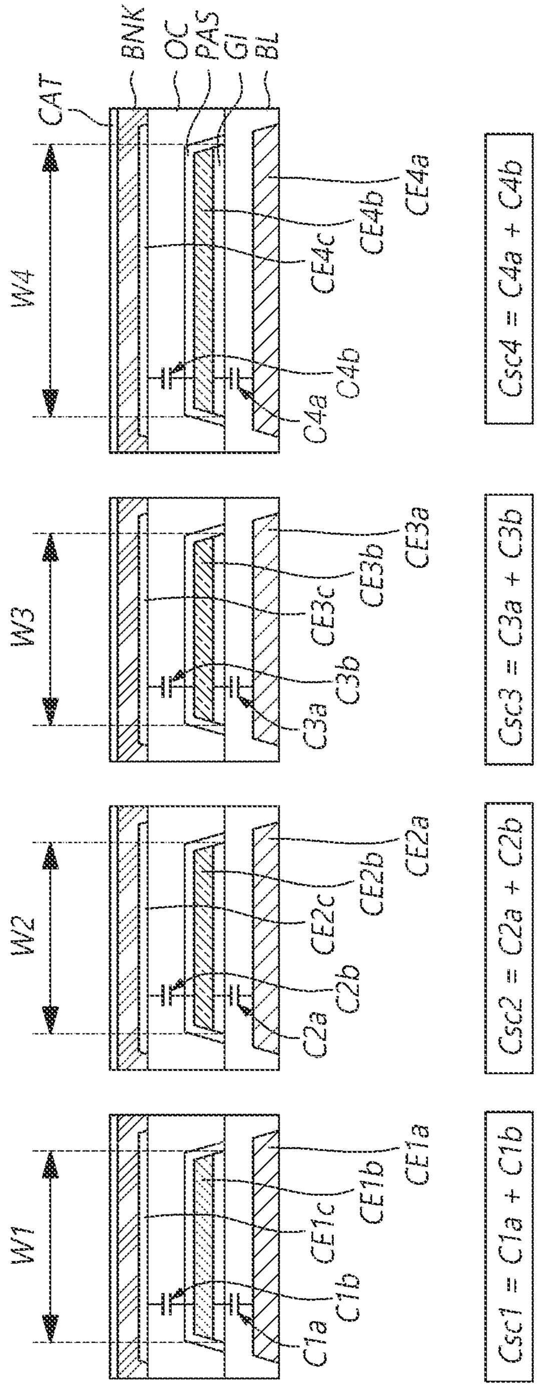
Figure 35:
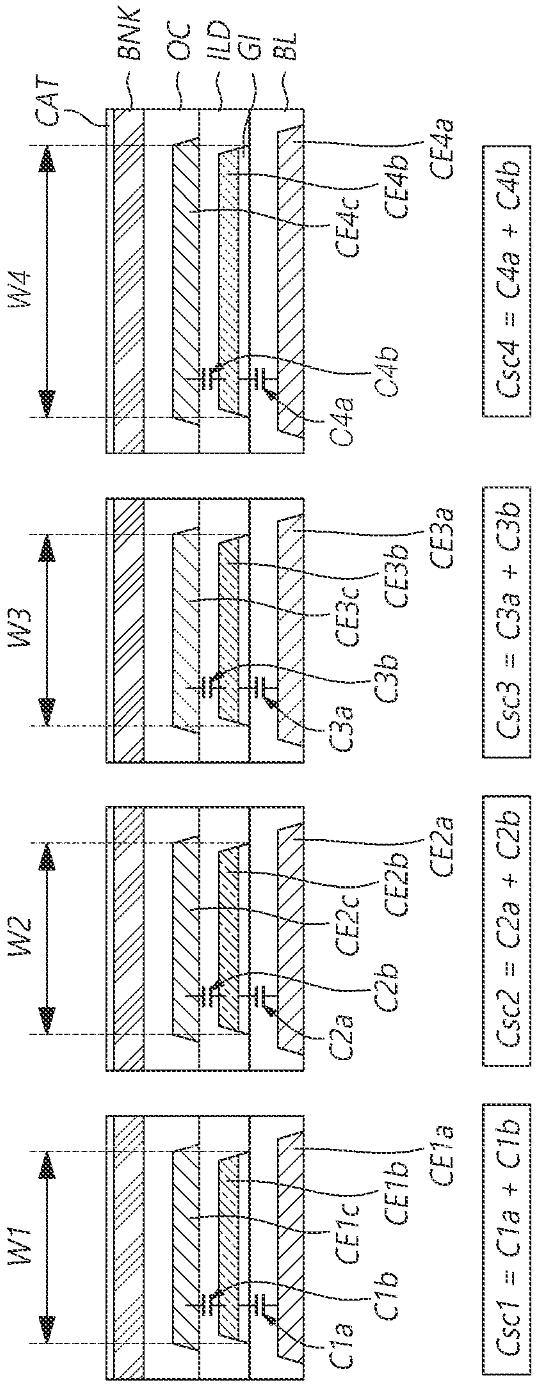

Referring to FIGS. 34 and 35, all first to fourth scan bootstrapping capacitors (Csc1 to Csc4) can have a double capacitor and parallel capacitor structure.

As the fourth scan bootstrapping capacitor Csc4 is configured to have an electrode overlapping area expansion structure, the fourth scan bootstrapping capacitor Csc4 can have a greater capacitance than the first to third scan bootstrapping capacitors (Csc1 to Csc3). The first to third scan bootstrapping capacitors Csc1 to Csc3 can have the same capacitance or substantially the same capacitance.

The first scan bootstrapping capacitor Csc1 can be a composite capacitor formed by a parallel connection of a first capacitor C1*a* between a first capacitor electrode CE1*a* and a second capacitor electrode CE1*b*, and a second capacitor C1*b* between the second capacitor electrode CE1*b* and a third capacitor electrode CE1*c*.

The second scan bootstrapping capacitor Csc2 can be a composite capacitor formed by a parallel connection of a first capacitor C2*a* between a first capacitor electrode CE2*a* and a second capacitor electrode CE2*b* and a second capacitor C2*b* between the second capacitor electrode CE2*b* and a third capacitor electrode CE3*c*.

The third scan bootstrapping capacitor Csc3 can be a composite capacitor formed by a parallel connection of a first capacitor C3*a* between a first capacitor electrode CE3*a* and a second capacitor electrode CE3*b* and a second capacitor C3*b* between the second capacitor electrode CE3*b* and a third capacitor electrode CE3*c*.

The fourth scan bootstrapping capacitor Csc4 can be a composite capacitor formed by a parallel connection of a first capacitor C4*a* between a first capacitor electrode CE4*a* and a second capacitor electrode CE4*b* and a second capacitor C4*b* between the second capacitor electrode CE4*b* and a third capacitor electrode CE4*c*.

In the first scan bootstrapping capacitor Csc1, an overlapping area between the first capacitor electrode CE1*a* and the second capacitor electrode CE1*b* can be a first overlapping area value W1. In the second scan bootstrapping capacitor Csc2, an overlap area between the first capacitor electrode CE2*a* and the second capacitor electrode CE2*b* can be a second overlapping area value W2. In the third scan bootstrapping capacitor Csc3, an overlap area between the first capacitor electrode CE3*a* and the second capacitor electrode CE3*b* can be a third overlapping area value W3. In the fourth scan bootstrapping capacitor Csc4, an overlap area between the first capacitor electrode CE4*a* and the second capacitor electrode CE4*b* can be a fourth overlapping area value W4.

The fourth overlapping area value W4 can be greater than each of the first overlapping area value W1, the second overlapping area value W2, and the third overlapping area value W3. Accordingly, the fourth scan bootstrapping capacitor Csc4 can have a greater capacitance than the first to third scan bootstrapping capacitors (Csc1 to Csc3).

Referring to FIG. 34, the third capacitor electrodes (CE1*c*, CE2*c*, CE3*c*, and CE4*c*) constituting the first to fourth bootstrapping capacitors (Csc1 to Csc4) can be a metal located between the overcoat layer OC and the bank BNK.

Referring to FIG. 35, an interlayer insulating film ILD can be disposed on the second capacitor electrodes (CE1*b*, CE2*b*, CE3*b*, and CE4*b*) constituting the first to fourth bootstrapping capacitors (Csc1 to Csc4). The third capacitor electrodes (CE1*c*, CE2*c*, CE3*c*, and CE4*c*) constituting the first to fourth bootstrapping capacitors (Csc1 to Csc4) can be disposed between the interlayer insulating layer ILD and the overcoat layer OC.

Referring to FIGS. 32 to 35, the first capacitor electrodes (CE1*a*, CE2*a*, CE3*a*, and CE4*a*) constituting the first to fourth bootstrapping capacitors (Csc1 to Csc4) can be a first metal, the second capacitor electrodes (CE1*b*, CE2*b*, CE3*b*, and CE4*b*) constituting the first to fourth bootstrapping capacitors (Csc1 to Csc4) can be a second metal, and the third capacitor electrodes (CE1*c*, CE2*c*, CE3*c*, and CE4*c*) constituting the first to fourth bootstrapping capacitors (Csc1 to Csc4) can be a third metal or a fourth metal.

For example, the first metal can be a light shield metal disposed in the same layer as a light shield LS, and the second metal can be a gate metal disposed in the same layer as a gate electrode, a gate line, and/or the like. The third metal can be an anode metal disposed in the same layer as an anode electrode AND as shown in FIG. 34. The fourth metal can be a source-drain metal disposed in the same layer as the source and drain electrodes of a transistor, as shown in FIG. 35.

Figure 36:
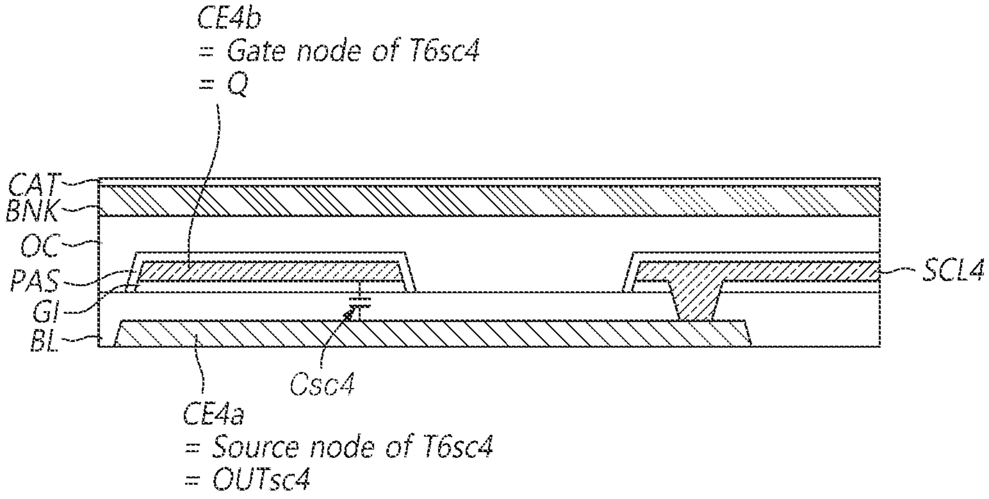
FIG. 36 illustrates an example connection structure between a fourth scan bootstrapping capacitor and a fourth scan signal line included in the gate driving panel circuit in the display device according to aspects of the present disclosure.

FIG. 36 illustrates an example connection structure between a fourth scan bootstrapping capacitor Csc4 and a fourth scan signal line SCL4 included in a first gate driving panel circuit GPC #1 (e.g., the first gate driving panel circuit GPC #1 in FIG. 30) in the display device 100 according to aspects of the present disclosure. It should be noted that discussions are provided on an example where the fourth scan bootstrapping capacitor Csc4 has a single capacitor structure as shown in FIG. 32. Hereinafter, configuration of FIG. 36 will be discussed along with the configuration of FIG. 30.

Referring to FIG. 36, the fourth scan bootstrapping capacitor Csc4 can be formed between a first capacitor electrode CE4*a* and a second capacitor electrode CE4*b*.

The first capacitor electrode CE4*a* can be the source node of the fourth scan pull-up transistor T6*sc*4 or can be electrically connected to the source node of the fourth scan pull-up transistor T6*sc*4. Further, the first capacitor electrode CE4*a* can electrically correspond to the scan output node OUTsc4 of the fourth scan output buffer SCBUF4.

The second capacitor electrode CE4*b* can be the gate node of the fourth scan pull-up transistor T6*sc*4 or can be electrically connected to the gate node of the fourth scan pull-up transistor T6*sc*4. Further, the second capacitor electrode CE4*b* can electrically correspond to the Q node.

For example, the first capacitor electrode CE4*a* can include a light shield metal, and the second capacitor electrode CE4*b* can include a gate metal.

Referring to FIG. 36, the fourth scan signal line SCL4 to which a fourth scan signal SC4 output from the fourth scan output buffer SCBUF4 is applied can be disposed in the same layer as the second capacitor electrode CE4*b*. For example, the fourth scan signal line SCL4 can include the gate metal.

The first capacitor electrode CE4*a* can extend to, or beyond, a lower portion of the fourth scan signal line SCL4. The fourth scan signal line SCL4 can be electrically connected to the extended portion of the first capacitor electrode CE4*a* through a contact hole formed in an insulating layer. The insulating layer can be interposed between the extended portion of the first capacitor electrode CE4*a* and the fourth scan signal line SCL4, and be also disposed between the first capacitor electrode CE4*a* and the second capacitor electrode CE4*b*. The insulating layer can include a buffer layer BL and a gate insulating layer GI.

In another example different from the example of FIG. 36, the first capacitor electrode CE4*b* can be the source node of the fourth scan pull-up transistor T6*sc*4 or can be electrically connected to the source node of the fourth scan pull-up transistor T6*sc*4. Further, the second capacitor electrode CE4*b* can electrically correspond to the scan output node OUTsc4 of the fourth scan output buffer SCBUF4.

The first capacitor electrode CE4*a* can be the gate node of the fourth scan pull-up transistor T6*sc*4 or can be electrically connected to the gate node of the fourth scan pull-up transistor T6*sc*4. Further, the first capacitor electrode CE4*a* can electrically correspond to the Q node.

The embodiments of the touch display device 100 according to aspects of the present disclosure described above can be briefly discussed as follows.

According to the embodiments described herein, a display device (e.g., the display device 100) can include a substrate including a display area in which images can be displayed and a non-display area different from the display area, and a gate driving panel circuit configured to output a plurality of scan signals to a plurality of scan signal lines disposed in the display area.

The gate driving panel circuit can include an output buffer block including two or more scan output buffers configured to receive two or more scan clock signals and output two or more scan signals among the plurality of scan signals, and a logic block configured to control respective voltages of a Q node and a QB node electrically connected to the output buffer block.

Each of the two or more scan output buffers can include a respective scan pull-up transistor between a scan clock node to which a corresponding scan clock signal among the two or more scan clock signals is input and a scan output node to which a corresponding scan signal among the two or more scan signals is output, and a respective scan pull-down transistor between a gate low voltage node to which a gate low voltage is applied and the scan output node.

The gate nodes of the scan pull-up transistors of the two or more scan output buffers can be electrically connected together to the Q node.

Each of the two or more scan output buffers can further include a respective scan bootstrapping capacitor between the gate node and the source node of the corresponding scan pull-up transistor.

The scan bootstrapping capacitor of a specific scan output buffer among the two or more scan output buffers can have a different capacitance from the one or more scan bootstrapping capacitors of one or more remaining scan output buffers, except for the specific scan output buffer among the two or more scan output buffers.

The specific scan output buffer can be the last scan output buffer that lastly outputs a scan signal having a turn-on level voltage among the two or more scan output buffers sharing the Q node.

According to these configurations, as discharge voltage of the shared Q node increases, the falling characteristic of the scan signal output from the last scan output buffer, which is configured in a location representing a poor falling characteristic, can be improved.

The scan bootstrapping capacitor of the specific scan output buffer can have a greater capacitance than the one or more scan bootstrapping capacitors of the one or more remaining scan output buffers.

A falling duration of the scan signal output from the specific scan output buffer can be the same as, or be different in a certain range from, a falling duration of the scan signal output from each of the one or more remaining scan output buffers.

A falling duration of the scan clock signal input to the specific scan output buffer can be the same as, or be different in a certain range from, a falling duration of the scan clock signal input to each of the one or more remaining scan output buffers.

Each of the scan bootstrapping capacitors included in the two or more scan output buffers can include a first capacitor electrode and a second capacitor electrode on the first capacitor electrode. An insulating layer can be disposed between the first capacitor electrode and the second capacitor electrode.

In an embodiment, the first capacitor electrode can electrically correspond to the source node of the scan pull-up transistor and electrically corresponds to the scan output node, and the second capacitor electrode can electrically correspond to the gate node of the scan pull-up transistor and electrically corresponds to the Q node.

In another embodiment, the second capacitor electrode can electrically correspond to the source node of the scan pull-up transistor and electrically corresponds to the scan output node, and the first capacitor electrode can electrically correspond to the gate node of the scan pull-up transistor and electrically corresponds to the Q node.

An area in which the first capacitor electrode and the second capacitor electrode of the scan bootstrapping capacitor of the specific scan output buffer (i.e., the last scan output buffer) among the two or more scan output buffers sharing the Q node overlap each other can be greater than an area in which the first capacitor electrode and the second capacitor electrode of each of the one or more scan bootstrapping capacitors of the one or more remaining scan output buffers overlap each other.

The scan bootstrapping capacitor of the specific scan output buffer (i.e., the last scan output buffer) among the two or more scan output buffers sharing the Q node can further include a third capacitor electrode disposed on the second capacitor electrode in addition to the first capacitor electrode and the second capacitor electrode. The third capacitor electrode can be electrically connected to the first capacitor electrode.

The plurality of scan signal lines can include two or more scan signal lines to which the two or more scan signals output from the two or more scan output buffers are applied. Each of the two or more scan signal lines can be electrically connected to an extended portion of the first capacitor electrode through a contact hole in an insulating layer.

Respective turn-on level voltage periods of two adjacent scan signals among two or more scan signals can overlap with each other.

For example, the output buffer block can include two scan output buffers sharing one Q node. In this example, the two scan output buffers can share one Q node as well as one QB node.

In another example, the output buffer block can include four scan output buffers sharing one Q node. The four scan output buffers sharing one Q node can include a first scan output buffer, a second scan output buffer, a third scan output buffer, and a fourth scan output buffer. In this example, the first scan output buffer, the second scan output buffer, the third scan output buffer, and the fourth scan output buffer can share one Q node as well as one QB node.

The first scan output buffer can include a first scan pull-up transistor between a first scan clock node to which a first scan clock signal is input and a first scan output node from which a first scan signal is output, a first scan pull-down transistor between the gate low voltage node to which the gate low voltage is applied and the first scan output node, and a first scan bootstrapping capacitor between gate and source nodes of the first scan pull-up transistor.

The second scan output buffer can include a second scan pull-up transistor between a second scan clock node to which a second scan clock signal is input and a second scan output node from which a second scan signal is output, a second scan pull-down transistor between the gate low voltage node to which the gate low voltage is applied and the second scan output node, and a second scan bootstrapping capacitor between gate and source nodes of the second scan pull-up transistor.

The third scan output buffer can include a third scan pull-up transistor between a third scan clock node to which a third scan clock signal is input and a third scan output node from which a third scan signal is output, a third scan pull-down transistor between the gate low voltage node to which the gate low voltage is applied and the third scan output node, and a third scan bootstrapping capacitor between gate and source nodes of the third scan pull-up transistor.

The fourth scan output buffer can include a fourth scan pull-up transistor between a fourth scan clock node to which a fourth scan clock signal is input and a fourth scan output node from which a fourth scan signal is output, a fourth scan pull-down transistor between the gate low voltage node to which the gate low voltage is applied and the fourth scan output node, and a fourth scan bootstrapping capacitor between gate and source nodes of the fourth scan pull-up transistor.

All of the gate node of the first scan pull-up transistor, the gate node of the second scan pull-up transistor, the gate node of the third scan pull-up transistor, and gate node of the fourth scan pull-up transistor can be electrically connected to the Q node, Among the scan output buffer, the second scan output buffer, the third scan output buffer, and the fourth scan output buffer, a scan signal output timing of the fourth scan output buffer can be the latest. In this configuration, the fourth scan bootstrapping capacitor can have a greater capacitance than the first scan bootstrapping capacitor, the second scan bootstrapping capacitor, and third scan bootstrapping capacitor.

A falling duration of the fourth scan signal can be the same as, or different in a certain range from, falling durations of the first to third scan signals.

A falling duration of the fourth scan clock signal can be the same as, or different in a certain range from, falling durations of the first to third scan clock signals.

The display device can further include a plurality of clock signal lines disposed in a clock signal line area in the non-display area and delivering a plurality of clock signals to the gate driving panel circuit, a plurality of gate high voltage lines disposed in a first power line area in the non-display area and delivering a plurality of gate high voltages to the gate driving panel circuit, and a plurality of gate low voltage lines disposed in a second power line area in the non-display area and delivering a plurality of gate low voltages to the gate driving panel circuit.

The gate driving panel circuit can be disposed in a gate driving panel circuit area in the non-display area, and the first power line area and the second power line area can be separated by the gate driving panel circuit area.

The clock signal line area and the first power line area can be located on a first side of the gate driving panel circuit area, and the first power line area can be located between the clock signal line area and the gate driving panel circuit area.

The second power line area can be located on a second opposing side of the gate driving panel circuit area, and the second power line area can be located between the gate driving panel circuit area and the display area.

The plurality of clock signal lines can include a plurality of scan clock signal lines and a plurality of carry clock signal lines.

A line width of each of the plurality of scan clock signal lines can be greater than that of each of the plurality of carry clock signal lines.

The plurality of scan clock signal lines can be located further away from the gate driving panel circuit or the display area than the plurality of carry clock signal lines.

The display device can further include a plurality of subpixels disposed in the display area. Each of the plurality of subpixels can include a light emitting element, a driving transistor for driving the light emitting element, a scan transistor configured to control a connection between a data line and a first node of the driving transistor, a sensing transistor configured to control a connection between a reference voltage line and a second node of the driving transistor, and a storage capacitor between the first node and the second node. The gate node of the scan transistor and the gate node of the sensing transistor can be electrically connected to one scan signal line together.

The output buffer block can include a first scan output buffer for outputting a first scan signal, a second scan output buffer for outputting a second scan signal, a third scan output buffer for outputting a third scan signal, and a fourth scan output buffer for outputting a fourth scan signal.

The first scan output buffer and the second scan output buffer can be located in a first direction with respect to a central area. The third scan output buffer and the fourth scan output buffer can be located in a direction opposite to the first direction with respect to the central area.

The display device can further include a plurality of gate low voltage connection lines for interconnecting the plurality of gate low voltage lines disposed in the second power line area the gate driving panel circuit disposed in the gate driving panel circuit area.

The plurality of gate low voltage connection lines can run through the central area.

The first scan output buffer and the second scan output buffer can have a symmetrical structure with the third scan output buffer and the fourth scan output buffer with respect to the central area.

All or one or more of the plurality of clock signal lines can be multilayer lines. At least one of the plurality of gate high voltage lines can be a single-layer line, and the remaining gate high voltage lines can be multilayer lines. The plurality of gate low voltage lines can be multilayer lines.

The display device can further include an overcoat layer disposed in the non-display area and disposed on the gate driving panel circuit.

The overcoat layer can include at least one trench formed in at least one of a first area between the gate driving panel circuit area and the second power line area and a second area between the second power line area and the display area.

The display device can further include a bank extending from the display area to the non-displayable area, an emission layer extending from the display area to the non-display area, a cathode electrode extending from the display area to the non-display area and located on the emission layer, and an electrostatic discharge component disposed in an outer corner area of the non-display area.

The electrostatic discharge component may not overlap with the emission layer. A portion of the electrostatic discharge component can overlap with the cathode electrode. The electrostatic discharge component can overlap with the bank.

The plurality of clock signal lines can be disposed along an outer corner of the substrate. All, or one or more, of the plurality of clock signal lines CL may not overlap with the electrostatic discharge. All or one or more of the plurality of clock signal lines can overlap with the cathode electrode.

The output buffer block can be configured to output the two or more scan signals during each active period and output one of the two or more scan signals during any one blank period among a plurality of blank periods.

the logic block can be configured to charge the Q node so that the output buffer block can output the two or more scan signals during each active period.

The gate driving panel circuit can further include a real-time sensing control block for charging the Q node during any one blank period among the plurality of blank periods.

According to aspects of the present disclosure, a gate driving panel circuit can include an output buffer block including two or more scan output buffers configured to receive two or more scan clock signals and output two or more scan signals, and a logic block configured to control respective voltages of a Q node and a QB node electrically connected to the output buffer block.

Each of the two or more scan output buffers can include a respective scan pull-up transistor between a scan clock node to which a corresponding scan clock signal among the two or more scan clock signals is input and a scan output node to which a corresponding scan signal among the two or more scan signals is output, and a respective scan pull-down transistor between a gate low voltage node to which a gate low voltage is applied and the scan output node.

The gate nodes of the scan pull-up transistors of the two or more scan output buffers can be electrically connected together to the Q node.

Each of the two or more scan output buffers can further include a respective scan bootstrapping capacitor between the gate node and the source node of the corresponding scan pull-up transistor.

The scan bootstrapping capacitor of a specific scan output buffer among the two or more scan output buffers can have a different capacitance from the one or more scan bootstrapping capacitors of one or more remaining scan output buffers, except for the specific scan output buffer among the two or more scan output buffers.

According to aspects of the present disclosure, a display device can include a substrate including a display area and a non-display area, and a gate driving panel circuit configured to output a plurality of scan signals to a plurality of scan signal lines disposed in the display area.

The gate driving panel circuit can include an output buffer block including two or more scan output buffers configured to receive two or more scan clock signals and output two or more scan signals among the plurality of scan signals, and a logic block configured to control respective voltages of a Q node and a QB node electrically connected to the output buffer block.

Among the two or more scan clock signals, a falling duration of the last scan clock signal can be smaller than a falling duration of each of one or more remaining scan clock signals.

Respective falling durations of the two or more scan signals can be the same as each other, or a difference in the falling durations of the two or more scan signals can be less than a difference between the falling duration of the last scan clock signal and the falling duration of each of one or more remaining scan clock signals.

The display device can further include a level shifter configured to supply the two or more scan clock signals to the output buffer block.

According to aspects of the present disclosure, a gate driving panel circuit can include an output buffer block comprising two or more scan output buffers configured to receive two or more scan clock signals and output two or more scan signals; and a logic block configured to control respective voltages of a Q node and a QB node electrically connected to the output buffer block, wherein gate nodes of scan pull-up transistors of the two or more scan output buffers are electrically connected together to the Q node, wherein among the two or more scan signals, respective high level voltage periods of two scan signals, which are output immediately adjacent to each other in time, overlap each other in time, and wherein among the two or more scan clock signals, a falling duration of a last scan clock signal is smaller than that of each of the remaining one or more scan clock signals.

According to aspects of the present disclosure, a display device can include a substrate including a display area and a non-display area; and a gate driving panel circuit configured to output a plurality of scan signals to a plurality of scan signal lines disposed in the display area, wherein the gate driving panel circuit comprises: an output buffer block comprising two or more scan output buffers configured to receive two or more scan clock signals and output two or more scan signals; and a logic block configured to control respective voltages of a Q node and a QB node electrically connected to the output buffer block, wherein gate nodes of scan pull-up transistors of the two or more scan output buffers are electrically connected together to the Q node, wherein among the two or more scan signals, respective high level voltage periods of two scan signals, which are output immediately adjacent to each other in time, overlap each other in time, and wherein among the two or more scan clock signals, a falling duration of a last scan clock signal is smaller than that of each of the remaining one or more scan clock signals.

According to the embodiments described herein, a gate driving panel circuit can be provided that has a structure suitable for a gate in panel (GIP) type, and a display device including the same can be provided.

According to the embodiments described herein, a gate driving panel circuit can be configured to supply normal gate signals to gate lines so that gate driving can be normally performed, and a display device including the gate driving panel circuit can be provided.

According to aspects of the present disclosure, a gate driving panel circuit can be configured to have a reduced difference in scan output characteristics, and a display device including the gate driving panel circuit can be provided.

According to aspects of the present disclosure, a gate driving panel circuit is capable of reducing a difference in scan output characteristics without modifying a scan clock signal, and a display device including the gate driving panel circuit can be provided.

According to aspects of the present disclosure, a gate driving panel circuit is capable of reducing a difference in scan output characteristics using a scan clock signal, and a display device including the gate driving panel circuit can be provided.

According to aspects of the present disclosure, a display device can include a wiring structure for stably supplying various types of signals or power to a gate driving panel circuit disposed in a display panel.

According to the embodiments described herein, since a display panel (e.g., the display panel 110) and a display device (e.g., the display device 100) are designed to include a gate driving panel circuit (e.g., the gate driving panel circuit GPC) disposed on a substrate of the display panel and formed during the manufacturing process of the display panel or the display device, advantage of enabling process optimization of the display panel and the display device can be provided.

The embodiments of the present disclosure described above have been described for illustrative purposes; those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments can be variously modified.

What is claimed is:

1. A display device comprising:

a substrate including a display area in which one or more images are displayed and a non-display area different from the display area; and a gate driving panel circuit configured to output a plurality of scan signals to a plurality of scan signal lines arranged in the display area, wherein the gate driving panel circuit comprises:

an output buffer block including two or more scan output buffers configured to receive two or more scan clock signals and output two or more scan signals among the plurality of scan signals, and a logic block configured to control respective voltages of a Q node and a QB node electrically connected to the output buffer block, wherein each of the two or more scan output buffers comprises:

a respective scan pull-up transistor disposed between a scan clock node to which a corresponding scan clock signal among the two or more scan clock signals is input and a scan output node from which a corresponding scan signal among the two or more scan signals is output, and a respective scan pull-down transistor disposed between a gate low voltage node to which a gate low voltage is applied and the scan output node, wherein gate nodes of the scan pull-up transistors of the two or more scan output buffers are electrically connected together to the Q node, and each of the two or more scan output buffers further comprises a respective scan bootstrapping capacitor between the gate node and a source node of the corresponding scan pull-up transistor, and wherein the corresponding scan bootstrapping capacitor included in a specific scan output buffer among the two or more scan output buffers has a different capacitance from the one or more corresponding scan bootstrapping capacitors included in one or more remaining scan output buffers, except for the specific scan output buffer among the two or more scan output buffers.

2. The display device of claim 1, further comprising:

a plurality of clock signal lines disposed in a clock signal line area in the non-display area and configured to deliver a plurality of clock signals to the gate driving panel circuit;

a plurality of gate high voltage lines disposed in a first power line area in the non-display area and configured to deliver a plurality of gate high voltages to the gate driving panel circuit; and a plurality of gate low voltage lines disposed in a second power line area in the non-display area and configured to deliver a plurality of gate low voltages to the gate driving panel circuit, wherein the gate driving panel circuit is disposed in a gate driving panel circuit area in the non-display area, and the first power line area and the second power line area are separated by the gate driving panel circuit area.

3. The display device of claim 2, wherein the plurality of clock signal lines comprise a plurality of scan clock signal lines and a plurality of carry clock signal lines, and a line width of each of the plurality of scan clock signal lines is greater than that of each of the plurality of carry clock signal lines.

4. The display device of claim 3, wherein the plurality of scan clock signal lines are located further away from the gate driving panel circuit or the display area than the plurality of carry clock signal lines.

5. The display device of claim 2, wherein the two or more scan output buffers comprise:

a first scan output buffer configured to output a first scan signal, a second scan output buffer configured to output a second scan signal, a third scan output buffer configured to output a third scan signal, and a fourth scan output buffer configured to output a fourth scan signal, wherein the first scan output buffer and the second scan output buffer are located in a first direction with respect to a central area, and the third scan output buffer and the fourth scan output buffer are located in a direction opposite to the first direction with respect to the central area, wherein the display device further comprises a plurality of gate low voltage connection lines for interconnecting the plurality of gate low voltage lines disposed in the second power line area and the gate driving panel circuit disposed in the gate driving panel circuit area, and wherein the plurality of gate low voltage connection lines run through the central area.

6. The display device of claim 5, wherein the first scan output buffer and the second scan output buffer have a symmetrical structure with the third scan output buffer and the fourth scan output buffer with respect to the central area.

7. The display device of claim 2, further comprising:

a bank extending from the display area to the non-display area;

an emission layer extending from the display area to the non-display area;

a cathode electrode extending from the display area to the non-display area and located on the emission layer; and an electrostatic discharge component disposed in an outer corner area of the non-display area, wherein:

the electrostatic discharge component does not overlap with the emission layer;

a portion of the electrostatic discharge component overlaps with the cathode electrode; and the electrostatic discharge component overlaps with the bank.

8. The display device of claim 7, wherein:

the plurality of clock signal lines are be disposed along one or more outer corners of the substrate, all or one or more of the plurality of clock signal lines do not overlap with the electrostatic discharge component; and all or one or more of the plurality of clock signal lines overlap with the cathode electrode.

9. The display device of claim 2, wherein:

the clock signal line area and the first power line area are located on a first side of the gate driving panel circuit area;

the first power line area is located between the clock signal line area and the gate driving panel circuit area;

the second power line area is located on a second opposing side of the gate driving panel circuit area; and the second power line area is located between the gate driving panel circuit area and the display area.

10. The display device of claim 2, wherein:

each of at least one of the plurality of clock signal lines is a multilayer line;

each of one or more of the plurality of gate high voltage lines is a single-layer line and each of the remaining one or more gate high voltage lines is a multilayer line; and each of the plurality of gate low voltage lines is a multilayer line.

11. The display device of claim 2, further comprising:

an overcoat layer disposed in the non-display area and disposed on the gate driving panel circuit, wherein the overcoat layer comprises at least one trench formed in at least one of a first area between the gate driving panel circuit area and the second power line area and a second area between the second power line area and the display area.

12. The display device of claim 1, wherein each of the scan bootstrapping capacitors included in the two or more scan output buffers comprises a first capacitor electrode and a second capacitor electrode on the first capacitor electrode, and an insulating layer is disposed between the first capacitor electrode and the second capacitor electrode, and wherein the first capacitor electrode or the second capacitor electrode electrically corresponds to the source node of the scan pull-up transistor and electrically corresponds to the scan output node, or the second capacitor electrode or the first capacitor electrode electrically corresponds to the gate node of the scan pull-up transistor and electrically corresponds to the Q node.

13. The display device of claim 12, wherein the scan bootstrapping capacitor included in the specific scan output buffer further comprises a third capacitor electrode disposed on the second capacitor electrode, wherein another insulating layer is disposed between the second capacitor electrode and the third capacitor electrode, and wherein the third capacitor electrode is electrically connected to the first capacitor electrode.

14. The display device of claim 13, wherein each of two or more scan signal lines among the plurality of scan signal lines is electrically connected to an extended portion of the corresponding first capacitor electrode through a contact hole in the another insulating layer.

15. The display device of claim 12, wherein an area in which the corresponding first capacitor electrode and the corresponding second capacitor electrode in the scan bootstrapping capacitor included in the specific scan output buffer overlaps each other is greater than an area in which the corresponding first capacitor electrode and the corresponding second capacitor electrode in each of the one or more scan bootstrapping capacitors of the one or more remaining scan output buffers overlap each other.

16. The display device of claim 1, wherein the specific scan output buffer among the two or more scan output buffers is a last scan output buffer lastly outputting a scan signal having a turn-on level voltage among the two or more scan output buffers sharing the Q node, and the scan bootstrapping capacitor included in the specific scan output buffer has a greater capacitance than the one or more scan bootstrapping capacitors included in the one or more remaining scan output buffers.

17. The display device of claim 16, wherein a falling duration of the corresponding scan signal output from the last scan output buffer is the same as, or different in a certain range from, a falling duration of the corresponding scan signal output from each of the one or more remaining scan output buffers.

18. The display device of claim 16, wherein a falling duration of the corresponding scan clock signal input to the last scan output buffer is the same as, or different in a certain range from, a falling duration of the corresponding scan clock signal input to each of the one or more remaining scan output buffers.

19. The display device of claim 1, wherein the two or more scan output buffers comprise a first scan output buffer, a second scan output buffer, a third scan output buffer, and a fourth scan output buffer, which share the Q node, wherein the first scan output buffer comprises:

a first scan pull-up transistor disposed between a first scan clock node to which a first scan clock signal is input and a first scan output node from which a first scan signal is output;

a first scan pull-down transistor disposed between the gate low voltage node to which the gate low voltage is applied and the first scan output node; and a first scan bootstrapping capacitor disposed between gate and source nodes of the first scan pull-up transistor, wherein the second scan output buffer comprises:

a second scan pull-up transistor disposed between a second scan clock node to which a second scan clock signal is input and a second scan output node from which a second scan signal is output;

a second scan pull-down transistor disposed between the gate low voltage node to which the gate low voltage is applied and the second scan output node; and a second scan bootstrapping capacitor disposed between gate and source nodes of the second scan pull-up transistor, wherein the third scan output buffer comprises:

a third scan pull-up transistor disposed between a third scan clock node to which a third scan clock signal is input and a third scan output node from which a third scan signal is output;

a third scan pull-down transistor disposed between the gate low voltage node to which the gate low voltage is applied and the third scan output node; and a third scan bootstrapping capacitor disposed between gate and source nodes of the third scan pull-up transistor, wherein the fourth scan output buffer comprises:

a fourth scan pull-up transistor disposed between a fourth scan clock node to which a fourth scan clock signal is input and a fourth scan output node from which a fourth scan signal is output;

a fourth scan pull-down transistor disposed between the gate low voltage node to which the gate low voltage is applied and the fourth scan output node; and a fourth scan bootstrapping capacitor disposed between gate and source nodes of the fourth scan pull-up transistor, wherein all of the gate node of the first scan pull-up transistor, the gate node of the second scan pull-up transistor, the gate node of the third scan pull-up transistor, and the gate node of the fourth scan pull-up transistor are electrically connected to the Q node, wherein among the first scan output buffer, the second scan output buffer, the third scan output buffer, and the fourth scan output buffer, a scan signal output timing of the fourth scan output buffer is the latest, and wherein the fourth scan bootstrapping capacitor has a greater capacitance than the first scan bootstrapping capacitor, the second scan bootstrapping capacitor, and the third scan bootstrapping capacitor.

20. The display device of claim 19, wherein a falling duration of the fourth scan signal is the same as, or different in a certain range from, falling durations of the first to third scan signals.

21. The display device of claim 19 wherein a falling duration of the fourth scan clock signal is the same as, or different in a certain range from, falling durations of the first to third scan clock signals.

22. The display device of claim 1, wherein respective turn-on level voltage periods of two adjacent scan signals among the two or more scan signals overlap each other.

23. The display device of claim 1, wherein the output buffer block is configured to output the two or more scan signals during each active period and output one of the two or more scan signals during any one blank period among a plurality of blank periods, wherein the logic block is configured to charge the Q node so that the output buffer block outputs the two or more scan signals during each active period, and wherein the gate driving panel circuit further comprises a real-time sensing control block for charging the Q node during any one blank period among the plurality of blank periods.

24. The display device of claim 1, further comprising:

a plurality of subpixels disposed in the display area, wherein each of the plurality of subpixels comprises:

a light emitting element;

a driving transistor for driving the light emitting element;

a scan transistor configured to control a connection between a data line and a first node of the driving transistor;

a sensing transistor configured to control a connection between a reference voltage line and a second node of the driving transistor; and a storage capacitor disposed between the first node and the second node, and wherein a gate node of the scan transistor and a gate node of the sensing transistor are electrically connected to one scan signal line together.

25. A display device comprising:

a substrate including a display area and a non-display area adjacent to the display area; and a gate driving panel circuit configured to output a plurality of scan signals to a plurality of scan signal lines disposed in the display area, wherein the gate driving panel circuit comprises:

an output buffer block including two or more scan output buffers configured to receive two or more scan clock signals and output two or more scan signals among the plurality of scan signals, and a logic block configured to control respective voltages of a Q node and a QB node electrically connected to the output buffer block, wherein among the two or more scan clock signals, a falling duration of a last scan clock signal is smaller than a falling duration of each of the remaining one or more scan clock signals, and wherein respective falling durations of the two or more scan signals are the same, or a difference between the falling durations of the two or more scan signals is less than a difference between the falling duration of the last scan clock signal and the falling duration of each of the remaining one or more scan clock signals.

26. The display device of claim 25, further comprising a level shifter configured to supply the two or more scan clock signals to the output buffer block.

27. Agate driving panel circuit comprising:

an output buffer block comprising two or more scan output buffers configured to receive two or more scan clock signals and output two or more scan signals; and a logic block configured to control respective voltages of a Q node and a QB node electrically connected to the output buffer block, wherein each of the two or more scan output buffers comprises:

a respective scan pull-up transistor disposed between a scan clock node to which a corresponding scan clock signal among the two or more scan clock signals is input and a scan output node from which a corresponding scan signal among the two or more scan signals is output, and a respective scan pull-down transistor disposed between a gate low voltage node to which a gate low voltage is applied and the scan output node, wherein gate nodes of the scan pull-up transistors of the two or more scan output buffers are electrically connected together to the Q node, and each of the two or more scan output buffers further comprises a respective scan bootstrapping capacitor disposed between the gate node and a source node of the corresponding scan pull-up transistor, and wherein the corresponding scan bootstrapping capacitor included in a specific scan output buffer among the two or more scan output buffers has a different capacitance from the one or more corresponding scan bootstrapping capacitors included in one or more remaining scan output buffers, except for the specific scan output buffer among the two or more scan output buffers.

28. Agate driving panel circuit comprising:

an output buffer block comprising two or more scan output buffers configured to receive two or more scan clock signals and output two or more scan signals; and a logic block configured to control respective voltages of a Q node and a QB node electrically connected to the output buffer block, wherein gate nodes of scan pull-up transistors of the two or more scan output buffers are electrically connected to the Q node, wherein among the two or more scan signals, respective high level voltage periods of two scan signals, which are output immediately adjacent to each other in time, overlap each other in time, and wherein among the two or more scan clock signals, a falling duration of a last scan clock signal is smaller than a falling duration of each of the remaining one or more scan clock signals.

29. A display device comprising:

a substrate including a display area and a non-display area adjacent to the display area; and a gate driving panel circuit configured to output a plurality of scan signals to a plurality of scan signal lines disposed in the display area, wherein the gate driving panel circuit comprises:

an output buffer block comprising two or more scan output buffers configured to receive two or more scan clock signals and output two or more scan signals; and a logic block configured to control respective voltages of a Q node and a QB node electrically connected to the output buffer block, wherein gate nodes of scan pull-up transistors of the two or more scan output buffers are electrically connected together to the Q node, wherein among the two or more scan signals, respective high level voltage periods of two scan signals, which are output immediately adjacent to each other in time, overlap each other in time, and wherein among the two or more scan clock signals, a falling duration of a last scan clock signal is smaller than a falling duration of each of the remaining one or more scan clock signals.

* * * * *